United States Patent
ElBsat et al.

(10) Patent No.: US 10,732,584 B2
(45) Date of Patent: Aug. 4, 2020

(54) BUILDING ENERGY OPTIMIZATION SYSTEM WITH AUTOMATED AND DYNAMIC ECONOMIC LOAD DEMAND RESPONSE (ELDR) OPTIMIZATION

(71) Applicant: Johnson Controls Technology Company, Auburn Hills, MI (US)

(72) Inventors: Mohammad N. ElBsat, Milwaukee, WI (US); Michael J. Wenzel, Grafton, WI (US); Matthew J. Asmus, Watertown, WI (US); James P. Kummer, Wales, WI (US); Peter A. Craig, Pewaukee, WI (US); Robert D. Turney, Watertown, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 98 days.

(21) Appl. No.: 15/974,411

(22) Filed: May 8, 2018

(65) Prior Publication Data

US 2018/0356770 A1    Dec. 13, 2018

Related U.S. Application Data

(63) Continuation-in-part of application No. 15/616,616, filed on Jun. 7, 2017.

(51) Int. Cl.
*G05B 13/02* (2006.01)
*H02J 13/00* (2006.01)
(Continued)

(52) U.S. Cl.
CPC ......... *G05B 13/021* (2013.01); *G05B 13/026* (2013.01); *H02J 3/32* (2013.01);
(Continued)

(58) Field of Classification Search
CPC .............. G05B 13/021; G05B 13/0026; G05B 13/026; H02J 3/32; H02J 3/383; H02J 3/0006; H02J 3/00
See application file for complete search history.

(56) References Cited

U.S. PATENT DOCUMENTS 7,062,361 B1 *  6/2006  Lane ..................... F25D 29/00
                                                          700/291
7,580,775 B2    8/2009  Kulyk et al.
(Continued)

OTHER PUBLICATIONS

U.S. Appl. No. 15/405,234, filed Jan. 12, 2017, Johnson Controls Technology Company.
(Continued)

*Primary Examiner* — Vincent H Tran
(74) *Attorney, Agent, or Firm* — Foley & Lardner LLP

(57) ABSTRACT

An energy optimization system for a building includes a processing circuit configured to provide a first bid including one or more first participation hours and a first load reduction amount for each of the one or more first participation hours to a computing system. The processing circuit is configured to operate one or more pieces of building equipment based on one or more first equipment loads and receive one or more awarded or rejected participation hours from the computing system responsive to the first bid. The processing circuit is configured to generate one or more second participation hours, a second load reduction amount for each of the one or more second participation hours, and one or more second equipment loads based on the one or more awarded or rejected participation hours and operate the one or more pieces of building equipment based on the one or more second equipment loads.

20 Claims, 31 Drawing Sheets

(51) Int. Cl.
*H02J 3/38* (2006.01)
*H02J 3/32* (2006.01)
*H02J 3/00* (2006.01)

(52) U.S. Cl.
CPC .......... *H02J 3/383* (2013.01); *H02J 13/0006* (2013.01); *H02J 3/00* (2013.01); *H02J 3/003* (2020.01); *H02J 2203/20* (2020.01)

(56) References Cited

U.S. PATENT DOCUMENTS

| | | | |
|---|---|---|---|
| 7,894,946 B2 | 2/2011 | Kulyk et al. | |
| 8,527,108 B2 | 9/2013 | Kulyk et al. | |
| 8,527,109 B2 | 9/2013 | Kulyk et al. | |
| 8,903,554 B2 | 12/2014 | Stagner | |
| 8,918,223 B2 | 12/2014 | Kulyk et al. | |
| 9,110,647 B2 | 8/2015 | Kulyk et al. | |
| 9,235,847 B2* | 1/2016 | Greene | G06Q 10/04 |
| 9,703,339 B2 | 7/2017 | Kulyk et al. | |
| 10,139,877 B2 | 11/2018 | Kulyk et al. | |
| 10,190,793 B2 | 1/2019 | Drees et al. | |
| 10,250,039 B2 | 4/2019 | Wenzel et al. | |
| 10,438,303 B2* | 10/2019 | Chen | G06Q 50/06 |
| 2009/0240381 A1* | 9/2009 | Lane | H02J 3/14 |
| | | | 700/296 |
| 2010/0241285 A1* | 9/2010 | Johnson | H02J 3/14 |
| | | | 700/296 |
| 2011/0231320 A1* | 9/2011 | Irving | G06Q 30/00 |
| | | | 705/80 |
| 2012/0036250 A1 | 2/2012 | Vaswani et al. | |
| 2012/0310860 A1* | 12/2012 | Kim | G06Q 30/08 |
| | | | 705/412 |
| 2013/0010348 A1 | 1/2013 | Massard et al. | |
| 2013/0020443 A1 | 1/2013 | Dyckrup et al. | |
| 2013/0103481 A1 | 4/2013 | Carpenter et al. | |
| 2013/0204443 A1 | 8/2013 | Steven et al. | |
| 2014/0039709 A1 | 2/2014 | Steven et al. | |
| 2014/0201018 A1* | 7/2014 | Chassin | G06Q 20/102 |
| | | | 705/26.3 |
| 2014/0277769 A1 | 9/2014 | Matsuoka et al. | |
| 2015/0309495 A1 | 10/2015 | Delorme et al. | |
| 2015/0311713 A1 | 10/2015 | Asghari et al. | |
| 2015/0316902 A1 | 11/2015 | Wenzel et al. | |
| 2015/0316907 A1 | 11/2015 | Elbsat et al. | |
| 2015/0371328 A1* | 12/2015 | Gabel | G06Q 50/06 |
| | | | 705/37 |
| 2016/0020608 A1 | 1/2016 | Carrasco et al. | |
| 2016/0043550 A1 | 2/2016 | Sharma et al. | |
| 2016/0092986 A1* | 3/2016 | Lian | G06Q 30/08 |
| | | | 700/295 |
| 2016/0216722 A1 | 7/2016 | Tokunaga et al. | |
| 2016/0275630 A1* | 9/2016 | Strelec | G06Q 30/0202 |
| 2016/0305678 A1* | 10/2016 | Pavlovski | G05B 13/048 |
| 2016/0329708 A1* | 11/2016 | Day | H02J 3/14 |
| 2016/0373453 A1 | 12/2016 | Ruffner et al. | |
| 2016/0377306 A1 | 12/2016 | Drees et al. | |
| 2016/0379149 A1 | 12/2016 | Saito et al. | |
| 2017/0102162 A1 | 4/2017 | Drees et al. | |
| 2017/0102433 A1 | 4/2017 | Wenzel et al. | |
| 2017/0102434 A1 | 4/2017 | Wenzel et al. | |
| 2017/0102675 A1 | 4/2017 | Drees | |
| 2017/0103483 A1 | 4/2017 | Drees et al. | |
| 2017/0104332 A1 | 4/2017 | Wenzel et al. | |
| 2017/0104336 A1 | 4/2017 | Elbsat et al. | |
| 2017/0104337 A1 | 4/2017 | Drees | |
| 2017/0104342 A1 | 4/2017 | Elbsat et al. | |
| 2017/0104343 A1 | 4/2017 | Elbsat et al. | |
| 2017/0104344 A1 | 4/2017 | Wenzel et al. | |
| 2017/0104345 A1 | 4/2017 | Wenzel et al. | |
| 2017/0104346 A1 | 4/2017 | Wenzel et al. | |
| 2017/0104449 A1 | 4/2017 | Drees | |
| 2017/0167742 A1* | 6/2017 | Radovanovic | G05B 15/02 |
| 2017/0236222 A1* | 8/2017 | Chen | G06Q 50/06 |
| | | | 705/7.35 |
| 2017/0288455 A1 | 10/2017 | Fife | |
| 2018/0082373 A1* | 3/2018 | Hong | G06Q 40/04 |

OTHER PUBLICATIONS

U.S. Appl. No. 15/405,236, filed Jan. 12, 2017, Johnson Controls Technology Company.
U.S. Appl. No. 15/426,962, filed Feb. 7, 2017, Johnson Controls Technology Company.
PJM Economic Demand Resource in Energy Market, PJM State and Member Training Department, 2014, 119 pages.
PJM Manual 11: Energy & Ancillary Services Market Operations, pp. 122-137, PJM, 2015.
PJM Open Access Transmission Tariff, Section 3.3A, Apr. 4, 2016, 10 pages.
Arthur J Helmicki, Clas A Jacobson, and Carl N. Nett. Control Oriented System Identification: a Worstcase/deterministic Approach in H1. IEEE Transactions on Automatic control, 36(10):1163-1176, 1991. 13 pages.
Diederik Kingma and Jimmy Ba. Adam: A Method for Stochastic Optimization. In International Conference on Learning Representations (ICLR), 2015, 15 pages.
George EP Box, Gwilym M Jenkins, Gregory C Reinsel, and Greta M Ljung. Time Series Analysis: Forecasting and Control. John Wiley & Sons, 2015, chapters 13-15. 82 pages.
Jie Chen and Guoxiang Gu. Control-oriented System Identification: an H1 Approach, vol. 19. Wiley-Interscience, 2000, chapters 3 & 8, 38 pages.
Jingjuan Dove Feng, Frank Chuang, Francesco Borrelli, and Fred Bauman. Model Predictive Control of Radiant Slab Systems with Evaporative Cooling Sources. Energy and Buildings, 87:199-210, 2015. 11 pages.
K. J. Astrom. Optimal Control of Markov Decision Processes with Incomplete State Estimation. J. Math. Anal. Appl., 10:174-205, 1965.31 pages.
Kelman and F. Borrelli. Bilinear Model Predictive Control of a HVAC System Using Sequential Quadratic Programming. In Proceedings of the 2011 IFAC World Congress, 2011, 6 pages.
Lennart Ljung and Torsten Soderstrom. Theory and practice of recursive identification, vol. 5. JSTOR, 1983, chapters 2, 3 & 7, 80 pages.
Lennart Ljung, editor. System Identification: Theory for the User (2nd Edition). Prentice Hall, Upper Saddle River, New Jersey, 1999, chapters 5 and 7, 40 pages.
Moritz Hardt, Tengyu Ma, and Benjamin Recht. Gradient Descent Learns Linear Dynamical Systems. arXiv preprint arXiv:1609.05191, 2016, 44 pages.
Nevena et al. Data center cooling using model-predictive control, 10 pages.
Sergio Bittanti, Marco C Campi, et al. Adaptive control of Linear Time Invariant Systems: The "Bet on the Best" Principle. Communications in Information & Systems, 6(4):299-320, 2006. 21 pages.
Yudong Ma, Anthony Kelman, Allan Daly, and Francesco Borrelli. Predictive Control for Energy Efficient Buildings with Thermal Storage: Modeling, Stimulation, and Experiments. IEEE Control Systems, 32(1):44-64, 2012. 20 pages.
Yudong Ma, Francesco Borrelli, Brandon Hencey, Brian Coffey, Sorin Bengea, and Philip Haves. Model Predictive Control for the Operation of Building Cooling Systems. IEEE Transactions on Control Systems Technology, 20(3):796-803, 2012.7 pages.
Extended European Search Reported on EP Patent Application No. 18176474 dated Sep. 5, 2018. 8 pages.
Office Action on EP 18176474.7 dated Sep. 11, 2019. 5 pages.
Office Action on EP 18176474.7, dated Feb. 10, 2020, 6 pages.

* cited by examiner

BUILDING ENERGY OPTIMIZATION SYSTEM WITH AUTOMATED AND DYNAMIC ECONOMIC LOAD DEMAND RESPONSE (ELDR) OPTIMIZATION

CROSS-REFERENCE TO RELATED PATENT APPLICATION

This application is a continuation-in-part of U.S. patent application Ser. No. 15/616,616 filed Jun. 7, 2017, the entire disclosure of which is incorporated by reference herein.

BACKGROUND

The present disclosure relates generally to an energy cost optimization system for a building, a collection of buildings, or a central plant. The present disclosure relates more particularly to an energy cost optimization system that accounts for revenue generated from participating in incentive-based demand response (IBDR) programs.

IBDR programs include various incentive-based programs such as frequency regulation (FR) and economic load demand response (ELDR). An ELDR program is typically operated by a regional transmission organization (RTO) and/or an independent system operator (ISO). The RTO and/or ISO may reward a customer for reducing their electric load during certain hours of the day. The RTO and/or ISO may operate with a bidding system in which various customers place bids with the RTO and/or ISO to reduce their electric load during selected hours. Based on the received bids, the RTO and/or ISO may dispatch awarded hours to the various customers.

Customers that participate in the ELDR program can either be awarded or penalized by the RTO and/or ISO based on the electric load of the customer during awarded hours (i.e., hours on which the customer has bid and been awarded). A customer may include a curtailment amount in their bid. A curtailment amount may be an amount that the customer will reduce their electric load with respect to a baseline load. If the customer curtails their electric load according to their bid during the awarded hours, the customer is compensated. However, if the customer does not curtail their electric load according to their bid during the awarded hours, the customer is penalized.

SUMMARY

One implementation of the present disclosure is an energy cost optimization system for a building. The system includes HVAC equipment configured to operate in the building and a controller. The controller is configured to generate a cost function defining a cost of operating the HVAC equipment over an optimization period as a function of one or more electric loads setpoints for the HVAC equipment. The electric load setpoints are decision variables of the cost function and are setpoints for each hour of the optimization period. The controller is further configured to generate participation hours. The participation hours indicate one or more hours that the HVAC equipment will participate in an economic load demand response (ELDR) program. The controller is further configured to generate an ELDR term based on the participation hours. The ELDR term indicates revenue generated by participating in the ELDR program. The controller is further configured to modify the cost function to include the ELDR term and perform an optimization using the modified cost function to determine optimal electric load setpoints for each hour of the participation hours.

In some embodiments, the controller is configured to generate a bid for participation in the ELDR program by subtracting the optimal electric load setpoints from a customer baseline load (CBL) for each hour of the participation hours and generating the bid to be the participation hours excluding certain hours of the participation hours. In some embodiments, the certain hours are hours where the difference of the CBL and the optimal electric load setpoint are less than or equal to zero. The controller can be further configured to send the bid to an incentive program. In some embodiments, the controller is configured to cause the HVAC equipment to operate based on awarded participation hours received from the incentive program and the optimal electric loads.

In some embodiments, the controller is configured to modify the cost function to include the ELDR term by representing participation in the ELDR program as an electric rate adjustment in the cost function. The electric rate adjustment may be dependent on at least one of the participation hours, a CBL, a predicted day-ahead locational marginal price (LMP), and a predicted real-time LMP. In some embodiments, the controller is configured to perform the optimization using the modified cost function to determine the optimal electric load for each hour of the participation hours based on the electric rate adjustment.

In some embodiments, the controller is configured to receive a net benefit test (NBT), a LMP, and a real-time LMP from an incentive program. The controller can further be configured to generate the participation hours by comparing the NBT to a predicted day-ahead LMP that is based on one or more received day-ahead LMPs and a predicted real-time LMP that is based on one or more received real-time LMP.

In some embodiments, the controller is configured to generate the participation hours by comparing an NBT to a predicted day-ahead LMP and a predicted real-time LMP and determining values for an event start hour and an event end hour that cause an equation to be minimized and determining that the participation hours are the hours between the event start hour and the event end hour. In some embodiments, the equation includes at least one of a customer baseline load (CBL), a predicted real-time LMP, and a predicted electric load. In some embodiments, the participation hours are used as the search space for minimizing the equation and are the hours generated by comparing the NBT to one or both of the predicted day-ahead LMP and the predicted real-time LMP.

In some embodiments, the CBL is dependent on the event start hour and the event end hour. The CBL may be at least one of a same day CBL and a symmetric additive adjustment (SAA) CBL.

In some embodiments, the CBL is an SAA CBL and the controller is configured to determine the SAA CBL by determining an average electric load to be the average electric load of four weekdays of five most recently occurring weekdays before the participation hours if the participation hours occur on a weekday, determining the average electric load to be the average electric load two weekends or holidays of three most recently occurring weekends or holidays, if the participation hours occur on a weekend or holiday, determining an adjustment based on predicted electric loads of three consecutive hours one hour before the event start hour, and determining the SAA CBL to be the sum of the average electric load and the adjustment.

In some embodiments, the CBL is a same day CBL. In some embodiments, the controller is configured to determine the same day CBL based on predicted electric loads three consecutive hours one hour before the participation hours and predicted electric loads two consecutive hours one hour after the participation hours.

In some embodiments, the participation hours are a vector of ones and zeros for a plurality of hours, a one indicates participation in the ELDR program for a particular hour while a zero indicates no participation in the ELDR program for a particular hour. In some embodiments, the modified cost function represents participation in the ELDR program as an electric rate adjustment.

Another implementation of the present disclosure is a method for optimizing energy costs for a building. The method includes generating a cost function defining a cost of operating HVAC equipment over an optimization period as a function of one or more electric loads for the HVAC equipment. The electric loads are decision variables of the cost function and include an electric load for each hour of the optimization period. The method further includes generating participation hours, the participation hours indicate one or more hours that the HVAC equipment will participate in an economic load demand response (ELDR) program. The method further includes generating an ELDR term based on the participation hours. The ELDR term indicates revenue generated by participating in the ELDR program. The method further includes modifying the cost function to include the ELDR term and performing an optimization using the modified cost function to determine an optimal electric load for each hour of the participation hours.

In some embodiments, the method further includes generating a bid for participation in the ELDR program by subtracting the optimal electric load from a customer baseline load (CBL) for each hour of the participation hours and generating the bid to be the participation hours excluding certain hours of the participation hours. In some embodiments, the certain hours are hours where the difference of the CBL and the optimal electric load is less than or equal to zero. In some embodiments, the method further includes sending the bid to an incentive program. In some embodiments, the method further includes causing the HVAC equipment to operate based on the awarded participation hours and the optimal electric load setpoints. In some embodiments, the modified cost function represents participation in the ELDR program as an electric rate adjustment.

In some embodiments, modifying the cost function to include the ELDR term comprises representing participation in the ELDR program as an electric rate adjustment in the cost function. The electric rate adjustment may be dependent on at least one of the participation hours, a CBL, a predicted day-ahead locational marginal price (LMP), and a predicted real-time LMP. In some embodiments, performing the optimization using the modified cost function to determine the optimal electric load for each hour of the participation hours is based on the electric rate adjustment.

In some embodiments, the method further includes receiving a net benefit test (NBT), a day-ahead LMP, and a real-time LMP from an incentive program. In some embodiments, the method further includes generating the participation hours by comparing the NBT to a predicted day-ahead LMP that is based on one or more received day-ahead LMPs and a predicted real-time LMP that is based on one or more received real-time LMP.

In some embodiments, the method includes determining the participation hours by comparing an NBT to at least one of a predicted day-ahead LMP and a predicted real-time LMP. In some embodiments, the method includes determining values for an event start hour and an event end hour that cause an equation to be minimized, the equation including at least one of a customer baseline load (CBL), a predicted real-time LMP, and a predicted electric load. The participation hours may be used as the search space for minimizing the equation and may be the hours generated by comparing the NBT to at least one of the predicted day-ahead LMP and the predicted real-time LMP. In some embodiments, the method includes determining that the participation hours are the hours between the event start hour and the event end hour.

In some embodiments, the method further includes determining the SAA CBL by determining an average electric load to be the average electric load of four weekdays of five most recently occurring weekdays before the participation hours if the participation hours occur on a weekday, determining the average electric load to be the average electric load of two weekends or holidays of three most recently occurring weekends or holidays if the participation hours occur on a weekend or holiday, determining an adjustment based on predicted electric loads of three consecutive hours one hour before the event start hour, and determining the SAA CBL to be the sum of the average electric load and the adjustment.

In some embodiments, the CBL is a same day CBL. In some embodiments, the method further includes determining the same day CBL based on predicted electric loads three consecutive hours one hour before the participation hours and predicted electric loads two consecutive hours one hour after the participation hours.

Another implementation of the present disclosure is an energy cost optimization system for a building. The system includes HVAC equipment configured to satisfy a building energy load of the building and a controller. The controller is configured to generate a cost function defining a cost of operating the HVAC equipment over an optimization period as a function of one or more electric loads for the HVAC equipment. The electric loads are decision variables of the cost function and include an electric load for each hour of the optimization period. The controller can be configured to receive a net benefit test (NBT), a day-ahead locational marginal price (LMP), and a real-time LMP from an incentive program. The controller can be configured to generate participation hours. The participation hours indicate one or more hours that the HVAC equipment will participate in an economic load demand response (ELDR) program. The controller can be configured to generate the participation hours by comparing the NBT to a predicted day-ahead LMP that is based on one or more received day-ahead LMPs and a predicted real-time LMP that is based on one or more received real-time LMP. The controller is configured to generate an ELDR term based on the participation hours. The ELDR term indicates revenue generated by participating in the ELDR program. The controller is configured to modify the cost function to include the ELDR term and perform an optimization using the modified cost function to determine an optimal electric load for each hour of the participation hours.

In some embodiments, the controller is configured to generate a bid for participation in the ELDR program by subtracting the optimal electric load from a customer baseline load (CBL) for each hour of the participation hours and generating the bid to be the participation hours excluding certain hours of the participation hours. In some embodiments, the certain hours are hours where the difference of the CBL and the optimal electric load is less than or equal to zero. The controller can be configured to send the bid to an incentive program and cause the HVAC equipment to operate based on awarded participation hours received from the incentive program and the optimal electric loads.

In some embodiments, the controller is configured to determine the participation hours by determining values for an event start hour and an event end hour that cause an equation to be minimized. In some embodiments, the equation includes at least one of a customer baseline load (CBL), a predicted real-time LMP, and a predicted electric load. In some embodiments, the participation hours are used as the search space for minimizing the equation and are the hours generated by comparing the NBT to the predicted day-ahead LMP and the predicted real-time LMP. In some embodiments, the controller is configured to determine the participation hours by determining that the participation hours are the hours between the event start hour and the event end hour.

In some embodiments, the CBL is an SAA CBL or a same day CBL. In some embodiments, the controller is configured to determine the SAA CBL by determining an average electric load to be the average electric load of four weekdays of five most recently occurring weekdays before the participation hours, if the participation hours occur on a weekday, determining the average electric load to be the average electric load of two weekends or holidays of three most recently occurring weekends or holidays, if the participation hours occur on a weekend or holiday, determining an adjustment based on predicted electric loads of three consecutive hours one hour before the event start hour, and determining the SAA CBL to be the sum of the average electric load and the adjustment. The controller can be configured to determine the same day CBL based on predicted electric loads three consecutive hours one hour before the participation hours and predicted electric loads two consecutive hours one hour after the participation hours.

One implementation of the present disclosure is an energy optimization system for a building. The system includes a processing circuit configured to perform an optimization to generate one or more first participation hours and a first load reduction amount for reach of the one or more first participation hours and provide a first bid including the one or more first participation hours and the first load reduction amount for each of the one or more first participation hours to a computing system configured to facilitate an economic load demand response (ELDR) program. The processing circuit is configured to operate one or more pieces of building equipment to affect an environmental condition of the building based on one or more first equipment loads for participating in the ELDR program and receive one or more awarded or rejected participation hours from the computing system responsive to the first bid. The processing circuit is configured to generate one or more second participation hours for participating in the ELDR program, a second load reduction amount for each of the one or more second participation hours, and one or more second equipment loads for the one or more pieces of building equipment based on the one or more awarded or rejected participation hours by performing the optimization a second time and operate the one or more pieces of building equipment to affect the environmental condition of the building based on the one or more second equipment loads.

In some embodiments, the processing circuit is configured to generate a predicted campus electric load based on at least one of historical campus electric load values, predicted market resource prices, predicted equipment loads, or predicted chilled water loads and generate the one or more second participation hours for participating in the ELDR program, the second load reduction amount for each of the one or more second participation hours, and the one or more second equipment loads for the one or more pieces of building equipment based on the one or more awarded or rejected participation hours and on the predicted campus electric load by performing the optimization the second time.

In some embodiments, the processing circuit is configured to generate a second bid including the one or more second participation hours and the second load reduction amount for each of the one or more second participation hours, provide the second bid to the computing system configured to facilitate the ELDR program, and receive one or more second awarded or rejected hours from the computing system responsive to the second bid.

In some embodiments, the second bid is an update to the first bid, the one or more second participation hours are an update to the one or more first participation hours, and the second load reduction amount for each of the one or more second participation hours is an update to the first load reduction amount for each of the one or more first participation hours.

In some embodiments, the one or more awarded or rejected hours and the one or more second participation hours are hours of a particular day, wherein the processing circuit is configured to determine a revenue benefit for the particular day based on a benefit function and the one or more awarded or rejected hours and determine whether to participate in the ELDR program for the particular day based on a comparison of the revenue benefit to a predefined threshold.

In some embodiments, the processing circuit is configured to determine whether to participate in the ELDR program for the particular day based on the comparison of the revenue benefit to the predefined threshold by determining to participate in the ELDR program for the particular day in response to a determination that the revenue benefit is greater than the predefined threshold and determining not to participate in the ELDR program for the particular day in response to a determination that the revenue benefit is less than the predefined threshold.

In some embodiments, the processing circuit is configured to perform the optimization to generate the one or more first participation hours for participating in the ELDR program, the first load reduction amount for each of the one or more first participation hours, and the one or more first equipment loads for the one or more pieces of building equipment based on one or more ELDR parameters for the ELDR program.

In some embodiments, the one or more ELDR parameters include at least one of a day ahead locational marginal price which is an electricity price for a particular area on a future day, a real-time locational marginal price which is an electricity price at a current time, or a net benefits test which is a value indicating whether a particular hour should be a participation hour.

In some embodiments, the processing circuit is configured to periodically collect one or more ELDR parameters from the computing system configured to facilitate the ELDR program and generate the one or more second participation hours for participating in the ELDR program, the second load reduction amount for each of the one or more second participation hours, and the one or more second equipment loads for the one or more pieces of building equipment based on the one or more first awarded or rejected hours and the periodically collected ELDR parameters by performing the optimization the second time.

In some embodiments, the processing circuit is configured to generate one or more predictions of the one or more ELDR parameters based on the one or more ELDR parameters and generate the one or more second participation hours for participating in the ELDR program, the second load reduction amount for each of the one or more second participation hours, and the one or more second equipment loads for the one or more pieces of building equipment based on the one or more first awarded or rejected hours and the one or more predictions of the one or more ELDR parameters by performing the optimization the second time.

Another implementation of the present disclosure is a method for optimizing energy use of a building. The method includes performing an optimization to generate one or more first participation hours and a first load reduction amount for reach of the one or more first participation hours. The method includes providing a first bid including the one or more first participation hours and the first load reduction amount for each of the one or more first participation hours to a computing system configured to facilitate an economic load demand response (ELDR) program, operating one or more pieces of building equipment to affect an environmental condition of the building based on one or more first equipment loads for participating in the ELDR program, and receiving one or more awarded or rejected participation hours from the computing system in response to providing the first bid to the computing system. The method includes generating one or more second participation hours for participating in the ELDR program, a second load reduction amount for each of the one or more second participation hours, and one or more second equipment loads for the one or more pieces of building equipment based on the one or more awarded or rejected participation hours by performing the optimization a second time and operating the one or more pieces of building equipment to affect the environmental condition of the building based on the one or more second equipment loads.

In some embodiments, the method includes generating a predicted campus electric load based on at least one of historical campus electric load values, predicted market resource prices, predicted equipment loads, or predicted chilled water loads and generating the one or more second participation hours for participating in the ELDR program, the second load reduction amount for each of the one or more second participation hours, and the one or more second equipment loads for the one or more pieces of building equipment based on the one or more awarded or rejected participation hours and on the predicted campus electric load.

In some embodiments, the method includes generating a second bid including the one or more second participation hours and the second load reduction amount for each of the one or more second participation hours, providing the second bid to the computing system configured to facilitate the ELDR program, wherein the second bid is an update to the first bid, the one or more second participation hours are an update to the one or more first participation hours, and the second load reduction amount for each of the one or more second participation hours is an update to the first load reduction amount for each of the one or more first participation hours and receiving one or more second awarded or rejected hours from the computing system in response to providing the second bid.

In some embodiments, the one or more awarded or rejected hours and the one or more second participation hours are hours of a particular day. In some embodiments, the method includes determining a revenue benefit for the particular day based on a benefit function and the one or more awarded or rejected hours and determining whether to participate in the ELDR program for the particular day based on a comparison of the revenue benefit to a predefined threshold.

In some embodiments, determining whether to participate in the ELDR program for the particular day based on a comparison of the revenue benefit to a predefined threshold includes determining to participate in the ELDR program for the particular day in response to a determination that the revenue benefit is greater than the predefined threshold and determining not to participate in the ELDR program for the particular day in response to a determination that the revenue benefit is less than the predefined threshold.

In some embodiments, the method includes performing the optimization to generate the one or more first participation hours for participating in the ELDR program, the first load reduction amount for each of the one or more first participation hours, and the one or more first equipment loads for the one or more pieces of building equipment is based on one or more ELDR parameters for the ELDR program.

In some embodiments, the method includes periodically collecting the one or more ELDR parameters from the computing system configured to facilitate the ELDR program, generating one or more predictions of the one or more ELDR parameters based on the one or more ELDR parameters, and generating the one or more second participation hours for participating in the ELDR program, the second load reduction amount for each of the one or more second participation hours, and the one or more second equipment loads for the one or more pieces of building equipment based on the one or more first awarded or rejected hours and the one or more predictions of the one or more ELDR parameters by performing the optimization the second time.

Another implementation of the present disclosure is an energy optimization controller for a building. The controller includes a processing circuit configured to perform an optimization to generate one or more first participation hours and a first load reduction amount for each of the one or more first participation hours and provide a first bid including the one or more first participation hours and the first load reduction amount for each of the one or more first participation hours to a computing system configured to facilitate an economic load demand response (ELDR) program. The processing circuit is configured to operate the one or more pieces of building equipment to affect an environmental condition of the building based on one or more first equipment loads for participating in the ELDR program, receive one or more awarded or rejected participation hours from the computing system, periodically collect one or more ELDR parameters from the computing system configured to facilitate the ELDR program, generate one or more predictions of the one or more ELDR parameters based on the one or more ELDR parameters, generate one or more second participation hours for participating in the ELDR program, a second load reduction amount for each of the one or more second participation hours, and one or more second equipment loads for the one or more pieces of building equipment based on the one or more awarded or rejected participation hours and the predicted one or more ELDR parameters, and operate the one or more pieces of building equipment to affect the environmental condition of the building based on the one or more second equipment loads.

In some embodiments, the one or more awarded or rejected hours and the one or more participation hours are hours of a particular day, wherein the processing circuit is configured to determine a revenue benefit for the particular day based on a benefit function and the one or more awarded or rejected hours and determine whether to participate in the ELDR program for the particular day based on a comparison of the revenue benefit to a predefined threshold.

In some embodiments, the processing circuit is configured to determine whether to participate in the ELDR program for the particular day based on a comparison of the revenue benefit to a predefined threshold by determining to participate in the ELDR program for the particular day in response to a determination that the revenue benefit is greater than the predefined threshold and determining not to participate in the ELDR program for the particular day in response to a determination that the revenue benefit is less than the predefined threshold.

Another implementation of the present disclosure is an energy optimization system for a building. The system includes a processing circuit configured to perform an optimization to generate one or more first participation hours and a first load reduction amount for each of the one or more first participation hours and generate a user interface including an indication of one or more economic load demand response (ELDR) operation parameters for an ELDR program, the one or more first participation hours, and the first load reduction amount for each of the one or more first participation hours. The processing circuit is configured to receive one or more overrides of the one or more first participation hours from the user interface, perform the optimization a second time to generate one or more second participation hours for participating in the ELDR program, a second load reduction amount for each of the one or more second participation hours, and one or more second equipment loads for the one or more pieces of building equipment based on the received one or more overrides, and operate the one or more pieces of building equipment to affect an environmental condition of the building based on the one or more second equipment loads.

In some embodiments, the processing circuit is configured to provide a first bid including the one or more first participation hours and the first load reduction amount for each of the one or more first participation hours to a computing system configured to facilitate the ELDR program and provide a second bid including the one or more second participation hours and the second load reduction amount for each of the one or more second participation hours to the computing system configured to facilitate the ELDR program, wherein the second bid is an update to the first bid, the one or more second participation hours are an update to the one or more first participation hours, and the second load reduction amount for each of the one or more second participation hours is an update to the first load reduction amount for each of the one or more first participation hours.

In some embodiments, the user interface includes a first interface element indicating values for the one or more ELDR parameters and a second interface element indicating the one or more first participation hours and the first load reduction amount for each of the one or more first participation hours.

In some embodiments, the second interface element is a chart indicating a plurality of hours for a plurality of days and an indication of which of the plurality of hours for the plurality of days are the first participation hours and the first load reduction amount for each of the one or more first participation hours.

In some embodiments, the processing circuit is configured to display a locked indication for each of the one or more first participation hours a predefined amount of time before each of the one or more participation hours occurs and prevent a user from overriding each of the one or more first participation hours within the predefined amount of time before each of the one or more first participation hours.

In some embodiments, the first interface element is a trend graph indicating a trend of the values for the one or more ELDR parameters for a plurality of times. In some embodiments, the processing circuit is configured to collect the values for the one or more ELDR operation parameters from a computing system configured to facilitate the ELDR program, generate the trend graph based on the collected values for the one or more ELDR operation parameters, and cause the user interface to include the generated trend graph.

In some embodiments, the one or more ELDR parameters include at least one of a day ahead locational marginal price which is an electricity price for a particular area on a future day, or a real-time locational marginal price which is an electricity price on at a current time.

In some embodiments, the processing circuit is configured to receive one or more electric consumption values from building equipment configured to measure the electrical consumption values, cause the trend graph to include a trend of the one or more electric consumption values, generate a baseline electrical load based on historic electric load consumption, and cause the trend graph to include an indication of the baseline electrical load.

Another implementation of the present disclosure is a method for optimizing energy use of a building. The method includes performing an optimization to generate one or more first participation hours and a first load reduction amount for each of the one or more first participation hours. The method includes generating a user interface including an indication of one or more economic load demand response (ELDR) operation parameters for an ELDR program, the one or more first participation hours, and the first load reduction amount for each of the one or more first participation hours, receiving one or more overrides of the one or more first participation hours from the user interface, performing the optimization a second time to generate one or more second participation hours for participating in the ELDR program, a second load reduction amount for each of the one or more second participation hours, and one or more second equipment loads for the one or more pieces of building equipment based on the received one or more overrides, and operating the one or more pieces of building equipment to affect an environmental condition of the building based on the one or more second equipment loads.

In some embodiments, the method includes providing a first bid including the one or more first participation hours and the first load reduction amount for each of the one or more first participation hours to a computing system configured to facilitate the ELDR program and providing a second bid including the one or more second participation hours and the second load reduction amount for each of the one or more second participation hours to the computing system configured to facilitate the ELDR program, wherein the second bid is an update to the first bid, the one or more second participation hours are an update to the one or more first participation hours, and the second load reduction amount for each of the one or more second participation hours is an update to the first load reduction amount for each of the one or more first participation hours.

In some embodiments, the user interface includes a first interface element indicating values for the one or more ELDR parameters and a second interface element indicating the one or more first participation hours and the first load reduction amount for each of the one or more first participation hours.

In some embodiments, the one or more ELDR parameters include one or more awarded or rejected hours of the one or more first participation hours. In some embodiments, the processing circuit is configured to cause the second interface element to display an indication of which of the one or more first participation hours are awarded hours or which of the one or more first participation hours are rejected hours.

In some embodiments, the second interface element is a chart indicating a hours for a plurality of days and an indication of which of the plurality of hours for the plurality of days are the first participation hours and the first load reduction amount for each of the one or more first participation hours.

In some embodiments, the method includes displaying a locked indication for each of the one or more first participation hours a predefined amount of time before each of the one or more participation hours occurs and preventing a user from overriding each of the one or more first participation hours within the predefined amount of time before each of the one or more first participation hours.

In some embodiments, the first interface element is a trend graph indicating a trend of the values for the one or more ELDR parameters for a multiple times. In some embodiments, the method further includes collecting the values for the one or more ELDR operation parameters from a computing system configured to facilitate the ELDR program, generating the trend graph based on the collected values for the one or more ELDR operation parameters, and causing the user interface to include the generated trend graph.

In some embodiments, the one or more ELDR parameters include at least one of a day ahead locational marginal price which is an electricity price for a particular area on a future day, or a real-time locational marginal price which is an electricity price on at a current time.

In some embodiments, the method includes receiving one or more electric consumption values from building equipment configured to measure the electrical consumption values, causing the trend graph to include a trend of the one or more electric consumption values, generating a baseline electrical load based on historic electric load consumption, and causing the trend graph to include an indication of the baseline electrical load.

Another implementation of the present disclosure is an energy optimization controller for a building. The controller includes a processing circuit configured to perform an optimization to generate one or more first participation hours and a first load reduction amount for each of the one or more first participation hours and generate a user interface including an indication of one or more economic load demand response (ELDR) operation parameters for an ELDR program, the one or more first participation hours, and the first load reduction amount for each of the one or more first participation hours, wherein the user interface includes a first interface element indicating values for the one or more ELDR parameters and a second interface element indicating the one or more first participation hours and the first load reduction amount for each of the one or more first participation hours, receive one or more overrides of the one or more first participation hours from the user interface, perform the optimization a second time to generate one or more second participation hours for participating in the ELDR program, a second load reduction amount for each of the one or more second participation hours, and one or more second equipment loads for the one or more pieces of building equipment based on the received one or more overrides, and operate the one or more pieces of building equipment to affect an environmental condition of the building based on the one or more second equipment loads.

In some embodiments, the processing circuit is configured to provide a first bid including the one or more first participation hours and the first load reduction amount for each of the one or more first participation hours to a computing system configured to facilitate the ELDR program and provide a second bid including the one or more second participation hours and the second load reduction amount for each of the one or more second participation hours to the computing system configured to facilitate the ELDR program, wherein the second bid is an update to the first bid, the one or more second participation hours are an update to the one or more first participation hours, and the second load reduction amount for each of the one or more second participation hours is an update to the first load reduction amount for each of the one or more first participation hours.

In some embodiments, the second interface element is a chart indicating a plurality of hours for a plurality of days and an indication of which of the plurality of hours for the plurality of days are the first participation hours and the first load reduction amount for each of the one or more first participation hours.

In some embodiments, the processing circuit is configured to display a locked indication for each of the one or more first participation hours a predefined amount of time before each of the one or more participation hours occurs and prevent a user from overriding each of the one or more first participation hours within the predefined amount of time before each of the one or more first participation hours.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
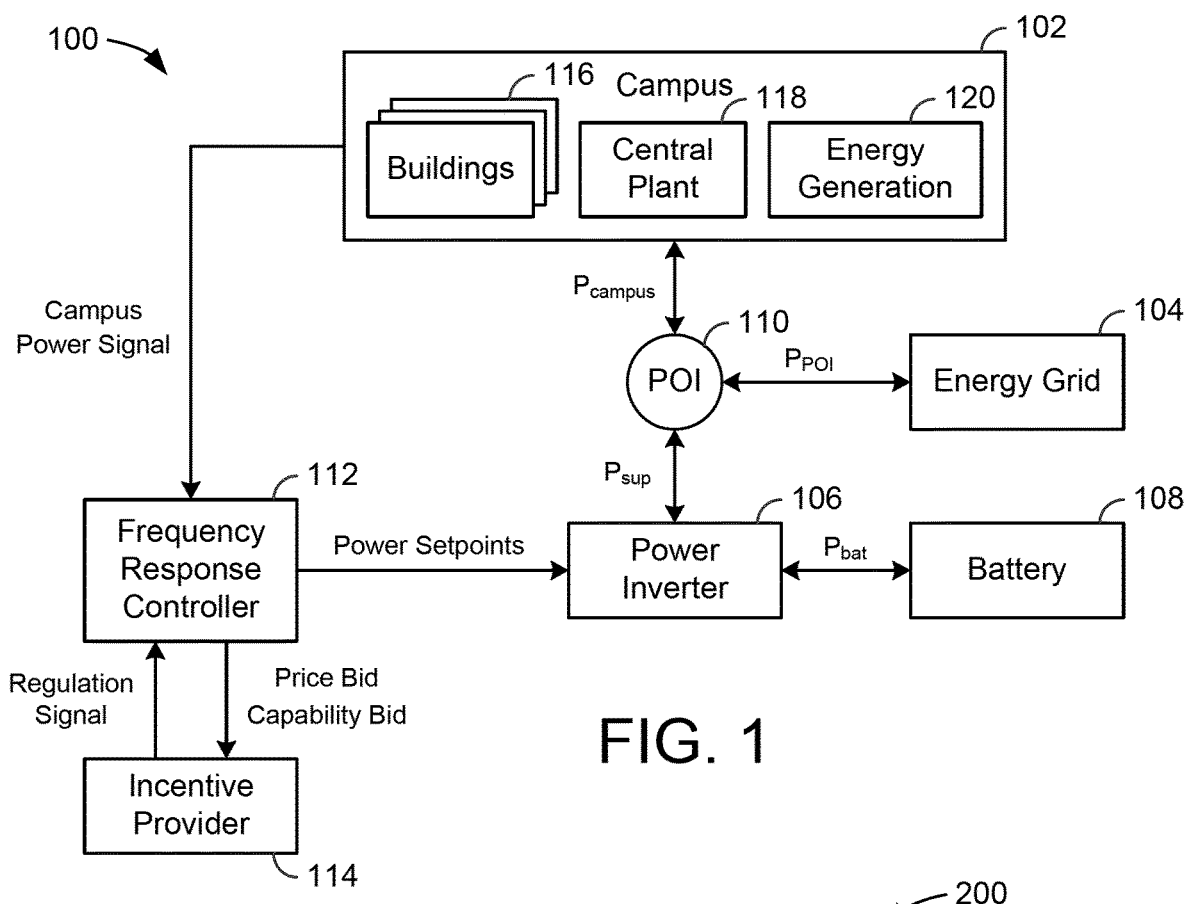
FIG. 1 is a block diagram of a frequency response optimization system, according to an exemplary embodiment.

Referring generally to the FIGURES, systems, methods, and devices, are shown for a building energy optimization system, the optimization system configured to participate in an economic load demand response (ELDR) program. As illustrated herein, a controller for a building is configured to facilitate the participation in the ELDR program. The controller can be configured to determine a plurality of participation hours that the controller determines the building should participate in the ELDR program. Based on the determined participation hours, the controller can be configured to dispatch a bid to an incentive program. The incentive program may be a program managed by a curtailment service provider (CSP). The CSP may act as a medium between customers and the RTO and/or ISO. The CSP, RTO, and/or ISO may be one or more systems, servers, or computers that manage and/or operate the ELDR program. The incentive program may award some and/or all hours of the bid to the controller and transmit an indication of the awarded hours to the controller.

The controller can be configured to generate the participation hours based on values called "locational marginal prices" (LMPs). The LMPs may indicate a rate at which the controller will be compensated for curtailing an electric load of a building. The LMPs may be received by the controller. In various embodiments, the controller is configured to use the LMPs to determine which hours the controller should participate in the ELDR program. In some embodiments, based on LMP values received for past days, the controller can be configured to predict future LMP values and generate the participation hours based on the predicted LMP values.

The controller can be configured to determine optimal electric load based on the participation hours. HVAC equipment, lighting equipment, and/or any other electric consuming or producing equipment in a building can be operated to meet the electric load. In some embodiments, the controller is configured to generate a cost function which indicates the cost of operating HVAC equipment of a building over an optimization period (e.g., a single day). The participation hours may be hours during the optimization period i.e., particular hours of a day that the controller has determined it should participate in the ELDR program. The controller can be configured to optimize the cost function and determine a plurality of decision variables that indicate an electric load for the optimization period, including the participation hours.

Based on the optimal electric loads, the controller can be configured to determine a bid for particular participation hours of the optimization period. The bid may include hours that the controller has determined it should participate in the ELDR program and may further include a curtailment amount. The curtailment amount may be a difference between the buildings typical electric load (e.g., a baseline) and the optimal electric load determined by the controller. The typical electric load (e.g., baseline) may be determined based on a method specified by the RTO and/or ISO. The controller can be configured to receive awarded hours, one, some, or all of the hours included in the bid from the RTO and/or ISO. The controller can be configured to operate HVAC equipment of the building based on the awarded hours. The controller can be configured to operate the HVAC equipment so that the electric load of the building meets the optimal electric loads.

Frequency Response Optimization

Referring now to FIG. 1, a frequency response optimization system 100 is shown, according to an exemplary embodiment. System 100 is shown to include a campus 102 and an energy grid 104. Campus 102 may include one or more buildings 116 that receive power from energy grid 104. Buildings 116 may include equipment or devices that consume electricity during operation. For example, buildings 116 may include HVAC equipment, lighting equipment, security equipment, communications equipment, vending machines, computers, electronics, elevators, or other types of building equipment.

In some embodiments, buildings 116 are served by a building management system (BMS). A BMS is, in general, a system of devices configured to control, monitor, and manage equipment in or around a building or building area. A BMS can include, for example, a HVAC system, a security system, a lighting system, a fire alerting system, and/or any other system that is capable of managing building functions or devices. An exemplary building management system which may be used to monitor and control buildings 116 is described in U.S. patent application Ser. No. 14/717,593 filed May 20, 2015, the entire disclosure of which is incorporated by reference herein.

In some embodiments, campus 102 includes a central plant 118. Central plant 118 may include one or more subplants that consume resources from utilities (e.g., water, natural gas, electricity, etc.) to satisfy the loads of buildings 116. For example, central plant 118 may include a heater subplant, a heat recovery chiller subplant, a chiller subplant, a cooling tower subplant, a hot thermal energy storage (TES) subplant, and a cold thermal energy storage (TES) subplant, a steam subplant, and/or any other type of subplant configured to serve buildings 116. The subplants may be configured to convert input resources (e.g., electricity, water, natural gas, etc.) into output resources (e.g., cold water, hot water, chilled air, heated air, etc.) that are provided to buildings 116. An exemplary central plant which may be used to satisfy the loads of buildings 116 is described U.S. patent application Ser. No. 14/634,609 filed Feb. 27, 2015, the entire disclosure of which is incorporated by reference herein.

In some embodiments, campus 102 includes energy generation 120. Energy generation 120 may be configured to generate energy that can be used by buildings 116, used by central plant 118, and/or provided to energy grid 104. In some embodiments, energy generation 120 generates electricity. For example, energy generation 120 may include an electric power plant, a photovoltaic energy field, or other types of systems or devices that generate electricity. The electricity generated by energy generation 120 can be used internally by campus 102 (e.g., by buildings 116 and/or central plant 118) to decrease the amount of electric power that campus 102 receives from outside sources such as energy grid 104 or battery 108. If the amount of electricity generated by energy generation 120 exceeds the electric power demand of campus 102, the excess electric power can be provided to energy grid 104 or stored in battery 108. The power output of campus 102 is shown in FIG. 1 as $P_{campus}$. $P_{campus}$ may be positive if campus 102 is outputting electric power or negative if campus 102 is receiving electric power.

Still referring to FIG. 1, system 100 is shown to include a power inverter 106 and a battery 108. Power inverter 106 may be configured to convert electric power between direct current (DC) and alternating current (AC). For example, battery 108 may be configured to store and output DC power, whereas energy grid 104 and campus 102 may be configured to consume and generate AC power. Power inverter 106 may be used to convert DC power from battery 108 into a sinusoidal AC output synchronized to the grid frequency of energy grid 104. Power inverter 106 may also be used to convert AC power from campus 102 or energy grid 104 into DC power that can be stored in battery 108. The power output of battery 108 is shown as $P_{bat}$. $P_{bat}$ may be positive if battery 108 is providing power to power inverter 106 or negative if battery 108 is receiving power from power inverter 106.

In some embodiments, power inverter 106 receives a DC power output from battery 108 and converts the DC power output to an AC power output. The AC power output can be used to satisfy the energy load of campus 102 and/or can be provided to energy grid 104. Power inverter 106 may synchronize the frequency of the AC power output with that of energy grid 104 (e.g., 50 Hz or 60 Hz) using a local oscillator and may limit the voltage of the AC power output to no higher than the grid voltage. In some embodiments, power inverter 106 is a resonant inverter that includes or uses LC circuits to remove the harmonics from a simple square wave in order to achieve a sine wave matching the frequency of energy grid 104. In various embodiments, power inverter 106 may operate using high-frequency transformers, low-frequency transformers, or without transformers. Low-frequency transformers may convert the DC output from battery 108 directly to the AC output provided to energy grid 104. High-frequency transformers may employ a multi-step process that involves converting the DC output to high-frequency AC, then back to DC, and then finally to the AC output provided to energy grid 104.

System 100 is shown to include a point of interconnection (POI) 110. POI 110 is the point at which campus 102, energy grid 104, and power inverter 106 are electrically connected. The power supplied to POI 110 from power inverter 106 is shown as $P_{sup}$. $P_{sup}$ may be defined as $P_{bat}+P_{loss}$, where $P_{batt}$ is the battery power and $P_{loss}$ is the power loss in the battery system (e.g., losses in power inverter 106 and/or battery 108). $P_{bat}$ and $P_{sup}$ may be positive if power inverter 106 is providing power to POI 110 or negative if power inverter 106 is receiving power from POI 110. $P_{campus}$ and $P_{sup}$ combine at POI 110 to form $P_{POI}$. $P_{POI}$ may be defined as the power provided to energy grid 104 from POI 110. $P_{POI}$ may be positive if POI 110 is providing power to energy grid 104 or negative if POI 110 is receiving power from energy grid 104.

Still referring to FIG. 1, system 100 is shown to include a frequency response controller 112. Controller 112 may be configured to generate and provide power setpoints to power inverter 106. Power inverter 106 may use the power setpoints to control the amount of power $P_{sup}$ provided to POI 110 or drawn from POI 110. For example, power inverter 106 may be configured to draw power from POI 110 and store the power in battery 108 in response to receiving a negative power setpoint from controller 112. Conversely, power inverter 106 may be configured to draw power from battery 108 and provide the power to POI 110 in response to receiving a positive power setpoint from controller 112. The magnitude of the power setpoint may define the amount of power $P_{sup}$ provided to or from power inverter 106. Controller 112 may be configured to generate and provide power setpoints that optimize the value of operating system 100 over a time horizon.

In some embodiments, frequency response controller 112 uses power inverter 106 and battery 108 to perform frequency regulation for energy grid 104. Frequency regulation is the process of maintaining the stability of the grid frequency (e.g., 60 Hz in the United States). The grid frequency may remain stable and balanced as long as the total electric supply and demand of energy grid 104 are balanced. Any deviation from that balance may result in a deviation of the grid frequency from its desirable value. For example, an increase in demand may cause the grid frequency to decrease, whereas an increase in supply may cause the grid frequency to increase. Frequency response controller 112 may be configured to offset a fluctuation in the grid frequency by causing power inverter 106 to supply energy from battery 108 to energy grid 104 (e.g., to offset a decrease in grid frequency) or store energy from energy grid 104 in battery 108 (e.g., to offset an increase in grid frequency).

In some embodiments, frequency response controller 112 uses power inverter 106 and battery 108 to perform load shifting for campus 102. For example, controller 112 may cause power inverter 106 to store energy in battery 108 when energy prices are low and retrieve energy from battery 108 when energy prices are high in order to reduce the cost of electricity required to power campus 102. Load shifting may also allow system 100 reduce the demand charge incurred. Demand charge is an additional charge imposed by some utility providers based on the maximum power consumption during an applicable demand charge period. For example, a demand charge rate may be specified in terms of dollars per unit of power (e.g., $/kW) and may be multiplied by the peak power usage (e.g., kW) during a demand charge period to calculate the demand charge. Load shifting may allow system 100 to smooth momentary spikes in the electric demand of campus 102 by drawing energy from battery 108 in order to reduce peak power draw from energy grid 104, thereby decreasing the demand charge incurred.

Still referring to FIG. 1, system 100 is shown to include an incentive provider 114. Incentive provider 114 may be a utility (e.g., an electric utility), a regional transmission organization (RTO), an independent system operator (ISO), or any other entity that provides incentives for performing frequency regulation. For example, incentive provider 114 may provide system 100 with monetary incentives for participating in a frequency response program. In order to participate in the frequency response program, system 100 may maintain a reserve capacity of stored energy (e.g., in battery 108) that can be provided to energy grid 104. System 100 may also maintain the capacity to draw energy from energy grid 104 and store the energy in battery 108. Reserving both of these capacities may be accomplished by managing the state-of-charge of battery 108.

Frequency response controller 112 may provide incentive provider 114 with a price bid and a capability bid. The price bid may include a price per unit power (e.g., $/MW) for reserving or storing power that allows system 100 to participate in a frequency response program offered by incentive provider 114. The price per unit power bid by frequency response controller 112 is referred to herein as the "capability price." The price bid may also include a price for actual performance, referred to herein as the "performance price." The capability bid may define an amount of power (e.g., MW) that system 100 will reserve or store in battery 108 to perform frequency response, referred to herein as the "capability bid."

Incentive provider 114 may provide frequency response controller 112 with a capability clearing price $CP_{cap}$, a performance clearing price $CP_{perf}$, and a regulation award $Reg_{award}$, which correspond to the capability price, the performance price, and the capability bid, respectively. In some embodiments, $CP_{cap}$, $CP_{perf}$, and $Reg_{award}$ are the same as the corresponding bids placed by controller 112. In other embodiments, $CP_{cap}$, $CP_{perf}$, and $Reg_{award}$ may not be the same as the bids placed by controller 112. For example, $CP_{cap}$, $CP_{perf}$, and $Reg_{award}$ may be generated by incentive provider 114 based on bids received from multiple participants in the frequency response program. Controller 112 may use $CP_{cap}$, $CP_{perf}$, and $Reg_{award}$ to perform frequency regulation.

Frequency response controller 112 is shown receiving a regulation signal from incentive provider 114. The regulation signal may specify a portion of the regulation award $Reg_{award}$ that frequency response controller 112 is to add or remove from energy grid 104. In some embodiments, the regulation signal is a normalized signal (e.g., between −1 and 1) specifying a proportion of $Reg_{award}$. Positive values of the regulation signal may indicate an amount of power to add to energy grid 104, whereas negative values of the regulation signal may indicate an amount of power to remove from energy grid 104.

Frequency response controller 112 may respond to the regulation signal by generating an optimal power setpoint for power inverter 106. The optimal power setpoint may take into account both the potential revenue from participating in the frequency response program and the costs of participation. Costs of participation may include, for example, a monetized cost of battery degradation as well as the energy and demand charges that will be incurred. The optimization may be performed using sequential quadratic programming, dynamic programming, or any other optimization technique.

In some embodiments, controller 112 uses a battery life model to quantify and monetize battery degradation as a function of the power setpoints provided to power inverter 106. Advantageously, the battery life model allows controller 112 to perform an optimization that weighs the revenue generation potential of participating in the frequency response program against the cost of battery degradation and other costs of participation (e.g., less battery power available for campus 102, increased electricity costs, etc.). An exemplary regulation signal and power response are described in greater detail with reference to FIG. 2.

Figure 2:
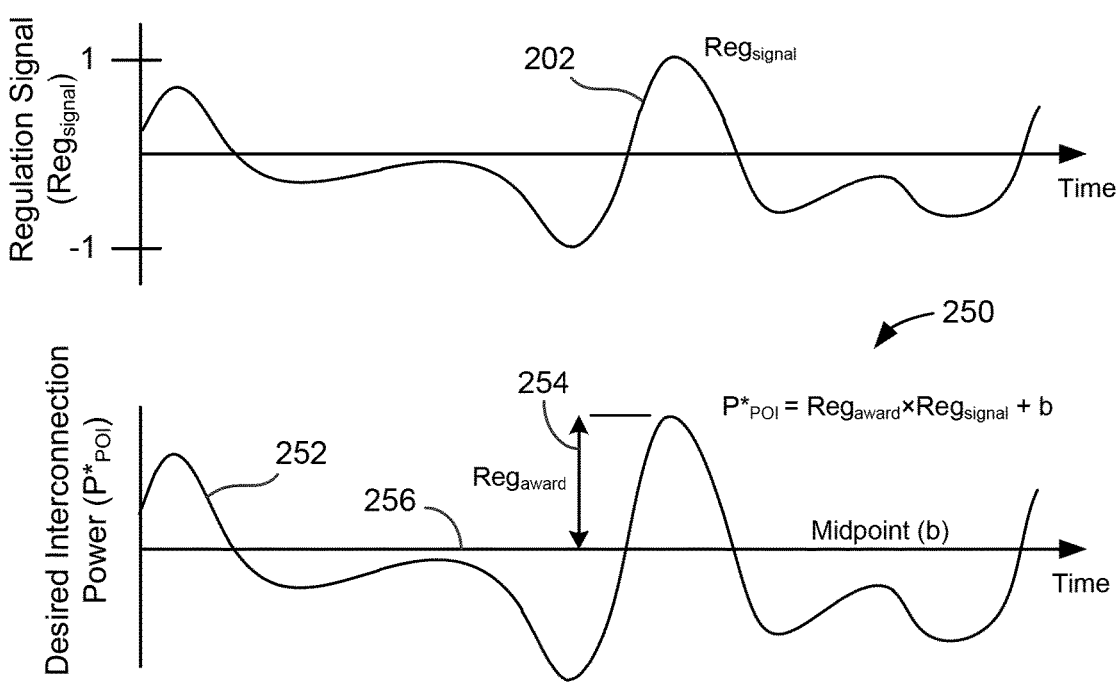
FIG. 2 is a graph of a regulation signal which may be provided to the system of FIG. 1 and a frequency response signal which may be generated by the system of FIG. 1, according to an exemplary embodiment.

Referring now to FIG. 2, a pair of frequency response graphs 200 and 250 are shown, according to an exemplary embodiment. Graph 200 illustrates a regulation signal $\text{Reg}_{signal}$ 202 as a function of time. $\text{Reg}_{signal}$ 202 is shown as a normalized signal ranging from −1 to 1 (i.e., $-1 \leq \text{Reg}_{signal} \leq 1$). $\text{Reg}_{signal}$ 202 may be generated by incentive provider 114 and provided to frequency response controller 112. $\text{Reg}_{signal}$ 202 may define a proportion of the regulation award $\text{Reg}_{award}$ 254 that controller 112 is to add or remove from energy grid 104, relative to a baseline value referred to as the midpoint b 256. For example, if the value of $\text{Reg}_{award}$ 254 is 10 MW, a regulation signal value of 0.5 (i.e., $\text{Reg}_{signal}=0.5$) may indicate that system 100 is requested to add 5 MW of power at POI 110 relative to midpoint b (e.g., $P^*_{POI}=10\text{MW}\times 0.5+b$), whereas a regulation signal value of −0.3 may indicate that system 100 is requested to remove 3 MW of power from POI 110 relative to midpoint b (e.g., $P^*_{POI}=10\text{MW}\times -0.3+b$).

Graph 250 illustrates the desired interconnection power $P^*_{POI}$ 252 as a function of time. $P^*_{POI}$ 252 may be calculated by frequency response controller 112 based on $\text{Reg}_{signal}$ 202, $\text{Reg}_{award}$ 254, and a midpoint b 256. For example, controller 112 may calculate $P^*_{POI}$ 252 using the following equation:

$$P^*_{POI}=\text{Reg}_{award}\times\text{Reg}_{signal}+b$$

where $P^*_{POI}$ represents the desired power at POI 110 (e.g., $P^*_{POI}=P_{sup}+P_{campus}$) and b is the midpoint. Midpoint b may be defined (e.g., set or optimized) by controller 112 and may represent the midpoint of regulation around which the load is modified in response to $\text{Reg}_{signal}$ 202. Optimal adjustment of midpoint b may allow controller 112 to actively participate in the frequency response market while also taking into account the energy and demand charge that will be incurred.

In order to participate in the frequency response market, controller 112 may perform several tasks. Controller 112 may generate a price bid (e.g., $/MW) that includes the capability price and the performance price. In some embodiments, controller 112 sends the price bid to incentive provider 114 at approximately 15:30 each day and the price bid remains in effect for the entirety of the next day. Prior to beginning a frequency response period, controller 112 may generate the capability bid (e.g., MW) and send the capability bid to incentive provider 114. In some embodiments, controller 112 generates and sends the capability bid to incentive provider 114 approximately 1.5 hours before a frequency response period begins. In an exemplary embodiment, each frequency response period has a duration of one hour; however, it is contemplated that frequency response periods may have any duration.

At the start of each frequency response period, controller 112 may generate the midpoint b around which controller 112 plans to perform frequency regulation. In some embodiments, controller 112 generates a midpoint b that will maintain battery 108 at a constant state-of-charge (SOC) (i.e. a midpoint that will result in battery 108 having the same SOC at the beginning and end of the frequency response period). In other embodiments, controller 112 generates midpoint b using an optimization procedure that allows the SOC of battery 108 to have different values at the beginning and end of the frequency response period. For example, controller 112 may use the SOC of battery 108 as a constrained variable that depends on midpoint b in order to optimize a value function that takes into account frequency response revenue, energy costs, and the cost of battery degradation. Exemplary techniques for calculating and/or optimizing midpoint b under both the constant SOC scenario and the variable SOC scenario are described in detail in U.S. patent application Ser. No. 15/247,883 filed Aug. 25, 2016, U.S. patent application Ser. No. 15/247,885 filed Aug. 25, 2016, and U.S. patent application Ser. No. 15/247,886 filed Aug. 25, 2016. The entire disclosure of each of these patent applications is incorporated by reference herein.

During each frequency response period, controller 112 may periodically generate a power setpoint for power inverter 106. For example, controller 112 may generate a power setpoint for each time step in the frequency response period. In some embodiments, controller 112 generates the power setpoints using the equation:

$$P^*_{POI}=\text{Reg}_{award}\times\text{Reg}_{signal}+b$$

where $P^*_{POI}=P_{sup}+P_{campus}$. Positive values of $P^*_{POI}$ indicate energy flow from POI 110 to energy grid 104. Positive values of $P_{sup}$ and $P_{campus}$ indicate energy flow to POI 110 from power inverter 106 and campus 102, respectively.

In other embodiments, controller 112 generates the power setpoints using the equation:

$$P^*_{POI}=\text{Reg}_{award}\times\text{Res}_{FR}+b$$

where $\text{Res}_{FR}$ is an optimal frequency response generated by optimizing a value function. Controller 112 may subtract $P_{campus}$ from $P^*_{POI}$ to generate the power setpoint for power inverter 106 (i.e., $P_{sup}=P^*_{POI}-P_{campus}$). The power setpoint for power inverter 106 indicates the amount of power that power inverter 106 is to add to POI 110 (if the power setpoint is positive) or remove from POI 110 (if the power setpoint is negative). Exemplary techniques which can be used by controller 112 to calculate power inverter setpoints are described in detail in U.S. patent application Ser. No. 15/247,793 filed Aug. 25, 2016, U.S. patent application Ser. No. 15/247,784 filed Aug. 25, 2016, and U.S. patent application Ser. No. 15/247,777 filed Aug. 25, 2016. The entire disclosure of each of these patent applications is incorporated by reference herein.

Photovoltaic Energy System with Frequency Regulation and Ramp Rate Control

Figure 3:
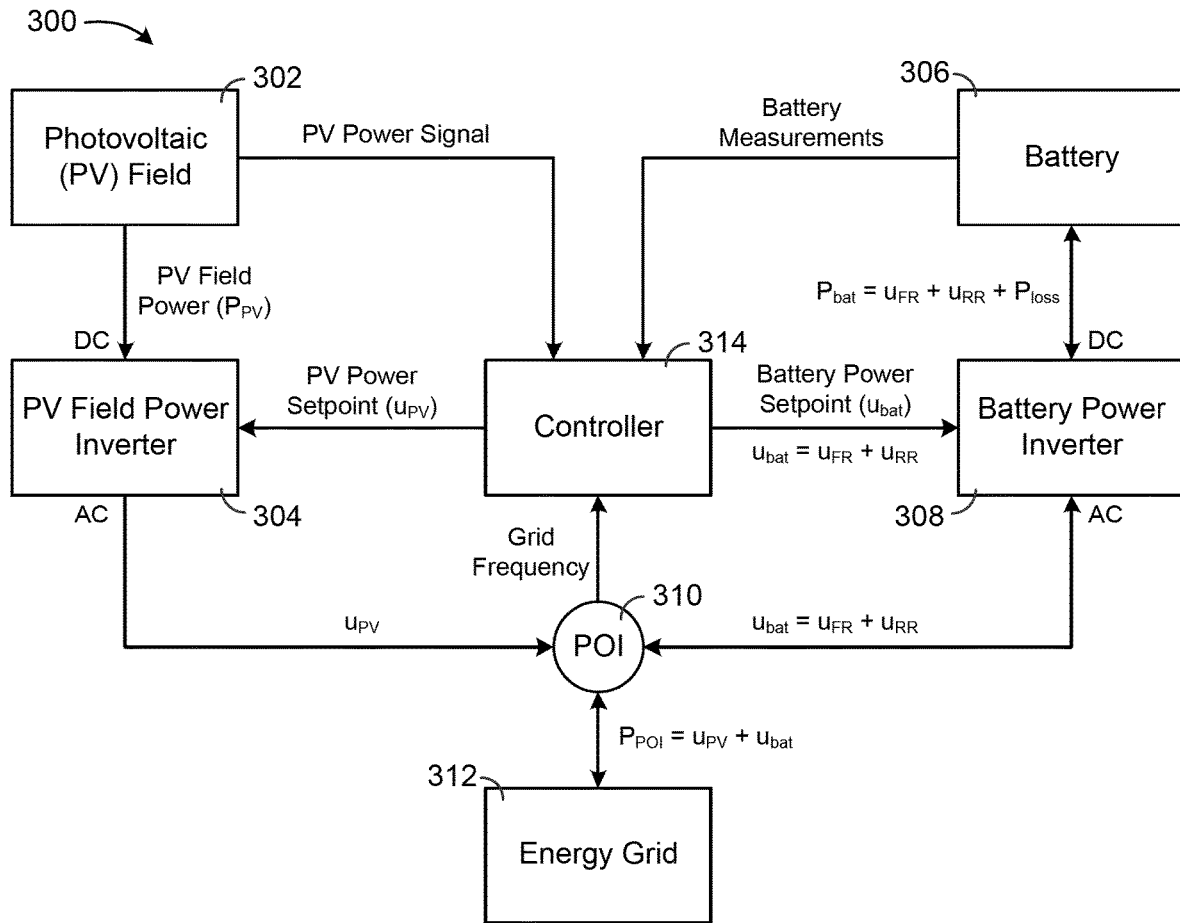
FIG. 3 is a block diagram of a photovoltaic energy system configured to simultaneously perform both ramp rate control and frequency regulation while maintaining the state-of-charge of a battery within a desired range, according to an exemplary embodiment.
Figure 4:
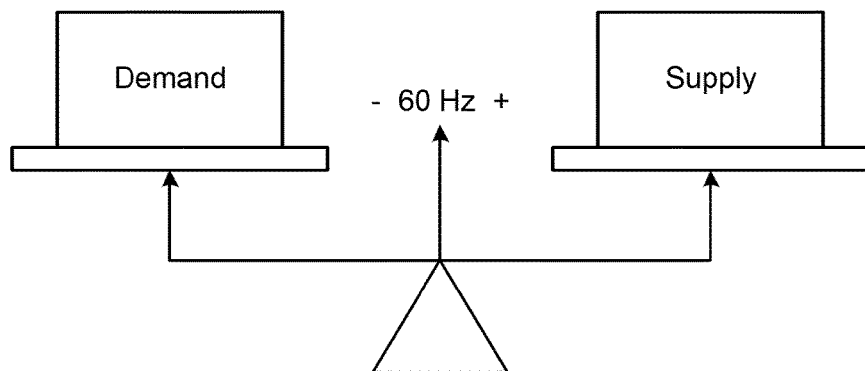
FIG. 4 is a drawing illustrating the electric supply to an energy grid and electric demand from the energy grid which must be balanced in order to maintain the grid frequency, according to an exemplary embodiment.

Referring now to FIGS. 3-4, a photovoltaic energy system 300 that uses battery storage to simultaneously perform both ramp rate control and frequency regulation is shown, according to an exemplary embodiment. Ramp rate control is the process of offsetting ramp rates (i.e., increases or decreases in the power output of an energy system such as a photovoltaic energy system) that fall outside of compliance limits determined by the electric power authority overseeing the energy grid. Ramp rate control typically requires the use of an energy source that allows for offsetting ramp rates by either supplying additional power to the grid or consuming more power from the grid. In some instances, a facility is penalized for failing to comply with ramp rate requirements.

Frequency regulation is the process of maintaining the stability of the grid frequency (e.g., 60 Hz in the United States). As shown in FIG. 4, the grid frequency may remain balanced at 60 Hz as long as there is a balance between the demand from the energy grid and the supply to the energy grid. An increase in demand yields a decrease in grid frequency, whereas an increase in supply yields an increase in grid frequency. During a fluctuation of the grid frequency, system 300 may offset the fluctuation by either drawing more energy from the energy grid (e.g., if the grid frequency is too high) or by providing energy to the energy grid (e.g., if the grid frequency is too low). Advantageously, system 300 may use battery storage in combination with photovoltaic power to perform frequency regulation while simultaneously complying with ramp rate requirements and maintaining the state-of-charge of the battery storage within a predetermined desirable range.

Referring particularly to FIG. 3, system 300 is shown to include a photovoltaic (PV) field 302, a PV field power inverter 304, a battery 306, a battery power inverter 308, a point of interconnection (POI) 310, and an energy grid 312. PV field 302 may include a collection of photovoltaic cells. The photovoltaic cells are configured to convert solar energy (i.e., sunlight) into electricity using a photovoltaic material such as monocrystalline silicon, polycrystalline silicon, amorphous silicon, cadmium telluride, copper indium gallium selenide/sulfide, or other materials that exhibit the photovoltaic effect. In some embodiments, the photovoltaic cells are contained within packaged assemblies that form solar panels. Each solar panel may include a plurality of linked photovoltaic cells. The solar panels may combine to form a photovoltaic array.

PV field 302 may have any of a variety of sizes and/or locations. In some embodiments, PV field 302 is part of a large-scale photovoltaic power station (e.g., a solar park or farm) capable of providing an energy supply to a large number of consumers. When implemented as part of a large-scale system, PV field 302 may cover multiple hectares and may have power outputs of tens or hundreds of megawatts. In other embodiments, PV field 302 may cover a smaller area and may have a relatively lesser power output (e.g., between one and ten megawatts, less than one megawatt, etc.). For example, PV field 302 may be part of a rooftop-mounted system capable of providing enough electricity to power a single home or building. It is contemplated that PV field 302 may have any size, scale, and/or power output, as may be desirable in different implementations.

PV field 302 may generate a direct current (DC) output that depends on the intensity and/or directness of the sunlight to which the solar panels are exposed. The directness of the sunlight may depend on the angle of incidence of the sunlight relative to the surfaces of the solar panels. The intensity of the sunlight may be affected by a variety of environmental factors such as the time of day (e.g., sunrises and sunsets) and weather variables such as clouds that cast shadows upon PV field 302. When PV field 302 is partially or completely covered by shadow, the power output of PV field 302 (i.e., PV field power $P_{PV}$) may drop as a result of the decrease in solar intensity.

In some embodiments, PV field 302 is configured to maximize solar energy collection. For example, PV field 302 may include a solar tracker (e.g., a GPS tracker, a sunlight sensor, etc.) that adjusts the angle of the solar panels so that the solar panels are aimed directly at the sun throughout the day. The solar tracker may allow the solar panels to receive direct sunlight for a greater portion of the day and may increase the total amount of power produced by PV field 302. In some embodiments, PV field 302 includes a collection of mirrors, lenses, or solar concentrators configured to direct and/or concentrate sunlight on the solar panels. The energy generated by PV field 302 may be stored in battery 306 or provided to energy grid 312.

Still referring to FIG. 3, system 300 is shown to include a PV field power inverter 304. Power inverter 304 may be configured to convert the DC output of PV field 302 $P_{PV}$ into an alternating current (AC) output that can be fed into energy grid 312 or used by a local (e.g., off-grid) electrical network. For example, power inverter 304 may be a solar inverter or grid-tie inverter configured to convert the DC output from PV field 302 into a sinusoidal AC output synchronized to the grid frequency of energy grid 312. In some embodiments, power inverter 304 receives a cumulative DC output from PV field 302. For example, power inverter 304 may be a string inverter or a central inverter. In other embodiments, power inverter 304 may include a collection of micro-inverters connected to each solar panel or solar cell. PV field power inverter 304 may convert the DC power output $P_{PV}$ into an AC power output $u_{PV}$ and provide the AC power output $u_{PV}$ to POI 310.

Power inverter 304 may receive the DC power output $P_{PV}$ from PV field 302 and convert the DC power output to an AC power output that can be fed into energy grid 312. Power inverter 304 may synchronize the frequency of the AC power output with that of energy grid 312 (e.g., 50 Hz or 60 Hz) using a local oscillator and may limit the voltage of the AC power output to no higher than the grid voltage. In some embodiments, power inverter 304 is a resonant inverter that includes or uses LC circuits to remove the harmonics from a simple square wave in order to achieve a sine wave matching the frequency of energy grid 312. In various embodiments, power inverter 304 may operate using high-frequency transformers, low-frequency transformers, or without transformers. Low-frequency transformers may convert the DC output from PV field 302 directly to the AC output provided to energy grid 312. High-frequency transformers may employ a multi-step process that involves converting the DC output to high-frequency AC, then back to DC, and then finally to the AC output provided to energy grid 312.

Power inverter 304 may be configured to perform maximum power point tracking and/or anti-islanding. Maximum power point tracking may allow power inverter 304 to produce the maximum possible AC power from PV field 302. For example, power inverter 304 may sample the DC power output from PV field 302 and apply a variable resistance to find the optimum maximum power point. Anti-islanding is a protection mechanism that immediately shuts down power inverter 304 (i.e., preventing power inverter 304 from generating AC power) when the connection to an electricity-consuming load no longer exists. In some embodiments, PV field power inverter 304 performs ramp rate control by limiting the power generated by PV field 302.

Still referring to FIG. 3, system 300 is shown to include a battery power inverter 308. Battery power inverter 308 may be configured to draw a DC power $P_{bat}$ from battery 306, convert the DC power $P_{bat}$ into an AC power $u_{bat}$, and provide the AC power $u_{bat}$ to POI 310. Battery power inverter 308 may also be configured to draw the AC power $u_{bat}$ from POI 310, convert the AC power $u_{bat}$ into a DC battery power $P_{bat}$, and store the DC battery power $P_{bat}$ in battery 306. The DC battery power $P_{bat}$ may be positive if battery 306 is providing power to battery power inverter 308 (i.e., if battery 306 is discharging) or negative if battery 306 is receiving power from battery power inverter 308 (i.e., if battery 306 is charging). Similarly, the AC battery power $u_{bat}$ may be positive if battery power inverter 308 is providing power to POI 310 or negative if battery power inverter 308 is receiving power from POI 310.

The AC battery power $u_{bat}$ is shown to include an amount of power used for frequency regulation (i.e., $u_{FR}$) and an amount of power used for ramp rate control (i.e., $u_{RR}$) which together form the AC battery power (i.e., $u_{bat}=u_{FR}+u_{RR}$). The DC battery power $P_{bat}$ is shown to include both $u_{FR}$ and $u_{RR}$ as well as an additional term $P_{loss}$ representing power losses in battery 306 and/or battery power inverter 308 (i.e., $P_{bat}=u_{FR}+u_{RR}+P_{loss}$). The PV field power $u_{PV}$ and the battery power $u_{bat}$ combine at POI 110 to form $P_{POI}$ (i.e., $P_{POI}=u_{PV}+u_{bat}$), which represents the amount of power provided to energy grid 312. $P_{POI}$ may be positive if POI 310 is providing power to energy grid 312 or negative if POI 310 is receiving power from energy grid 312.

Still referring to FIG. 3, system 300 is shown to include a controller 314. Controller 314 may be configured to generate a PV power setpoint $u_{PV}$ for PV field power inverter 304 and a battery power setpoint $u_{bat}$ for battery power inverter 308. Throughout this disclosure, the variable $u_{PV}$ is used to refer to both the PV power setpoint generated by controller 314 and the AC power output of PV field power inverter 304 since both quantities have the same value. Similarly, the variable $u_{bat}$ is used to refer to both the battery power setpoint generated by controller 314 and the AC power output/input of battery power inverter 308 since both quantities have the same value.

PV field power inverter 304 uses the PV power setpoint $u_{PV}$ to control an amount of the PV field power $P_{PV}$ to provide to POI 110. The magnitude of $u_{PV}$ may be the same as the magnitude of $P_{PV}$ or less than the magnitude of $P_{PV}$. For example, $u_{PV}$ may be the same as $P_{PV}$ if controller 314 determines that PV field power inverter 304 is to provide all of the photovoltaic power $P_{PV}$ to POI 310. However, $u_{PV}$ may be less than $P_{PV}$ if controller 314 determines that PV field power inverter 304 is to provide less than all of the photovoltaic power $P_{PV}$ to POI 310. For example, controller 314 may determine that it is desirable for PV field power inverter 304 to provide less than all of the photovoltaic power $P_{PV}$ to POI 310 to prevent the ramp rate from being exceeded and/or to prevent the power at POI 310 from exceeding a power limit.

Battery power inverter 308 uses the battery power setpoint $u_{bat}$ to control an amount of power charged or discharged by battery 306. The battery power setpoint $u_{bat}$ may be positive if controller 314 determines that battery power inverter 308 is to draw power from battery 306 or negative if controller 314 determines that battery power inverter 308 is to store power in battery 306. The magnitude of $u_{bat}$ controls the rate at which energy is charged or discharged by battery 306.

Controller 314 may generate $u_{PV}$ and $u_{bat}$ based on a variety of different variables including, for example, a power signal from PV field 302 (e.g., current and previous values for $P_{PV}$), the current state-of-charge (SOC) of battery 306, a maximum battery power limit, a maximum power limit at POI 310, the ramp rate limit, the grid frequency of energy grid 312, and/or other variables that can be used by controller 314 to perform ramp rate control and/or frequency regulation. Advantageously, controller 314 generates values for $u_{PV}$ and $u_{bat}$ that maintain the ramp rate of the PV power within the ramp rate compliance limit while participating in the regulation of grid frequency and maintaining the SOC of battery 306 within a predetermined desirable range.

An exemplary controller which can be used as controller 314 and exemplary processes which may be performed by controller 314 to generate the PV power setpoint $u_{PV}$ and the battery power setpoint $u_{bat}$ are described in detail in U.S. patent application Ser. No. 15/247,869 filed Aug. 25, 2016, U.S. patent application Ser. No. 15/247,844 filed Aug. 25, 2016, U.S. patent application Ser. No. 15/247,788 filed Aug. 25, 2016, U.S. patent application Ser. No. 15/247,872 filed Aug. 25, 2016, U.S. patent application Ser. No. 15/247,880 filed Aug. 25, 2016, and U.S. patent application Ser. No. 15/247,873 filed Aug. 25, 2016. The entire disclosure of each of these patent applications is incorporated by reference herein.

Energy Storage System with Thermal and Electrical Energy Storage

Figure 5A:
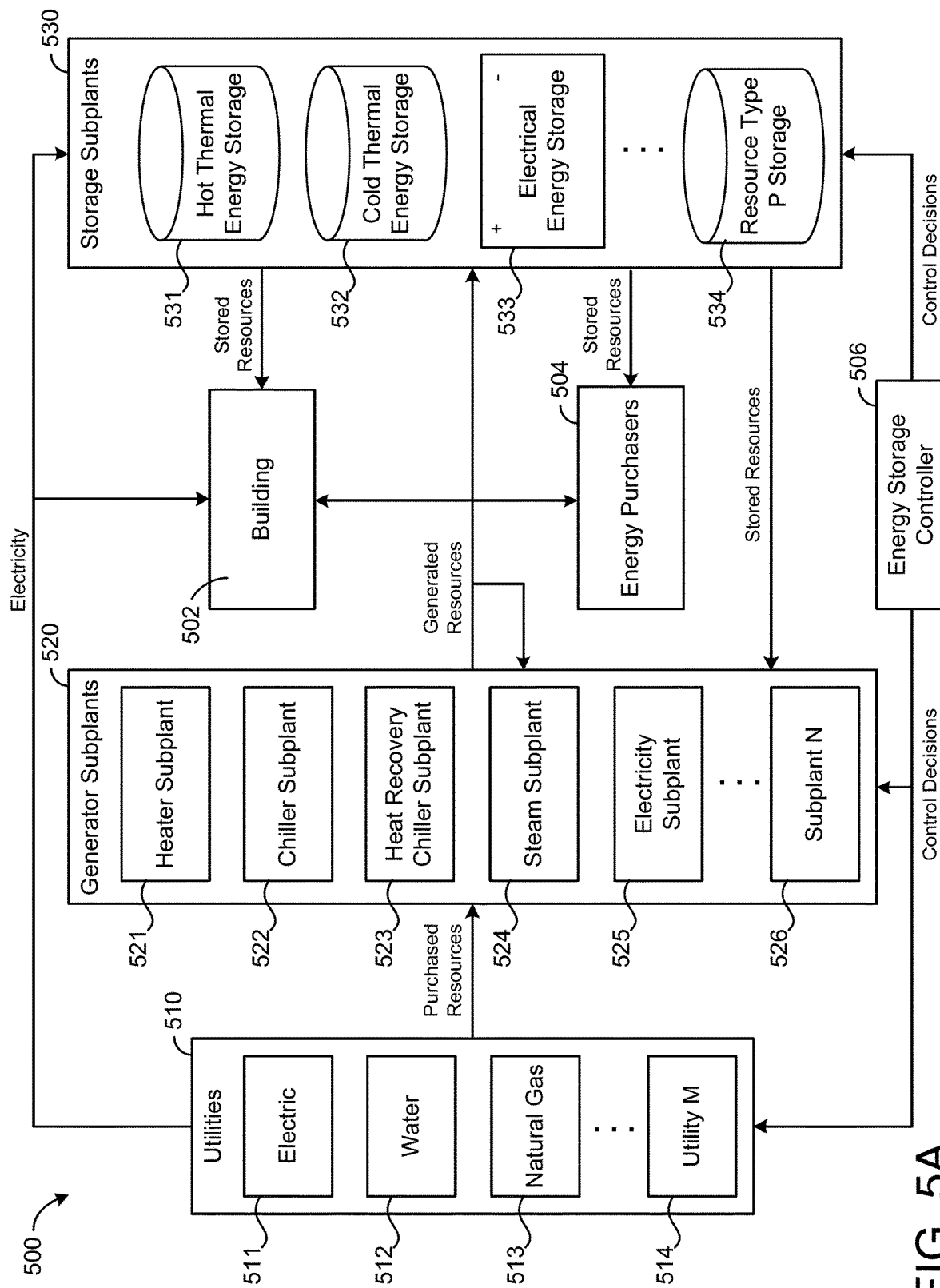
FIG. 5A is a block diagram of an energy storage system including thermal energy storage and electrical energy storage, according to an exemplary embodiment.

Referring now to FIG. 5A, a block diagram of an energy storage system 500 is shown, according to an exemplary embodiment. Energy storage system 500 is shown to include a building 502. Building 502 may be the same or similar to buildings 116, as described with reference to FIG. 1. For example, building 502 may be equipped with a HVAC system and/or a building management system that operates to control conditions within building 502. In some embodiments, building 502 includes multiple buildings (i.e., a campus) served by energy storage system 500. Building 502 may demand various resources including, for example, hot thermal energy (e.g., hot water), cold thermal energy (e.g., cold water), and/or electrical energy. The resources may be demanded by equipment or subsystems within building 502 or by external systems that provide services for building 502 (e.g., heating, cooling, air circulation, lighting, electricity, etc.). Energy storage system 500 operates to satisfy the resource demand associated with building 502.

Energy storage system 500 is shown to include a plurality of utilities 510. Utilities 510 may provide energy storage system 500 with resources such as electricity, water, natural gas, or any other resource that can be used by energy storage system 500 to satisfy the demand of building 502. For example, utilities 510 are shown to include an electric utility 511, a water utility 512, a natural gas utility 513, and utility M 514, where M is the total number of utilities 510. In some embodiments, utilities 510 are commodity suppliers from which resources and other types of commodities can be purchased. Resources purchased from utilities 510 can be used by generator subplants 520 to produce generated resources (e.g., hot water, cold water, electricity, steam, etc.), stored in storage subplants 530 for later use, or provided directly to building 502. For example, utilities 510 are shown providing electricity directly to building 502 and storage subplants 530.

Energy storage system 500 is shown to include a plurality of generator subplants 520. In some embodiments, generator subplants 520 are components of a central plant (e.g., central plant 118). Generator subplants 520 are shown to include a heater subplant 521, a chiller subplant 522, a heat recovery chiller subplant 523, a steam subplant 524, an electricity subplant 525, and subplant N, where N is the total number of generator subplants 520. Generator subplants 520 may be configured to convert one or more input resources into one or more output resources by operation of the equipment within generator subplants 520. For example, heater subplant 521 may be configured to generate hot thermal energy (e.g., hot water) by heating water using electricity or natural gas. Chiller subplant 522 may be configured to generate cold thermal energy (e.g., cold water) by chilling water using electricity. Heat recovery chiller subplant 523 may be configured to generate hot thermal energy and cold thermal energy by removing heat from one water supply and adding the heat to another water supply. Steam subplant 524 may be configured to generate steam by boiling water using electricity or natural gas. Electricity subplant 525 may be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by generator subplants 520 may be provided by utilities 510, retrieved from storage subplants 530, and/or generated by other generator subplants 520. For example, steam subplant 524 may produce steam as an output resource. Electricity subplant 525 may include a steam turbine that uses the steam generated by steam subplant 524 as an input resource to generate electricity. The output resources produced by generator subplants 520 may be stored in storage subplants 530, provided to building 502, sold to energy purchasers 504, and/or used by other generator subplants 520. For example, the electricity generated by electricity subplant 525 may be stored in electrical energy storage 533, used by chiller subplant 522 to generate cold thermal energy, provided to building 502, and/or sold to energy purchasers 504.

Energy storage system 500 is shown to include storage subplants 530. In some embodiments, storage subplants 530 are components of a central plant (e.g., central plant 118). Storage subplants 530 may be configured to store energy and other types of resources for later use. Each of storage subplants 530 may be configured to store a different type of resource. For example, storage subplants 530 are shown to include hot thermal energy storage 531 (e.g., one or more hot water storage tanks), cold thermal energy storage 532 (e.g., one or more cold thermal energy storage tanks), electrical energy storage 533 (e.g., one or more batteries), and resource type P storage 534, where P is the total number of storage subplants 530. The resources stored in subplants 530 may be purchased directly from utilities 510 or generated by generator subplants 520.

In some embodiments, storage subplants 530 are used by energy storage system 500 to take advantage of price-based demand response (PBDR) programs. PBDR programs encourage consumers to reduce consumption when generation, transmission, and distribution costs are high. PBDR programs are typically implemented (e.g., by utilities 510) in the form of energy prices that vary as a function of time. For example, utilities 510 may increase the price per unit of electricity during peak usage hours to encourage customers to reduce electricity consumption during peak times. Some utilities also charge consumers a separate demand charge based on the maximum rate of electricity consumption at any time during a predetermined demand charge period.

Advantageously, storing energy and other types of resources in subplants 530 allows for the resources to be purchased at times when the resources are relatively less expensive (e.g., during non-peak electricity hours) and stored for use at times when the resources are relatively more expensive (e.g., during peak electricity hours). Storing resources in subplants 530 also allows the resource demand of building 502 to be shifted in time. For example, resources can be purchased from utilities 510 at times when the demand for heating or cooling is low and immediately converted into hot or cold thermal energy by generator subplants 520. The thermal energy can be stored in storage subplants 530 and retrieved at times when the demand for heating or cooling is high. This allows energy storage system 500 to smooth the resource demand of building 502 and reduces the maximum required capacity of generator subplants 520. Smoothing the demand also allows energy storage system 500 to reduce the peak electricity consumption, which results in a lower demand charge.

In some embodiments, storage subplants 530 are used by energy storage system 500 to take advantage of incentive-based demand response (IBDR) programs. IBDR programs provide incentives to customers who have the capability to store energy, generate energy, or curtail energy usage upon request. Incentives are typically provided in the form of monetary revenue paid by utilities 510 or by an independent service operator (ISO). IBDR programs supplement traditional utility-owned generation, transmission, and distribution assets with additional options for modifying demand load curves. For example, stored energy can be sold to energy purchasers 504 (e.g., an energy grid) to supplement the energy generated by utilities 510. In some instances, incentives for participating in an IBDR program vary based on how quickly a system can respond to a request to change power output/consumption. Faster responses may be compensated at a higher level. Advantageously, electrical energy storage 533 allows system 500 to quickly respond to a request for electric power by rapidly discharging stored electrical energy to energy purchasers 504.

Still referring to FIG. 5A, energy storage system 500 is shown to include an energy storage controller 506. Energy storage controller 506 may be configured to control the distribution, production, storage, and usage of resources in energy storage system 500. In some embodiments, energy storage controller 506 performs an optimization process determine an optimal set of control decisions for each time step within an optimization period. The control decisions may include, for example, an optimal amount of each resource to purchase from utilities 510, an optimal amount of each resource to produce or convert using generator subplants 520, an optimal amount of each resource to store or remove from storage subplants 530, an optimal amount of each resource to sell to energy purchasers 504, and/or an optimal amount of each resource to provide to building 502. In some embodiments, the control decisions include an optimal amount of each input resource and output resource for each of generator subplants 520.

Controller 506 may be configured to maximize the economic value of operating energy storage system 500 over the duration of the optimization period. The economic value may be defined by a value function that expresses economic value as a function of the control decisions made by controller 506. The value function may account for the cost of resources purchased from utilities 510, revenue generated by selling resources to energy purchasers 504, and the cost of operating energy storage system 500. In some embodiments, the cost of operating energy storage system 500 includes a cost for losses in battery capacity as a result of the charging and discharging electrical energy storage 533. The cost of operating energy storage system 500 may also include a cost of excessive equipment start/stops during the optimization period.

Each of subplants 520-530 may include equipment that can be controlled by energy storage controller 506 to optimize the performance of energy storage system 500. Subplant equipment may include, for example, heating devices, chillers, heat recovery heat exchangers, cooling towers, energy storage devices, pumps, valves, and/or other devices of subplants 520-530. Individual devices of generator subplants 520 can be turned on or off to adjust the resource production of each generator subplant. In some embodiments, individual devices of generator subplants 520 can be operated at variable capacities (e.g., operating a chiller at 10% capacity or 60% capacity) according to an operating setpoint received from energy storage controller 506.

In some embodiments, one or more of subplants 520-530 includes a subplant level controller configured to control the equipment of the corresponding subplant. For example, energy storage controller 506 may determine an on/off configuration and global operating setpoints for the subplant equipment. In response to the on/off configuration and received global operating setpoints, the subplant controllers may turn individual devices of their respective equipment on or off, and implement specific operating setpoints (e.g., damper position, vane position, fan speed, pump speed, etc.) to reach or maintain the global operating setpoints.

In some embodiments, controller 506 maximizes the life cycle economic value of energy storage system 500 while participating in PBDR programs, IBDR programs, or simultaneously in both PBDR and IBDR programs. For the IBDR programs, controller 506 may use statistical estimates of past clearing prices, mileage ratios, and event probabilities to determine the revenue generation potential of selling stored energy to energy purchasers 504. For the PBDR programs, controller 506 may use predictions of ambient conditions, facility thermal loads, and thermodynamic models of installed equipment to estimate the resource consumption of subplants 520. Controller 506 may use predictions of the resource consumption to monetize the costs of running the equipment.

Controller 506 may automatically determine (e.g., without human intervention) a combination of PBDR and/or IBDR programs in which to participate over the optimization period in order to maximize economic value. For example, controller 506 may consider the revenue generation potential of IBDR programs, the cost reduction potential of PBDR programs, and the equipment maintenance/replacement costs that would result from participating in various combinations of the IBDR programs and PBDR programs. Controller 506 may weigh the benefits of participation against the costs of participation to determine an optimal combination of programs in which to participate. Advantageously, this allows controller 506 to determine an optimal set of control decisions that maximize the overall value of operating energy storage system 500.

In some instances, controller 506 may determine that it would be beneficial to participate in an IBDR program when the revenue generation potential is high and/or the costs of participating are low. For example, controller 506 may receive notice of a synchronous reserve event from an IBDR program which requires energy storage system 500 to shed a predetermined amount of power. Controller 506 may determine that it is optimal to participate in the IBDR program if cold thermal energy storage 532 has enough capacity to provide cooling for building 502 while the load on chiller subplant 522 is reduced in order to shed the predetermined amount of power.

In other instances, controller 506 may determine that it would not be beneficial to participate in an IBDR program when the resources required to participate are better allocated elsewhere. For example, if building 502 is close to setting a new peak demand that would greatly increase the PBDR costs, controller 506 may determine that only a small portion of the electrical energy stored in electrical energy storage 533 will be sold to energy purchasers 504 in order to participate in a frequency response market. Controller 506 may determine that the remainder of the electrical energy will be used to power chiller subplant 522 to prevent a new peak demand from being set.

In some embodiments, energy storage system 500 and controller include some or all of the components and/or features described in U.S. patent application Ser. No. 15/247,875 filed Aug. 25, 2016, U.S. patent application Ser. No. 15/247,879 filed Aug. 25, 2016, and U.S. patent application Ser. No. 15/247,881 filed Aug. 25, 2016. The entire disclosure of each of these patent applications is incorporated by reference herein.

Energy Cost Optimization System

Figure 5B:
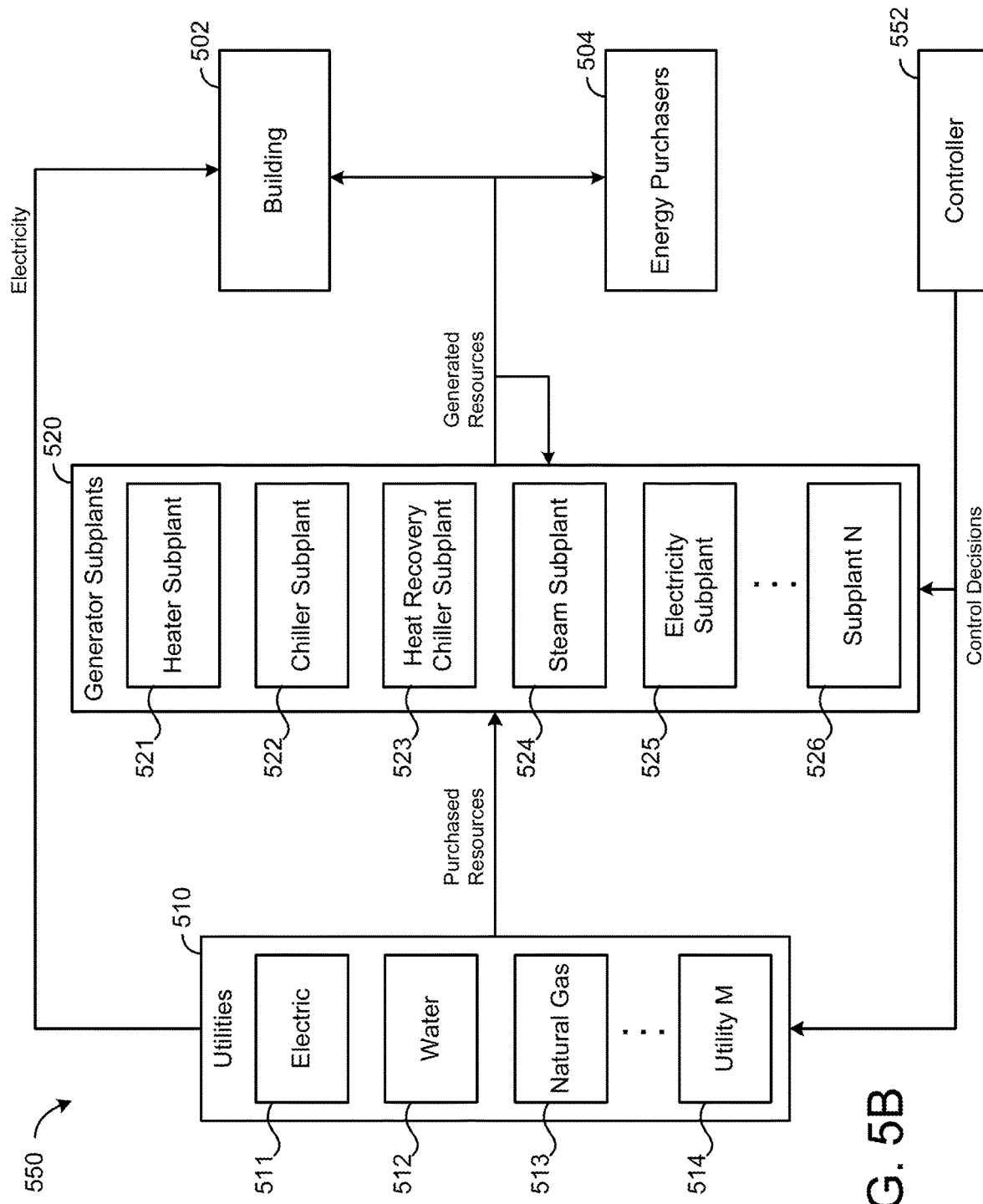
FIG. 5B is a block diagram of an energy cost optimization system without thermal or electrical energy storage, according to an exemplary embodiment.

Referring now to FIG. 5B, a block diagram of an energy cost optimization system 550 is shown, according to an exemplary embodiment. Energy cost optimization system 550 is shown to include many of the same components as energy storage system 500 (described with reference to FIG. 5A) with the exception of storage subplants 530. System 550 is an example of a system without thermal or electrical energy storage in which the peak load contribution cost optimization techniques can be implemented.

Energy cost optimization system 550 is shown to include a building 502. Building 502 may be the same or similar to buildings 116, as described with reference to FIG. 1. For example, building 502 may be equipped with a HVAC system and/or a building management system that operates to control conditions within building 502. In some embodiments, building 502 includes multiple buildings (i.e., a campus) served by energy cost optimization system 550. Building 502 may demand various resources including, for example, hot thermal energy (e.g., hot water), cold thermal energy (e.g., cold water), and/or electrical energy. The resources may be demanded by equipment or subsystems within building 502 or by external systems that provide services for building 502 (e.g., heating, cooling, air circulation, lighting, electricity, etc.). Energy cost optimization system 550 operates to satisfy the resource demand associated with building 502.

Energy cost optimization system 550 is shown to include a plurality of utilities 510. Utilities 510 may provide system 550 with resources such as electricity, water, natural gas, or any other resource that can be used by system 550 to satisfy the demand of building 502. For example, utilities 510 are shown to include an electric utility 511, a water utility 512, a natural gas utility 513, and utility M 514, where M is the total number of utilities 510. In some embodiments, utilities 510 are commodity suppliers from which resources and other types of commodities can be purchased. Resources purchased from utilities 510 can be used by generator subplants 520 to produce generated resources (e.g., hot water, cold water, electricity, steam, etc.) or provided directly to building 502. For example, utilities 510 are shown providing electricity directly to building 502.

Energy cost optimization system 550 is shown to include a plurality of generator subplants 520. Generator subplants 520 are shown to include a heater subplant 521, a chiller subplant 522, a heat recovery chiller subplant 523, a steam subplant 524, an electricity subplant 525, and subplant N, where N is the total number of generator subplants 520. Generator subplants 520 may be configured to convert one or more input resources into one or more output resources by operation of the equipment within generator subplants 520. For example, heater subplant 521 may be configured to generate hot thermal energy (e.g., hot water) by heating water using electricity or natural gas. Chiller subplant 522 may be configured to generate cold thermal energy (e.g., cold water) by chilling water using electricity. Heat recovery chiller subplant 523 may be configured to generate hot thermal energy and cold thermal energy by removing heat from one water supply and adding the heat to another water supply. Steam subplant 524 may be configured to generate steam by boiling water using electricity or natural gas. Electricity subplant 525 may be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by generator subplants 520 may be provided by utilities 510 and/or generated by other generator subplants 520. For example, steam subplant 524 may produce steam as an output resource. Electricity subplant 525 may include a steam turbine that uses the steam generated by steam subplant 524 as an input resource to generate electricity. The output resources produced by generator subplants 520 may be provided to building 502, sold to energy purchasers 504, and/or used by other generator subplants 520. For example, the electricity generated by electricity subplant 525 may be used by chiller subplant 522 to generate cold thermal energy, provided to building 502, and/or sold to energy purchasers 504.

Still referring to FIG. 5B, energy cost optimization system 550 is shown to include a controller 1000. Controller 1000 may be configured to control the distribution, production, and usage of resources in system 550. In some embodiments, controller 1000 performs an optimization process determine an optimal set of control decisions for each time step within an optimization period. The control decisions may include, for example, an optimal amount of each resource to purchase from utilities 510, an optimal amount of each resource to produce or convert using generator subplants 520, an optimal amount of each resource to sell to energy purchasers 504, and/or an optimal amount of each resource to provide to building 502. In some embodiments, the control decisions include an optimal amount of each input resource and output resource for each of generator subplants 520.

Controller 1000 may be configured to maximize the economic value of operating energy cost optimization system 550 over the duration of the optimization period. The economic value may be defined by a value function that expresses economic value as a function of the control decisions made by controller 1000. The value function may account for the cost of resources purchased from utilities 510, revenue generated by selling resources to energy purchasers 504, and the cost of operating system 550. In some embodiments, the cost of operating system 550 includes a cost of excessive equipment start/stops during the optimization period.

Each of subplants 520 may include equipment that can be controlled by controller 1000 to optimize the performance of system 550. Subplant equipment may include, for example, heating devices, chillers, heat recovery heat exchangers, cooling towers, pumps, valves, and/or other devices of subplants 520. Individual devices of generator subplants 520 can be turned on or off to adjust the resource production of each generator subplant. In some embodiments, individual devices of generator subplants 520 can be operated at variable capacities (e.g., operating a chiller at 10% capacity or 60% capacity) according to an operating setpoint received from controller 552.

In some embodiments, one or more of subplants 520 includes a subplant level controller configured to control the equipment of the corresponding subplant. For example, controller 552 may determine an on/off configuration and global operating setpoints for the subplant equipment. In response to the on/off configuration and received global operating setpoints, the subplant controllers may turn individual devices of their respective equipment on or off, and implement specific operating setpoints (e.g., damper position, vane position, fan speed, pump speed, etc.) to reach or maintain the global operating setpoints.

In some embodiments, energy cost optimization system 550 and controller 552 include some or all of the components and/or features described in U.S. patent application Ser. No. 15/247,875 filed Aug. 25, 2016, U.S. patent application Ser. No. 15/247,879 filed Aug. 25, 2016, and U.S. patent application Ser. No. 15/247,881 filed Aug. 25, 2016. The entire disclosure of each of these patent applications is incorporated by reference herein.

Energy Storage Controller

Figure 6A:
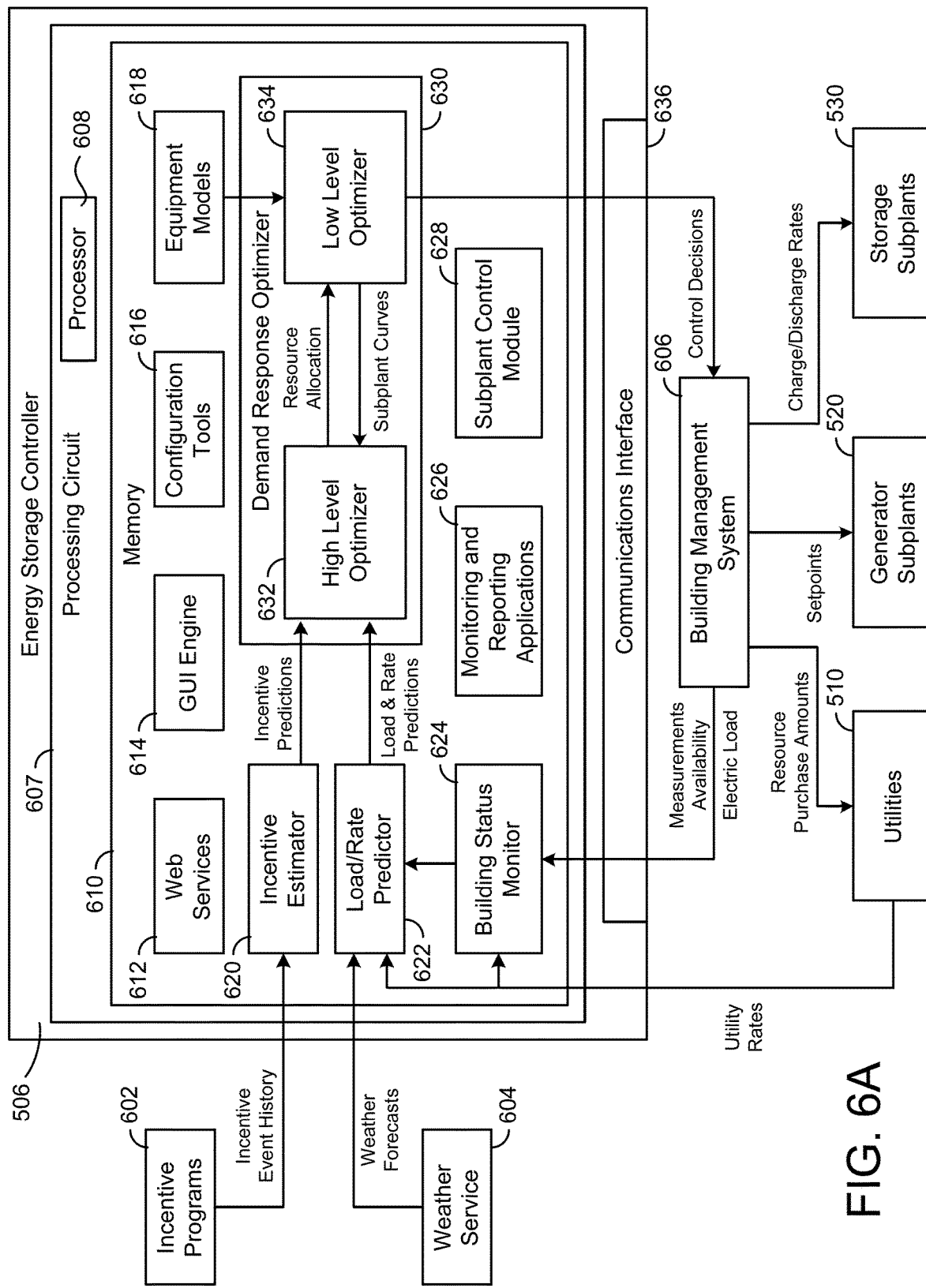
FIG. 6A is block diagram of an energy storage controller which may be used to operate the energy storage system of FIG. 5A, according to an exemplary embodiment.

Referring now to FIG. 6A, a block diagram illustrating energy storage controller 506 in greater detail is shown, according to an exemplary embodiment. Energy storage controller 506 is shown providing control decisions to a building management system (BMS) 606. In some embodiments, BMS 606 is the same or similar the BMS described with reference to FIG. 1. The control decisions provided to BMS 606 may include resource purchase amounts for utilities 510, setpoints for generator subplants 520, and/or charge/discharge rates for storage subplants 530.

BMS 606 may be configured to monitor conditions within a controlled building or building zone. For example, BMS 606 may receive input from various sensors (e.g., temperature sensors, humidity sensors, airflow sensors, voltage sensors, etc.) distributed throughout the building and may report building conditions to energy storage controller 506. Building conditions may include, for example, a temperature of the building or a zone of the building, a power consumption (e.g., electric load) of the building, a state of one or more actuators configured to affect a controlled state within the building, or other types of information relating to the controlled building. BMS 606 may operate subplants 520-530 to affect the monitored conditions within the building and to serve the thermal energy loads of the building.

BMS 606 may receive control signals from energy storage controller 506 specifying on/off states, charge/discharge rates, and/or setpoints for the subplant equipment. BMS 606 may control the equipment (e.g., via actuators, power relays, etc.) in accordance with the control signals provided by energy storage controller 506. For example, BMS 606 may operate the equipment using closed loop control to achieve the setpoints specified by energy storage controller 506. In various embodiments, BMS 606 may be combined with energy storage controller 506 or may be part of a separate building management system. According to an exemplary embodiment, BMS 606 is a METASYS® brand building management system, as sold by Johnson Controls, Inc.

Energy storage controller 506 may monitor the status of the controlled building using information received from BMS 606. Energy storage controller 506 may be configured to predict the thermal energy loads (e.g., heating loads, cooling loads, etc.) of the building for plurality of time steps in an optimization period (e.g., using weather forecasts from a weather service 604). Energy storage controller 506 may also predict the revenue generation potential of IBDR programs using an incentive event history (e.g., past clearing prices, mileage ratios, event probabilities, etc.) from incentive programs 602. Energy storage controller 506 may generate control decisions that optimize the economic value of operating energy storage system 500 over the duration of the optimization period subject to constraints on the optimization process (e.g., energy balance constraints, load satisfaction constraints, etc.). The optimization process performed by energy storage controller 506 is described in greater detail below.

According to an exemplary embodiment, energy storage controller 506 is integrated within a single computer (e.g., one server, one housing, etc.). In various other exemplary embodiments, energy storage controller 506 can be distributed across multiple servers or computers (e.g., that can exist in distributed locations). In another exemplary embodiment, energy storage controller 506 may be integrated with a smart building manager that manages multiple building systems and/or combined with BMS 606.

Energy storage controller 506 is shown to include a communications interface 636 and a processing circuit 607. Communications interface 636 may include wired or wireless interfaces (e.g., jacks, antennas, transmitters, receivers, transceivers, wire terminals, etc.) for conducting data communications with various systems, devices, or networks. For example, communications interface 636 may include an Ethernet card and port for sending and receiving data via an Ethernet-based communications network and/or a WiFi transceiver for communicating via a wireless communications network. Communications interface 636 may be configured to communicate via local area networks or wide area networks (e.g., the Internet, a building WAN, etc.) and may use a variety of communications protocols (e.g., BACnet, IP, LON, etc.).

Communications interface 636 may be a network interface configured to facilitate electronic data communications between energy storage controller 506 and various external systems or devices (e.g., BMS 606, subplants 520-530, utilities 510, etc.). For example, energy storage controller 506 may receive information from BMS 606 indicating one or more measured states of the controlled building (e.g., temperature, humidity, electric loads, etc.) and one or more states of subplants 520-530 (e.g., equipment status, power consumption, equipment availability, etc.). Communications interface 636 may receive inputs from BMS 606 and/or subplants 520-530 and may provide operating parameters (e.g., on/off decisions, setpoints, etc.) to subplants 520-530 via BMS 606. The operating parameters may cause subplants 520-530 to activate, deactivate, or adjust a setpoint for various devices thereof.

Still referring to FIG. 6A, processing circuit 607 is shown to include a processor 608 and memory 610. Processor 608 may be a general purpose or specific purpose processor, an application specific integrated circuit (ASIC), one or more field programmable gate arrays (FPGAs), a group of processing components, or other suitable processing components. Processor 608 may be configured to execute computer code or instructions stored in memory 610 or received from other computer readable media (e.g., CDROM, network storage, a remote server, etc.).

Memory 610 may include one or more devices (e.g., memory units, memory devices, storage devices, etc.) for storing data and/or computer code for completing and/or facilitating the various processes described in the present disclosure. Memory 610 may include random access memory (RAM), read-only memory (ROM), hard drive storage, temporary storage, non-volatile memory, flash memory, optical memory, or any other suitable memory for storing software objects and/or computer instructions. Memory 610 may include database components, object code components, script components, or any other type of information structure for supporting the various activities and information structures described in the present disclosure. Memory 610 may be communicably connected to processor 608 via processing circuit 607 and may include computer code for executing (e.g., by processor 608) one or more processes described herein.

Memory 610 is shown to include a building status monitor 624. Energy storage controller 506 may receive data regarding the overall building or building space to be heated or cooled by system 500 via building status monitor 624. In an exemplary embodiment, building status monitor 624 may include a graphical user interface component configured to provide graphical user interfaces to a user for selecting building requirements (e.g., overall temperature parameters, selecting schedules for the building, selecting different temperature levels for different building zones, etc.).

Energy storage controller 506 may determine on/off configurations and operating setpoints to satisfy the building requirements received from building status monitor 624. In some embodiments, building status monitor 624 receives, collects, stores, and/or transmits cooling load requirements, building temperature setpoints, occupancy data, weather data, energy data, schedule data, and other building parameters. In some embodiments, building status monitor 624 stores data regarding energy costs, such as pricing information available from utilities 510 (energy charge, demand charge, etc.).

Still referring to FIG. 6A, memory 610 is shown to include a load/rate predictor 622. Load/rate predictor 622 may be configured to predict the thermal energy loads ($\hat{l}_k$) of the building or campus for each time step k (e.g., k=1 . . . n) of an optimization period. Load/rate predictor 622 is shown receiving weather forecasts from a weather service 604. In some embodiments, load/rate predictor 622 predicts the thermal energy loads $\hat{l}_k$ as a function of the weather forecasts. In some embodiments, load/rate predictor 622 uses feedback from BMS 606 to predict loads $\hat{l}_k$. Feedback from BMS 606 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 622 receives a measured electric load and/or previous measured load data from BMS 606 (e.g., via building status monitor 624). Load/rate predictor 622 may predict loads $\hat{l}_k$ as a function of a given weather forecast ($\hat{\phi}_w$), a day type (day), the time of day (t), and previous measured load data ($Y_{k-1}$). Such a relationship is expressed in the following equation:

$$\hat{l}_k = f(\hat{\phi}_w, day, t | Y_{k-1})$$

In some embodiments, load/rate predictor 622 uses a deterministic plus stochastic model trained from historical load data to predict loads $\hat{l}_k$. Load/rate predictor 622 may use any of a variety of prediction methods to predict loads $\hat{l}_k$ (e.g., linear regression for the deterministic portion and an AR model for the stochastic portion). Load/rate predictor 622 may predict one or more different types of loads for the building or campus. For example, load/rate predictor 622 may predict a hot water load $\hat{l}_{Hot,k}$ and a cold water load $\hat{l}_{Cold,k}$ for each time step k within the prediction window. In some embodiments, load/rate predictor 622 makes load/rate predictions using the techniques described in U.S. patent application Ser. No. 14/717,593.

Load/rate predictor 622 is shown receiving utility rates from utilities 510. Utility rates may indicate a cost or price per unit of a resource (e.g., electricity, natural gas, water, etc.) provided by utilities 510 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 510 or predicted utility rates estimated by load/rate predictor 622.

In some embodiments, the utility rates include demand charges for one or more resources provided by utilities 510. A demand charge may define a separate cost imposed by utilities 510 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, demand response optimizer 630 may be configured to account for demand charges in the high level optimization process performed by high level optimizer 632. Utilities 510 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 622 may store the predicted loads $\hat{l}_k$ and the utility rates in memory 610 and/or provide the predicted loads $\hat{l}_k$ and the utility rates to demand response optimizer 630.

Still referring to FIG. 6A, memory 610 is shown to include an incentive estimator 620. Incentive estimator 620 may be configured to estimate the revenue generation potential of participating in various incentive-based demand response (IBDR) programs. In some embodiments, incentive estimator 620 receives an incentive event history from incentive programs 602. The incentive event history may include a history of past IBDR events from incentive programs 602. An IBDR event may include an invitation from incentive programs 602 to participate in an IBDR program in exchange for a monetary incentive. The incentive event history may indicate the times at which the past IBDR events occurred and attributes describing the IBDR events (e.g., clearing prices, mileage ratios, participation requirements, etc.). Incentive estimator 620 may use the incentive event history to estimate IBDR event probabilities during the optimization period.

Incentive estimator 620 is shown providing incentive predictions to demand response optimizer 630. The incentive predictions may include the estimated IBDR probabilities, estimated participation requirements, an estimated amount of revenue from participating in the estimated IBDR events, and/or any other attributes of the predicted IBDR events. Demand response optimizer 630 may use the incentive predictions along with the predicted loads $\hat{l}_k$ and utility rates from load/rate predictor 622 to determine an optimal set of control decisions for each time step within the optimization period.

Still referring to FIG. 6A, memory 610 is shown to include a demand response optimizer 630. Demand response optimizer 630 may perform a cascaded optimization process to optimize the performance of energy storage system 500. For example, demand response optimizer 630 is shown to include a high level optimizer 632 and a low level optimizer 634. High level optimizer 632 may control an outer (e.g., subplant level) loop of the cascaded optimization. High level optimizer 632 may determine an optimal set of control decisions for each time step in the prediction window in order to optimize (e.g., maximize) the value of operating energy storage system 500. Control decisions made by high level optimizer 632 may include, for example, load setpoints for each of generator subplants 520, charge/discharge rates for each of storage subplants 530, resource purchase amounts for each type of resource purchased from utilities 510, and/or an amount of each resource sold to energy purchasers 504. In other words, the control decisions may define resource allocation at each time step. The control decisions made by high level optimizer 632 are based on the statistical estimates of incentive event probabilities and revenue generation potential for various IBDR events as well as the load and rate predictions.

Low level optimizer 634 may control an inner (e.g., equipment level) loop of the cascaded optimization. Low level optimizer 634 may determine how to best run each subplant at the load setpoint determined by high level optimizer 632. For example, low level optimizer 634 may determine on/off states and/or operating setpoints for various devices of the subplant equipment in order to optimize (e.g., minimize) the energy consumption of each subplant while meeting the resource allocation setpoint for the subplant. In some embodiments, low level optimizer 634 receives actual incentive events from incentive programs 602. Low level optimizer 634 may determine whether to participate in the incentive events based on the resource allocation set by high level optimizer 632. For example, if insufficient resources have been allocated to a particular IBDR program by high level optimizer 632 or if the allocated resources have already been used, low level optimizer 634 may determine that energy storage system 500 will not participate in the IBDR program and may ignore the IBDR event. However, if the required resources have been allocated to the IBDR program and are available in storage subplants 530, low level optimizer 634 may determine that system 500 will participate in the IBDR program in response to the IBDR event. The cascaded optimization process performed by demand response optimizer 630 is described in greater detail in U.S. patent application Ser. No. 15/247,885.

Still referring to FIG. 6A, memory 610 is shown to include a subplant control module 628. Subplant control module 628 may store historical data regarding past operating statuses, past operating setpoints, and instructions for calculating and/or implementing control parameters for subplants 520-530. Subplant control module 628 may also receive, store, and/or transmit data regarding the conditions of individual devices of the subplant equipment, such as operating efficiency, equipment degradation, a date since last service, a lifespan parameter, a condition grade, or other device-specific data. Subplant control module 628 may receive data from subplants 520-530 and/or BMS 606 via communications interface 636. Subplant control module 628 may also receive and store on/off statuses and operating setpoints from low level optimizer 634.

Data and processing results from demand response optimizer 630, subplant control module 628, or other modules of energy storage controller 506 may be accessed by (or pushed to) monitoring and reporting applications 626. Monitoring and reporting applications 626 may be configured to generate real time "system health" dashboards that can be viewed and navigated by a user (e.g., a system engineer). For example, monitoring and reporting applications 626 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across energy storage systems in different buildings (real or modeled), different campuses, or the like. Other GUI elements or reports may be generated and shown based on available data that allow users to assess performance across one or more energy storage systems from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the energy storage system.

Still referring to FIG. 6A, energy storage controller 506 may include one or more GUI servers, web services 612, or GUI engines 614 to support monitoring and reporting applications 626. In various embodiments, applications 626, web services 612, and GUI engine 614 may be provided as separate components outside of energy storage controller 506 (e.g., as part of a smart building manager). Energy storage controller 506 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. Energy storage controller 506 may be configured to provide the results of any such processing to other databases, tables, XML files, or other data structures for further querying, calculation, or access by, for example, external monitoring and reporting applications.

Energy storage controller 506 is shown to include configuration tools 616. Configuration tools 616 can allow a user to define (e.g., via graphical user interfaces, via prompt-driven "wizards," etc.) how energy storage controller 506 should react to changing conditions in the energy storage subsystems. In an exemplary embodiment, configuration tools 616 allow a user to build and store condition-response scenarios that can cross multiple energy storage system devices, multiple building systems, and multiple enterprise control applications (e.g., work order management system applications, entity resource planning applications, etc.). For example, configuration tools 616 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 616 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Energy Cost Optimization Controller

Figure 6B:
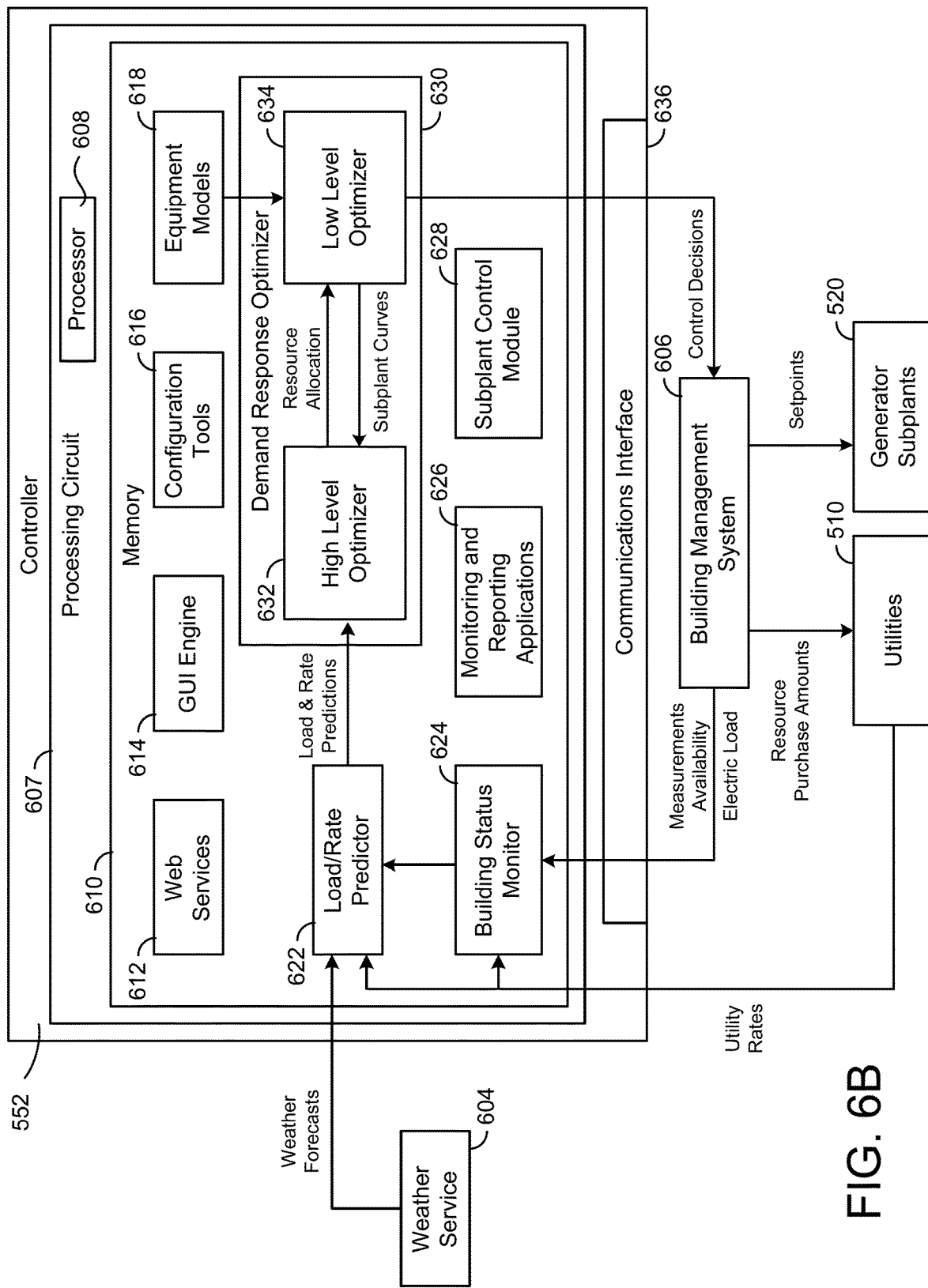
FIG. 6B is a block diagram of a controller which may be used to operate the energy cost optimization system of FIG. 5B, according to an exemplary embodiment.

Referring now to FIG. 6B, a block diagram illustrating controller 552 in greater detail is shown, according to an exemplary embodiment. Controller 552 is shown providing control decisions to a building management system (BMS) 606. In some embodiments, BMS 606 is the same or similar the BMS described with reference to FIG. 1. The control decisions provided to BMS 606 may include resource purchase amounts for utilities 510 and/or setpoints for generator subplants 520.

BMS 606 may be configured to monitor conditions within a controlled building or building zone. For example, BMS 606 may receive input from various sensors (e.g., temperature sensors, humidity sensors, airflow sensors, voltage sensors, etc.) distributed throughout the building and may report building conditions to controller 552. Building conditions may include, for example, a temperature of the building or a zone of the building, a power consumption (e.g., electric load) of the building, a state of one or more actuators configured to affect a controlled state within the building, or other types of information relating to the controlled building. BMS 606 may operate subplants 520 to affect the monitored conditions within the building and to serve the thermal energy loads of the building.

BMS 606 may receive control signals from controller 552 specifying on/off states and/or setpoints for the subplant equipment. BMS 606 may control the equipment (e.g., via actuators, power relays, etc.) in accordance with the control signals provided by controller 552. For example, BMS 606 may operate the equipment using closed loop control to achieve the setpoints specified by energy storage controller 552. In various embodiments, BMS 606 may be combined with controller 552 or may be part of a separate building management system. According to an exemplary embodiment, BMS 606 is a METASYS® brand building management system, as sold by Johnson Controls, Inc.

Controller 552 may monitor the status of the controlled building using information received from BMS 606. Controller 552 may be configured to predict the thermal energy loads (e.g., heating loads, cooling loads, etc.) of the building for plurality of time steps in an optimization period (e.g., using weather forecasts from a weather service 604). Controller 552 may generate control decisions that optimize the economic value of operating system 550 over the duration of the optimization period subject to constraints on the optimization process (e.g., energy balance constraints, load satisfaction constraints, etc.). The optimization process performed by controller 552 is described in greater detail below.

Controller 552 is shown to include a communications interface 636 and a processing circuit 607 having a processor 608 and memory 610. These components may be the same as described with reference to FIG. 6A. For example, controller 552 is shown to include demand response optimizer 630. Demand response optimizer 630 may perform a cascaded optimization process to optimize the performance of system 550. For example, demand response optimizer 630 is shown to include a high level optimizer 632 and a low level optimizer 634. High level optimizer 632 may control an outer (e.g., subplant level) loop of the cascaded optimization. High level optimizer 632 may determine an optimal set of control decisions for each time step in the prediction window in order to optimize (e.g., maximize) the value of operating energy storage system 500. Control decisions made by high level optimizer 632 may include, for example, load setpoints for each of generator subplants 520, resource purchase amounts for each type of resource purchased from utilities 510, and/or an amount of each resource sold to energy purchasers 504. In other words, the control decisions may define resource allocation at each time step.

Low level optimizer 634 may control an inner (e.g., equipment level) loop of the cascaded optimization. Low level optimizer 634 may determine how to best run each subplant at the load setpoint determined by high level optimizer 632. For example, low level optimizer 634 may determine on/off states and/or operating setpoints for various devices of the subplant equipment in order to optimize (e.g., minimize) the energy consumption of each subplant while meeting the resource allocation setpoint for the subplant. The cascaded optimization process performed by demand response optimizer 630 is described in greater detail in U.S. patent application Ser. No. 15/247,885. These and other components of controller 552 may be the same as previously described with reference to FIG. 6A.

Planning Tool

Figure 7:
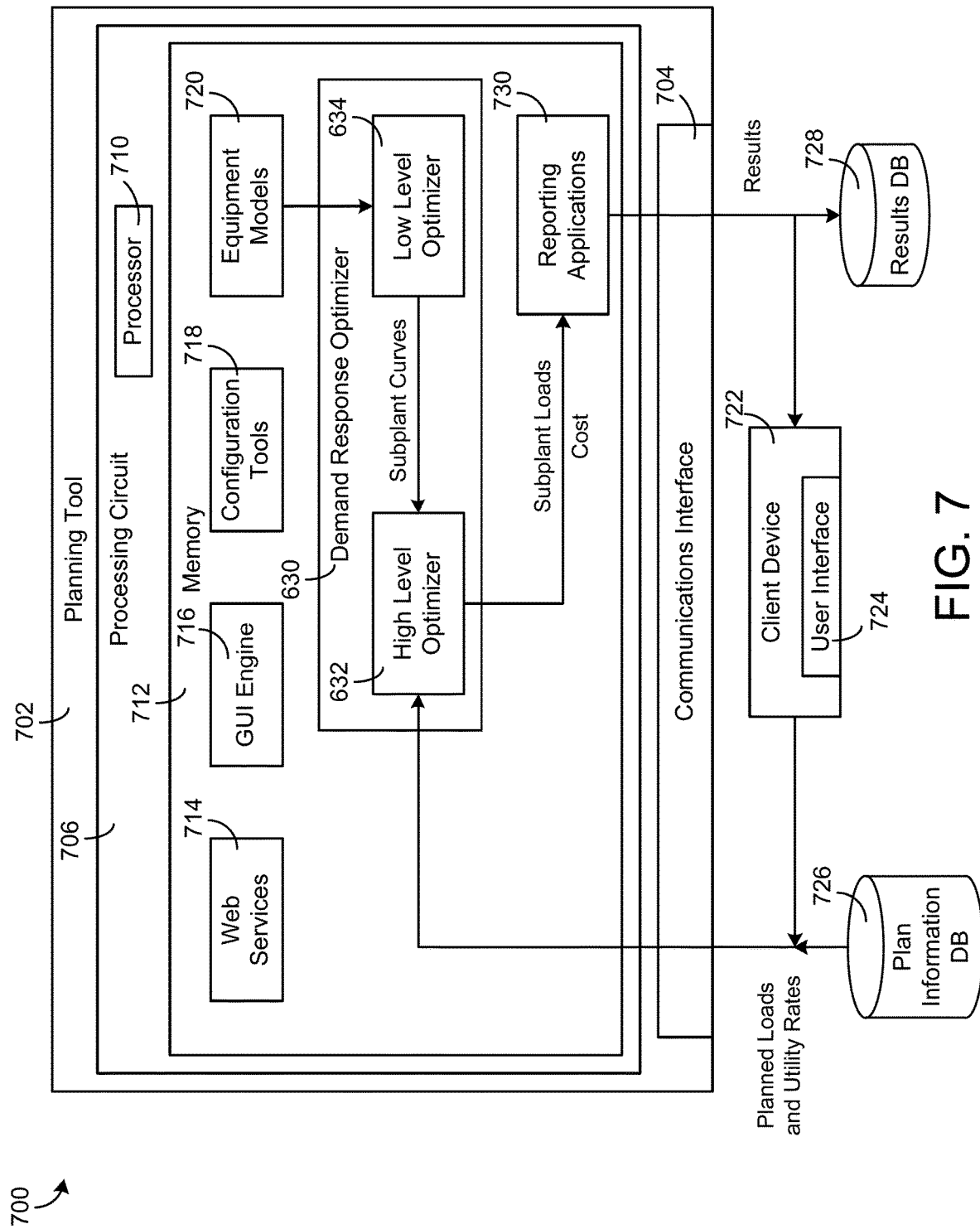
FIG. 7 is a block diagram of a planning tool which can be used to determine the benefits of investing in a battery asset and calculate various financial metrics associated with the investment, according to an exemplary embodiment.

Referring now to FIG. 7, a block diagram of a planning system 700 is shown, according to an exemplary embodiment. Planning system 700 may be configured to use demand response optimizer 630 as part of a planning tool 702 to simulate the operation of a central plant over a predetermined time period (e.g., a day, a month, a week, a year, etc.) for planning, budgeting, and/or design considerations. When implemented in planning tool 702, demand response optimizer 630 may operate in a similar manner as described with reference to FIGS. 6A-6B. For example, demand response optimizer 630 may use building loads and utility rates to determine an optimal resource allocation to minimize cost over a simulation period. However, planning tool 702 may not be responsible for real-time control of a building management system or central plant.

Planning tool 702 can be configured to determine the benefits of investing in a battery asset and the financial metrics associated with the investment. Such financial metrics can include, for example, the internal rate of return (IRR), net present value (NPV), and/or simple payback period (SPP). Planning tool 702 can also assist a user in determining the size of the battery which yields optimal financial metrics such as maximum NPV or a minimum SPP. In some embodiments, planning tool 702 allows a user to specify a battery size and automatically determines the benefits of the battery asset from participating in selected IBDR programs while performing PBDR, as described with reference to FIG. 5A. In some embodiments, planning tool 702 is configured to determine the battery size that minimizes SPP given the IBDR programs selected and the requirement of performing PBDR. In some embodiments, planning tool 702 is configured to determine the battery size that maximizes NPV given the IBDR programs selected and the requirement of performing PBDR.

In planning tool 702, high level optimizer 632 may receive planned loads and utility rates for the entire simulation period. The planned loads and utility rates may be defined by input received from a user via a client device 722 (e.g., user-defined, user selected, etc.) and/or retrieved from a plan information database 726. High level optimizer 632 uses the planned loads and utility rates in conjunction with subplant curves from low level optimizer 634 to determine an optimal resource allocation (i.e., an optimal dispatch schedule) for a portion of the simulation period.

The portion of the simulation period over which high level optimizer 632 optimizes the resource allocation may be defined by a prediction window ending at a time horizon. With each iteration of the optimization, the prediction window is shifted forward and the portion of the dispatch schedule no longer in the prediction window is accepted (e.g., stored or output as results of the simulation). Load and rate predictions may be predefined for the entire simulation and may not be subject to adjustments in each iteration. However, shifting the prediction window forward in time may introduce additional plan information (e.g., planned loads and/or utility rates) for the newly-added time slice at the end of the prediction window. The new plan information may not have a significant effect on the optimal dispatch schedule since only a small portion of the prediction window changes with each iteration.

In some embodiments, high level optimizer 632 requests all of the subplant curves used in the simulation from low level optimizer 634 at the beginning of the simulation. Since the planned loads and environmental conditions are known for the entire simulation period, high level optimizer 632 may retrieve all of the relevant subplant curves at the beginning of the simulation. In some embodiments, low level optimizer 634 generates functions that map subplant production to equipment level production and resource use when the subplant curves are provided to high level optimizer 632. These subplant to equipment functions may be used to calculate the individual equipment production and resource use (e.g., in a post-processing module) based on the results of the simulation.

Still referring to FIG. 7, planning tool 702 is shown to include a communications interface 704 and a processing circuit 706. Communications interface 704 may include wired or wireless interfaces (e.g., jacks, antennas, transmitters, receivers, transceivers, wire terminals, etc.) for conducting data communications with various systems, devices, or networks. For example, communications interface 704 may include an Ethernet card and port for sending and receiving data via an Ethernet-based communications network and/or a WiFi transceiver for communicating via a wireless communications network. Communications interface 704 may be configured to communicate via local area networks or wide area networks (e.g., the Internet, a building WAN, etc.) and may use a variety of communications protocols (e.g., BACnet, IP, LON, etc.).

Communications interface 704 may be a network interface configured to facilitate electronic data communications between planning tool 702 and various external systems or devices (e.g., client device 722, results database 728, plan information database 726, etc.). For example, planning tool 702 may receive planned loads and utility rates from client device 722 and/or plan information database 726 via communications interface 704. Planning tool 702 may use communications interface 704 to output results of the simulation to client device 722 and/or to store the results in results database 728.

Still referring to FIG. 7, processing circuit 706 is shown to include a processor 710 and memory 712. Processor 710 may be a general purpose or specific purpose processor, an application specific integrated circuit (ASIC), one or more field programmable gate arrays (FPGAs), a group of processing components, or other suitable processing components. Processor 710 may be configured to execute computer code or instructions stored in memory 712 or received from other computer readable media (e.g., CDROM, network storage, a remote server, etc.).

Memory 712 may include one or more devices (e.g., memory units, memory devices, storage devices, etc.) for storing data and/or computer code for completing and/or facilitating the various processes described in the present disclosure. Memory 712 may include random access memory (RAM), read-only memory (ROM), hard drive storage, temporary storage, non-volatile memory, flash memory, optical memory, or any other suitable memory for storing software objects and/or computer instructions. Memory 712 may include database components, object code components, script components, or any other type of information structure for supporting the various activities and information structures described in the present disclosure. Memory 712 may be communicably connected to processor 710 via processing circuit 706 and may include computer code for executing (e.g., by processor 710) one or more processes described herein.

Still referring to FIG. 7, memory 712 is shown to include a GUI engine 716, web services 714, and configuration tools 718. In an exemplary embodiment, GUI engine 716 includes a graphical user interface component configured to provide graphical user interfaces to a user for selecting or defining plan information for the simulation (e.g., planned loads, utility rates, environmental conditions, etc.). Web services 714 may allow a user to interact with planning tool 702 via a web portal and/or from a remote system or device (e.g., an enterprise control application).

Configuration tools 718 can allow a user to define (e.g., via graphical user interfaces, via prompt-driven "wizards," etc.) various parameters of the simulation such as the number and type of subplants, the devices within each subplant, the subplant curves, device-specific efficiency curves, the duration of the simulation, the duration of the prediction window, the duration of each time step, and/or various other types of plan information related to the simulation. Configuration tools 718 can present user interfaces for building the simulation. The user interfaces may allow users to define simulation parameters graphically. In some embodiments, the user interfaces allow a user to select a pre-stored or pre-constructed simulated plant and/or plan information (e.g., from plan information database 726) and adapt it or enable it for use in the simulation.

Still referring to FIG. 7, memory 712 is shown to include demand response optimizer 630. Demand response optimizer 630 may use the planned loads and utility rates to determine an optimal resource allocation over a prediction window. The operation of demand response optimizer 630 may be the same or similar as previously described with reference to FIGS. 6-8. With each iteration of the optimization process, demand response optimizer 630 may shift the prediction window forward and apply the optimal resource allocation for the portion of the simulation period no longer in the prediction window. Demand response optimizer 630 may use the new plan information at the end of the prediction window to perform the next iteration of the optimization process. Demand response optimizer 630 may output the applied resource allocation to reporting applications 730 for presentation to a client device 722 (e.g., via user interface 724) or storage in results database 728.

Still referring to FIG. 7, memory 712 is shown to include reporting applications 730. Reporting applications 730 may receive the optimized resource allocations from demand response optimizer 630 and, in some embodiments, costs associated with the optimized resource allocations. Reporting applications 730 may include a web-based reporting application with several graphical user interface (GUI) elements (e.g., widgets, dashboard controls, windows, etc.) for displaying key performance indicators (KPI) or other information to users of a GUI. In addition, the GUI elements may summarize relative energy use and intensity across various plants, subplants, or the like. Other GUI elements or reports may be generated and shown based on available data that allow users to assess the results of the simulation. The user interface or report (or underlying data engine) may be configured to aggregate and categorize resource allocation and the costs associated therewith and provide the results to a user via a GUI. The GUI elements may include charts or histograms that allow the user to visually analyze the results of the simulation. An exemplary output that may be generated by reporting applications 730 is shown in FIG. 8.

Figure 8:
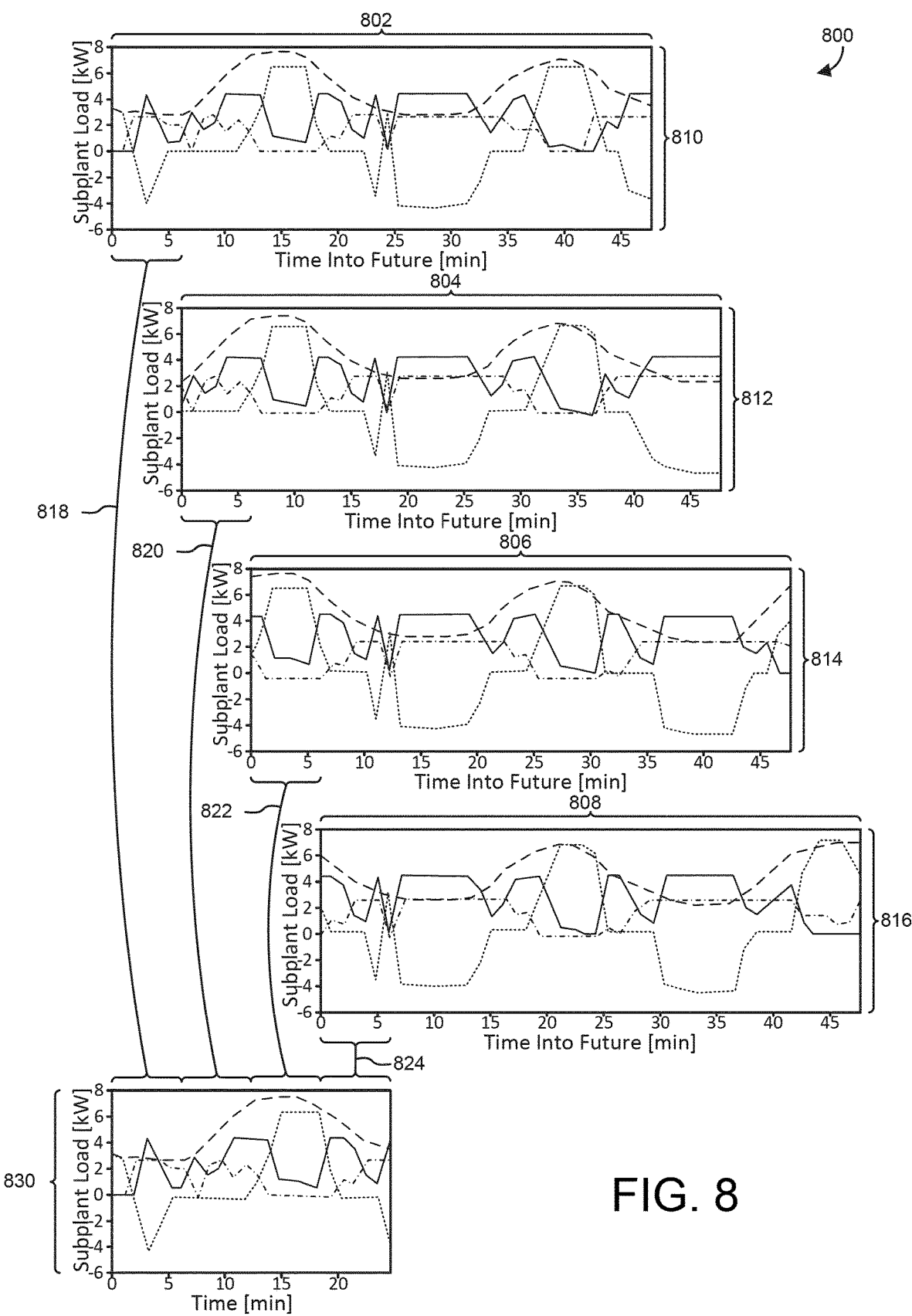
FIG. 8 is a drawing illustrating the operation of the planning tool of FIG. 7, according to an exemplary embodiment.

Referring now to FIG. 8, several graphs 800 illustrating the operation of planning tool 702 are shown, according to an exemplary embodiment. With each iteration of the optimization process, planning tool 702 selects an optimization period (i.e., a portion of the simulation period) over which the optimization is performed. For example, planning tool 702 may select optimization period 802 for use in the first iteration. Once the optimal resource allocation 810 has been determined, planning tool 702 may select a portion 818 of resource allocation 810 to send to plant dispatch 830. Portion 818 may be the first b time steps of resource allocation 810. Planning tool 702 may shift the optimization period 802 forward in time, resulting in optimization period 804. The amount by which the prediction window is shifted may correspond to the duration of time steps b.

Planning tool 702 may repeat the optimization process for optimization period 804 to determine the optimal resource allocation 812. Planning tool 702 may select a portion 820 of resource allocation 812 to send to plant dispatch 830. Portion 820 may be the first b time steps of resource allocation 812. Planning tool 702 may then shift the prediction window forward in time, resulting in optimization period 806. This process may be repeated for each subsequent optimization period (e.g., optimization periods 806, 808, etc.) to generate updated resource allocations (e.g., resource allocations 814, 816, etc.) and to select portions of each resource allocation (e.g., portions 822, 824) to send to plant dispatch 830. Plant dispatch 830 includes the first b time steps 818-824 from each of optimization periods 802-808. Once the optimal resource allocation is compiled for the entire simulation period, the results may be sent to reporting applications 730, results database 728, and/or client device 722, as described with reference to FIG. 7.

Resource Allocation Optimization

Figure 9:
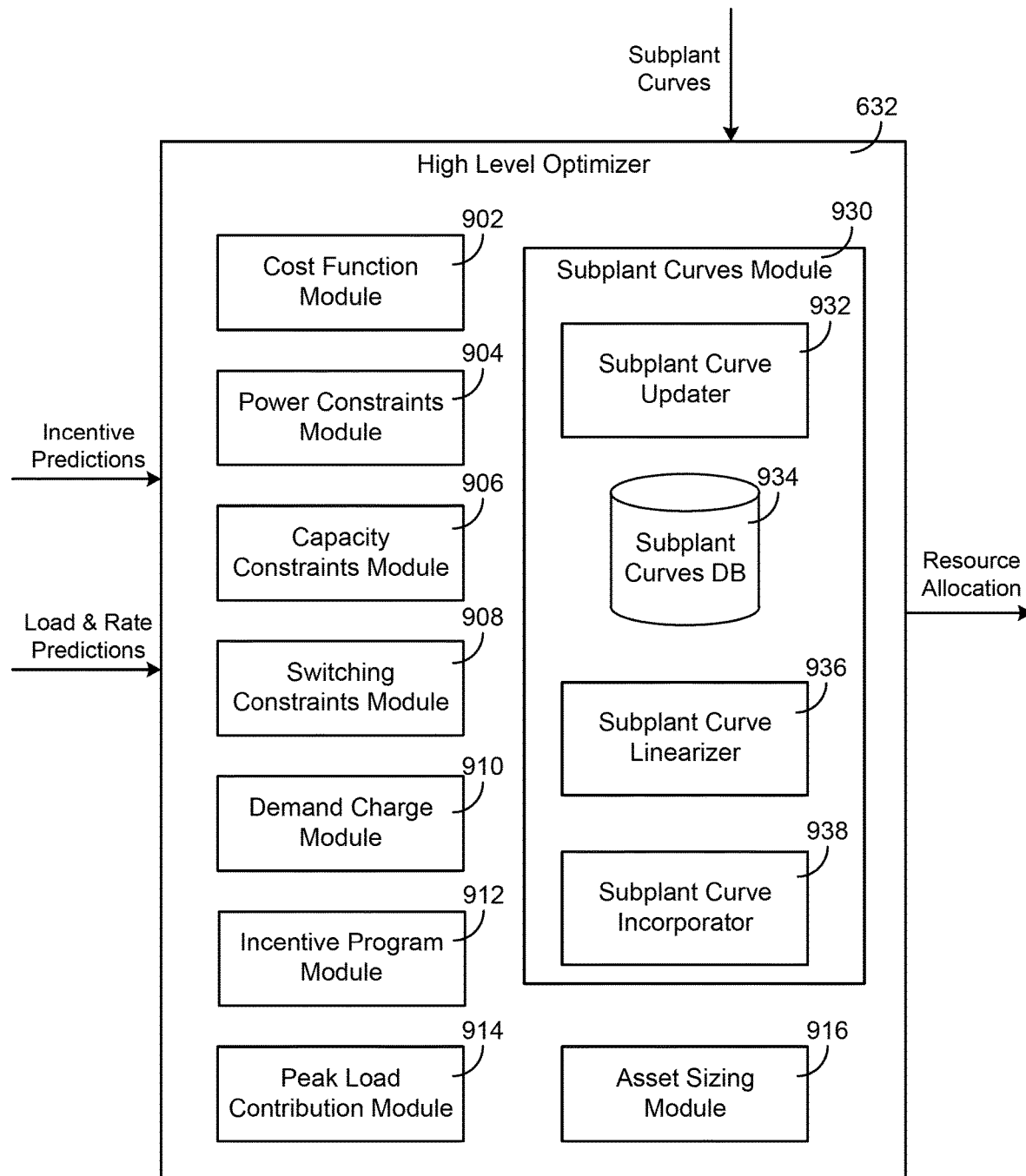
FIG. 9 is a block diagram of a high level optimizer which can be implemented as a component of the controllers of FIGS. 6A-6B or the planning tool of FIG. 7, according to an exemplary embodiment.

Referring now to FIG. 9, a block diagram illustrating high level optimizer 632 in greater detail is shown, according to an exemplary embodiment. In some embodiments, high level optimizer 632 may be implemented as a component of energy storage controller 506, as described with reference to FIGS. 5A and 6A. In other embodiments, high level optimizer 632 may be implemented as a component of controller 552, as described with reference to FIGS. 5B and 6B. In other embodiments, high level optimizer 632 may be implemented as a component of planning tool 702, as described with reference to FIGS. 7-8.

High level optimizer 632 may receive load and rate predictions from load/rate predictor 622, incentive predictions from incentive estimator 620, and subplant curves from low level optimizer 634. High level optimizer 632 may determine an optimal resource allocation across energy storage system 500 as a function of the load and rate predictions, the incentive predictions, and the subplant curves. The optimal resource allocation may include an amount of each resource purchased from utilities 510, an amount of each input and output resource of generator subplants 520, an amount of each resource stored or withdrawn from storage subplants 530, and/or an amount of each resource sold to energy purchasers 504. In some embodiments, the optimal resource allocation maximizes the economic value of operating energy storage system 500 while satisfying the predicted loads for the building or campus.

High level optimizer 632 can be configured to optimize the utilization of a battery asset, such as battery 108, battery 306, and/or electrical energy storage subplant 533. A battery asset can be used to participate in IBDR programs which yield revenue and to reduce the cost of energy and the cost incurred from peak load contribution charges. High level optimizer 632 can use an optimization algorithm to optimally allocate a battery asset (e.g., by optimally charging and discharging the battery) to maximize its total value. In a planning tool framework, high level optimizer 632 can perform the optimization iteratively to determine optimal battery asset allocation for an entire simulation period (e.g., an entire year), as described with reference to FIG. 8. The optimization process can be expanded to include economic load demand response (ELDR) and can account for peak load contribution charges. High level optimizer 632 can allocate the battery asset at each time step (e.g., each hour) over a given horizon such that energy and demand costs are minimized and frequency regulation (FR) revenue maximized. These and other features of high level optimizer 632 are described in detail below.

Cost Function

Still referring to FIG. 9, high level optimizer 632 is shown to include a cost function module 902. Cost function module 902 can generate a cost function or objective function which represents the total operating cost of a system over a time horizon (e.g., one month, one year, one day, etc.). The system can include any of the systems previously described (e.g., frequency response optimization system 100, photovoltaic energy system 300, energy storage system 500, planning system 700, etc.) or any other system in which high level optimizer 632 is implemented. In some embodiments, the cost function can be expressed generically using the following equation:

$$\underset{x}{\mathrm{argmin}} J(x)$$

where J(x) is defined as follows:

$$J(x) = \sum_{sources} \sum_{horizon} \mathrm{cost}(\mathrm{purchase}_{resource,time}, time) - \sum_{incentives} \sum_{horizon} \mathrm{revenue}(ReservationAmount)$$

The first term in the previous equation represents the total cost of all resources purchased over the optimization horizon. Resources can include, for example, water, electricity, natural gas, or other types of resources purchased from a utility or other outside entity. The second term in the equation represents the total revenue generated by participating in incentive programs (e.g., IBDR programs) over the optimization horizon. The revenue may be based on the amount of power reserved for participating in the incentive programs. Accordingly, the total cost function represents the total cost of resources purchased minus any revenue generated from participating in incentive programs.

High level optimizer 632 can optimize the cost function J(x) subject to the following constraint, which guarantees the balance between resources purchased, produced, discharged, consumed, and requested over the optimization horizon:

$$\sum_{sources} \mathrm{purchase}_{resource,time} + \\ \sum_{subplants} \mathrm{produces}(x_{internal,time}, x_{external,time}, v_{uncontrolled,time}) - \\ \sum_{subplants} \mathrm{consumes}(x_{internal,time}, x_{external,time}, v_{uncontrolled,time}) + \\ \sum_{storages} \mathrm{discharges}_{resource}(x_{internal,time}, x_{external,time}) - \\ \sum_{sinks} \mathrm{requests}_{resource} = 0$$

∀ resources, ∀ time ∈ horizon where $x_{internal,time}$ and $x_{external,time}$ are internal and external decision variables and $v_{uncontrolled,time}$ includes uncontrolled variables.

The first term in the previous equation represents the total amount of each resource (e.g., electricity, water, natural gas, etc.) purchased from each source (e.g., utilities 510) over the optimization horizon. The second term represents the total consumption of each resource within the system (e.g., by generator subplants 520) over the optimization horizon. The third term represents the total amount of each resource discharged from storage (e.g., storage subplants 530) over the optimization horizon. Positive values indicate that the resource is discharged from storage, whereas negative values indicate that the resource is charged or stored. The fourth term represents the total amount of each resource requested by various resource sinks (e.g., building 502, energy purchasers 504, or other resource consumers) over the optimization horizon. Accordingly, this constraint ensures that the total amount of each resource purchased, produced, or discharged from storage is equal to the amount of each resource consumed, stored, or provided to the resource sinks.

In some embodiments, cost function module 902 separates the purchase cost of one or more resources into multiple terms. For example, cost function module 902 can separate the purchase cost of a resource into a first term corresponding to the cost per unit of the resource purchased (e.g., $/kWh of electricity, $/liter of water, etc.) and a second term corresponding to one or more demand charges. A demand charge is a separate charge on the consumption of a resource which depends on the maximum or peak resource consumption over a given period (i.e., a demand charge period). Cost function module 902 can express the cost function using the following equation:

$$J(x) = \sum_{sources} \left[ \sum_{q \in demands_s} w_{demand,s,q} r_{demand,s,q} \max_{i \in demand_{s,q}} (\mathrm{purchase}_{s,i}) + \sum_{horizon} r_{s,i} \mathrm{purchase}_{s,i} \right] - \sum_{incentives} \sum_{horizon} \mathrm{revenue}(ReservationAmount)$$

where $r_{demand,s,q}$ is the qth demand charge associated with the peak demand of the resource provided by source s over the demand charge period, $w_{demand,s,q}$ is the weight adjustment of the qth demand charge associated with source s, and the max( ) term indicates the maximum amount of the resource purchased from source s at any time step i during the demand charge period. The variable $r_{s,i}$ indicates the cost per unit of the resource purchased from source s and the variable $\mathrm{purchase}_{s,i}$ indicates the amount of the resource purchased from source s during the ith time step of the optimization period.

In some embodiments, the energy system in which high level optimizer 632 is implemented includes a battery asset (e.g., one or more batteries) configured to store and discharge electricity. If the battery asset is the only type of energy storage, cost function module 902 can simplify the cost function J(x) to the following equation:

$$J(x) = -\sum_{i=k}^{k+h-1} r_{e_i} P_{bat_i} - \sum_{i=k}^{k+h-1} r_{FR_i} P_{FR_i} + \sum_{i=k}^{k+h-1} r_{s_i} |P_{bat_i} - P_{bat_{i-1}}| + w_d r_d \max_i (-P_{bat_i} + eLoad_i)$$

where h is the duration of the optimization horizon, $P_{bat_i}$ is the amount of power (e.g., kW) discharged from the battery asset during the ith time step of the optimization horizon for use in reducing the amount of power purchased from an electric utility, $r_{e_i}$ is the price of electricity (e.g., \$/kWh) at time step i, $P_{FR,i}$ is the battery power (e.g., kW) committed to frequency regulation participation during time step i, $r_{FR_i}$ is the incentive rate (e.g., \$/kWh) for participating in frequency regulation during time step i, $r_d$ is the applicable demand charge (e.g., \$/kWh) associated with the maximum electricity consumption during the corresponding demand charge period, $w_d$ is a weight adjustment of the demand charge over the horizon, and the max( ) term selects the maximum amount electricity purchased from the electric utility (e.g., kW) during any time step i of the applicable demand charge period.

In the previous expression of the cost function J(x), the first term represents the cost savings resulting from the use of battery power to satisfy the electric demand of the facility relative to the cost which would have been incurred if the electricity were purchased from the electric utility. The second term represents the amount of revenue derived from participating in the frequency regulation program. The third term represents a switching penalty imposed for switching the battery power $P_{bat}$ between consecutive time steps. The fourth term represents the demand charge associated with the maximum amount of electricity purchased from the electric utility. The amount of electricity purchased may be equal to the difference between the electric load of the facility $eLoad_i$ (i.e., the total amount of electricity required) at time step i and the amount of power discharged from the battery asset $P_{bat_i}$ at time step i. In a planning tool framework, historical data of the electric load eLoad over the horizon can be provided as a known input. In an operational mode, the electric load eLoad can be predicted for each time step of the optimization period.

Optimization Constraints

Still referring to FIG. 9, high level optimizer 632 is shown to include a power constraints module 904. Power constraints module 904 may be configured to impose one or more power constraints on the objective function J(x). In some embodiments, power constraints module 904 generates and imposes the following constraints:

$$P_{bat_i} + P_{FR_i} \leq P_{eff}$$

$$-P_{bat_i} + P_{FR_i} \leq P_{eff}$$

$$P_{bat_i} + P_{FR_i} \leq eLoad_i$$

where $P_{bat_i}$ is the amount of power discharged from the battery at time step i for use in satisfying electric demand and reducing the demand charge, $P_{FR_i}$ is the amount of battery power committed to frequency regulation at time step i, $P_{eff}$ is the effective power available (e.g., the maximum rate at which the battery can be charged or discharged), and $eLoad_i$ is the total electric demand at time step i.

The first two power constraints ensure that the battery is not charged or discharged at a rate that exceeds the maximum battery charge/discharge rate $P_{eff}$. If the system includes photovoltaic (PV) power generation, the effective power available $P_{eff}$ can be calculated as follows:

$$P_{eff} = P_{rated} - P_{PV\ FirmingReserve}$$

where $P_{rated}$ is the rated capacity of the battery and $P_{PV\ FirmingReserve}$ is the PV firming reserve power. The third power constraint ensures that energy stored in the battery is not sold or exported to the energy grid. In some embodiments, power constraints module 904 can remove the third power constraint if selling energy back to the energy grid is a desired feature or behavior of the system.

Still referring to FIG. 9, high level optimizer 632 is shown to include a capacity constraints module 906. Capacity constraints module 906 may be configured to impose one or more capacity constraints on the objective function J(x). The capacity constraints may be used to relate the battery power $P_{bat}$ charged or discharged during each time step to the capacity and state-of-charge (SOC) of the battery. The capacity constraints may ensure that the SOC of the battery is maintained within acceptable lower and upper bounds and that sufficient battery capacity is available for frequency regulation. In some embodiments, the lower and upper bounds are based on the battery capacity needed to reserve the amount of power committed to frequency regulation $P_{FR_i}$ during each time step i.

In some embodiments, capacity constraints module 906 generates two sets of capacity constraints. One set of capacity constraints may apply to the boundary condition at the end of each time step i, whereas the other set of capacity constraints may apply to the boundary condition at the beginning of the next time step i+1. For example, if a first amount of battery capacity is reserved for frequency regulation during time step i and a second amount of battery capacity is reserved for frequency regulation during time step i+1, the boundary point between time step i and i+1 may be required to satisfy the capacity constraints for both time step i and time step i+1. This ensures that the decisions made for the power committed to frequency regulation during the current time step i and the next time step i+1 represent a continuous change in the SOC of the battery.

In some embodiments, capacity constraints module 906 generates the following capacity constraints:

$$\begin{cases} C_a - \sum_{n=k}^{i} P_{bat_n} \leq C_{eff} - C_{FR} P_{FR_i} \\ C_a - \sum_{n=k}^{i} P_{bat_n} \geq C_{FR} P_{FR_i} \end{cases} \forall i = k \ldots k+h-1$$

$$\begin{cases} C_a - \sum_{n=k}^{i} P_{bat_n} \leq C_{eff} - C_{FR} P_{FR_{i+1}} \\ C_a - \sum_{n=k}^{i} P_{bat_n} \geq C_{FR} P_{FR_{i+1}} \end{cases} \forall i = k \ldots k+h-2$$

where $C_a$ is the available battery capacity (e.g., kWh), $C_{FR}$ is the frequency regulation reserve capacity (e.g., kWh/kW) which translates the amount of battery power committed to frequency regulation $P_{FR}$ into an amount of energy needed to be reserved, and $C_{eff}$ is the effective capacity of the battery.

The first set of constraints ensures that the battery capacity at the end of each time step i (i.e., available capacity $C_a$ minus the battery power discharged through time step i) is maintained between the lower capacity bound $C_{FR} P_{FR_i}$ and the upper capacity bound $C_{eff} - C_{FR} P_{FR_i}$ for time step i. The lower capacity bound $C_{FR} P_{FR_i}$ represents the minimum capacity required to reserve $P_{FR_i}$ for frequency regulation during time step i, whereas the upper capacity bound $C_{eff} - C_{FR} P_{FR_i}$ represents maximum capacity required to reserve $P_{FR_i}$ for frequency regulation during time step i. Similarly, the second set of constraints ensures that the battery capacity at the end of each time step i (i.e., available capacity $C_a$ minus the battery power discharged through time step i) is maintained between the lower capacity bound $C_{FR}P_{FR_{i+1}}$ and the upper capacity bound $C_{eff}-C_{FR}P_{FR_{i+1}}$ for time step i+1. The lower capacity bound $C_{FR}P_{FR_{i+1}}$ represents the minimum capacity required to reserve $P_{FR_{i+1}}$ for frequency regulation during time step i+1, whereas the upper capacity bound $C_{eff}-C_{FR}P_{FR_{i+1}}$ represents maximum capacity required to reserve $P_{FR_{i+1}}$ for frequency regulation during time step i+1.

In some embodiments, capacity constraints module 906 calculates the effective capacity of the battery $C_{eff}$ as a percentage of the rated capacity of the battery. For example, if frequency regulation and photovoltaic power generation are both enabled and the SOC control margin is non-zero, capacity constraints module 906 can calculate the effective capacity of the battery $C_{eff}$ using the following equation:

$$C_{eff}=(1-C_{FR}-2C_{socCM})C_{rated}-C_{PV\,FirmingReserve}$$

where $C_{socCM}$ is the control margin and $C_{PV\,FirmingReserve}$ is the capacity reserved for photovoltaic firming.

Still referring to FIG. 9, high level optimizer 632 is shown to include a switching constraints module 908. Switching constraints module 908 may be configured to impose one or more switching constraints on the cost function J(x). As previously described, the cost function J(x) may include the following switching term:

$$\sum_{i=k}^{k+h-1} r_{s_i}|P_{bat_i} - P_{bat_{i-1}}|$$

which functions as a penalty for switching the battery power $P_{bat}$ between consecutive time steps i and i−1. Notably, the switching term is nonlinear as a result of the absolute value function.

Switching constraints module 908 can impose constraints which represent the nonlinear switching term in a linear format. For example, switching constraints module 908 can introduce an auxiliary switching variable $s_i$ and constrain the auxiliary switching variable to be greater than the difference between the battery power $P_{bat_i}$ at time step i and the battery power $P_{bat_{i-1}}$ at time step i−1, as shown in the following equations:

$$s_i > P_{bat_i} - P_{bat_{i-1}}$$
$$s_i > P_{bat_{i-1}} - P_{bat_i} \quad \forall\, i = k \ldots k+h-1$$

Switching constraints module 908 can replace the nonlinear switching term in the cost function J(x) with the following linearized term:

$$\sum_{i=k}^{k+h-1} r_{s_i} s_i$$

which can be optimized using any of a variety of linear optimization techniques (e.g., linear programming) subject to the constraints on the auxiliary switching variable $s_i$.

Demand Charge Incorporation

Still referring to FIG. 9, high level optimizer 632 is shown to include a demand charge module 910. Demand charge module 910 can be configured to modify the cost function J(x) and the optimization constraints to account for one or more demand charges. As previously described, demand charges are costs imposed by utilities 510 based on the peak consumption of a resource from utilities 510 during various demand charge periods (i.e., the peak amount of the resource purchased from the utility during any time step of the applicable demand charge period). For example, an electric utility may define one or more demand charge periods and may impose a separate demand charge based on the peak electric consumption during each demand charge period. Electric energy storage can help reduce peak consumption by storing electricity in a battery when energy consumption is low and discharging the stored electricity from the battery when energy consumption is high, thereby reducing peak electricity purchased from the utility during any time step of the demand charge period.

In some instances, one or more of the resources purchased from utilities 510 are subject to a demand charge or multiple demand charges. There are many types of potential demand charges as there are different types of energy rate structures. The most common energy rate structures are constant pricing, time of use (TOU), and real time pricing (RTP). Each demand charge may be associated with a demand charge period during which the demand charge is active. Demand charge periods can overlap partially or completely with each other and/or with the optimization period. Demand charge periods can include relatively long periods (e.g., monthly, seasonal, annual, etc.) or relatively short periods (e.g., days, hours, etc.). Each of these periods can be divided into several sub-periods including off-peak, partial-peak, and/or on-peak. Some demand charge periods are continuous (e.g., beginning Jan. 1, 2017 and ending Jan. 31, 2017), whereas other demand charge periods are non-continuous (e.g., from 11:00 AM-1:00 PM each day of the month).

Over a given optimization period, some demand charges may be active during some time steps that occur within the optimization period and inactive during other time steps that occur during the optimization period. Some demand charges may be active over all the time steps that occur within the optimization period. Some demand charges may apply to some time steps that occur during the optimization period and other time steps that occur outside the optimization period (e.g., before or after the optimization period). In some embodiments, the durations of the demand charge periods are significantly different from the duration of the optimization period.

Advantageously, demand charge module 910 may be configured to account for demand charges in the high level optimization process performed by high level optimizer 632. In some embodiments, demand charge module 910 incorporates demand charges into the optimization problem and the cost function J(x) using demand charge masks and demand charge rate weighting factors. Each demand charge mask may correspond to a particular demand charge and may indicate the time steps during which the corresponding demand charge is active and/or the time steps during which the demand charge is inactive. Each rate weighting factor may also correspond to a particular demand charge and may scale the corresponding demand charge rate to the time scale of the optimization period.

As described above, the demand charge term of the cost function J(x) can be expressed as:

$$J(x) = \ldots \sum_{s \in sources} \sum_{q \in demands_s} w_{demand,s,q} r_{demand,s,q} \max_{i \in demands_{s,q}} (purchase_{s,i}) \ldots$$

where the max( ) function selects the maximum amount of the resource purchased from source s during any time step i that occurs during the optimization period. However, the demand charge period associated with demand charge q may not cover all of the time steps that occur during the optimization period. In order to apply the demand charge q to only the time steps during which the demand charge q is active, demand charge module 910 can add a demand charge mask to the demand charge term as shown in the following equation:

$$J(x) = \ldots \sum_{s \in sources} \sum_{q \in demands_s} w_{demand,s,q} r_{demand,s,q} \max_{i \in demands_{s,q}} (g_{s,q,i} \text{purchase}_{s,i}) \ldots$$

where $g_{s,q,i}$ is an element of the demand charge mask.

The demand charge mask may be a logical vector including an element $g_{s,q,i}$ for each time step i that occurs during the optimization period. Each element $g_{s,q,i}$ of the demand charge mask may include a binary value (e.g., a one or zero) that indicates whether the demand charge q for source s is active during the corresponding time step i of the optimization period. For example, the element $g_{s,q,i}$ may have a value of one (i.e., $g_{s,q,i}=1$) if demand charge q is active during time step i and a value of zero (i.e., $g_{s,q,i}=0$) if demand charge q is inactive during time step i. An example of a demand charge mask is shown in the following equation:

$$g_{s,q}=[0,0,0,1,1,1,1,0,0,0,1,1]^T$$

where $g_{s,q,1}$, $g_{s,q,2}$, $g_{s,q,3}$, $g_{s,q,8}$, $g_{s,q,9}$, and $g_{s,q,10}$ have values of zero, whereas $g_{s,q,4}$, $g_{s,q,5}$, $g_{s,q,6}$, $g_{s,q,7}$, $g_{s,q,11}$, and $g_{s,q,12}$ have values of one. This indicates that the demand charge q is inactive during time steps i=1, 2, 3, 8, 9, 10 (i.e., $g_{s,q,i}=0$ ∀i=1, 2, 3, 8, 9, 10) and active during time steps i=4, 5, 6, 7, 11, 12 (i.e., $g_{s,q,i}=1$ ∀i=4, 5, 6, 7, 11, 12). Accordingly, the term $g_{s,q,i}\text{purchase}_{s,i}$ within the max( ) function may have a value of zero for all time steps during which the demand charge q is inactive. This causes the max( ) function to select the maximum purchase from source s that occurs during only the time steps for which the demand charge q is active.

In some embodiments, demand charge module 910 calculates the weighting factor $W_{demand,s,q}$ for each demand charge q in the cost function J(x). The weighting factor $W_{demand,s,q}$ may be a ratio of the number of time steps the corresponding demand charge q is active during the optimization period to the number of time steps the corresponding demand charge q is active in the remaining demand charge period (if any) after the end of the optimization period. For example, demand charge module 910 can calculate the weighting factor $W_{demand,s,q}$ using the following equation:

$$w_{demand,s,q} = \frac{\sum_{i=k}^{k+h-1} g_{s,q,i}}{\sum_{i=k+h}^{period\_end} g_{s,q,i}}$$

where the numerator is the summation of the number of time steps the demand charge q is active in the optimization period (i.e., from time step k to time step k+h−1) and the denominator is the number of time steps the demand charge q is active in the portion of the demand charge period that occurs after the optimization period (i.e., from time step k+h to the end of the demand charge period). The following example illustrates how demand charge module 910 can incorporate multiple demand charges into the cost function J(x). In this example, a single source of electricity (e.g., an electric grid) is considered with multiple demand charges applicable to the electricity source (i.e., q=1 . . . N, where N is the total number of demand charges). The system includes a battery asset which can be allocated over the optimization period by charging or discharging the battery during various time steps. Charging the battery increases the amount of electricity purchased from the electric grid, whereas discharging the battery decreases the amount of electricity purchased from the electric grid.

Demand charge module 910 can modify the cost function J(x) to account for the N demand charges as shown in the following equation:

$$J(x) = \ldots + w_{d_1} r_{d_1} \max_i (g_{1_i}(-P_{bat_i} + eLoad_i)) + $$
$$\ldots + w_{d_q} r_{d_q} \max_i (g_{q_i}(-P_{bat_i} + eLoad_i)) + $$
$$\ldots + w_{d_N} r_{d_N} \max_i (g_{N_i}(-P_{bat_i} + eLoad_i))$$

where the term $-P_{bat_i}+eLoad_i$ represents the total amount of electricity purchased from the electric grid during time step i (i.e., the total electric load $eLoad_i$ minus the power discharged from the battery $P_{bat_i}$). Each demand charge q=1 . . . N can be accounted for separately in the cost function J(x) by including a separate max( ) function for each of the N demand charges. The parameter $r_{d_q}$ indicates the demand charge rate associated with the qth demand charge (e.g., \$/kW) and the weighting factor $w_{d_q}$ indicates the weight applied to the qth demand charge.

Demand charge module 910 can augment each max( ) function with an element $g_{q_i}$ of the demand charge mask for the corresponding demand charge. Each demand charge mask may be a logical vector of binary values which indicates whether the corresponding demand charge is active or inactive at each time step i of the optimization period. Accordingly, each max( ) function may select the maximum electricity purchase during only the time steps the corresponding demand charge is active. Each max( ) function can be multiplied by the corresponding demand charge rate $r_{d_q}$ and the corresponding demand charge weighting factor $w_{d_q}$ to determine the total demand charge resulting from the battery allocation $P_{bat}$ over the duration of the optimization period.

In some embodiments, demand charge module 910 linearizes the demand charge terms of the cost function J(x) by introducing an auxiliary variable $d_q$ for each demand charge q. In the case of the previous example, this will result in N auxiliary variables $d_1 \ldots d_N$ being introduced as decision variables in the cost function J(x). Demand charge module 910 can modify the cost function J(x) to include the linearized demand charge terms as shown in the following equation:

$$J(x) = \ldots + w_{d_1} r_{d_1} d_1 + \ldots + w_{d_q} r_{d_q} d_q + \ldots w_{d_N} r_{d_N} d_N$$

Demand charge module 910 can impose the following constraints on the auxiliary demand charge variables $d_1 \ldots d_N$ to ensure that each auxiliary demand charge variable represents the maximum amount of electricity purchased from the electric utility during the applicable demand charge period:

$$d_1 \geq g_{1_i}(-P_{bat_i} + eLoad_i) \quad \forall\, i = k \ldots k+h-1, \quad g_{1_i} \neq 0$$

$$d_1 \geq 0 \qquad \vdots$$

$$d_q \geq g_{q_i}(-P_{bat_i} + eLoud_i) \quad \forall\, i = k \ldots k+h-1, \quad g_{q_i} \neq 0$$

$$d_q \geq 0 \qquad \vdots$$

$$d_N \geq g_{N_i}(-P_{bat_i} + eLoud_i) \quad \forall\, i = k \ldots k+h-1, \quad g_{N_i} \neq 0$$

$$d_N \geq 0$$

In some embodiments, the number of constraints corresponding to each demand charge q is dependent on how many time steps the demand charge q is active during the optimization period. For example, the number of constraints for the demand charge q may be equal to the number of non-zero elements of the demand charge mask $g_q$. Furthermore, the value of the auxiliary demand charge variable $d_q$ at each iteration of the optimization may act as the lower bound of the value of the auxiliary demand charge variable $d_q$ at the following iteration.

Consider the following example of a multiple demand charge structure. In this example, an electric utility imposes three monthly demand charges. The first demand charge is an all-time monthly demand charge of 15.86 $/kWh which applies to all hours within the entire month. The second demand charge is an on-peak monthly demand charge of 1.56 $/kWh which applies each day from 12:00-18:00. The third demand charge is a partial-peak monthly demand charge of 0.53 $/kWh which applies each day from 9:00-12:00 and from 18:00-22:00.

For an optimization period of one day and a time step of one hour (i.e., i=1 ... 24), demand charge module 910 may introduce three auxiliary demand charge variables. The first auxiliary demand charge variable $d_1$ corresponds to the all-time monthly demand charge; the second auxiliary demand charge variable $d_2$ corresponds to the on-peak monthly demand charge; and the third auxiliary demand charge variable $d_3$ corresponds to the partial-peak monthly demand charge. Demand charge module 910 can constrain each auxiliary demand charge variable to be greater than or equal to the maximum electricity purchase during the hours the corresponding demand charge is active, using the inequality constraints described above.

Demand charge module 910 can generate a demand charge mask $g_q$ for each of the three demand charges (i.e., q=1 ... 3), where $g_q$ includes an element for each time step of the optimization period (i.e., $g_q = [g_{q_1} \ldots g_{q_{24}}]$). The three demand charge masks can be defined as follows:

$$g_{1_i} = 1 \;\; \forall i = 1 \ldots 24$$

$$g_{2_i} = 1 \;\; \forall i = 12 \ldots 18$$

$$g_{3_i} = 1 \;\; \forall i = 9 \ldots 12, 18 \ldots 22$$

with all other elements of the demand charge masks equal to zero. In this example, it is evident that more than one demand charge constraint will be active during the hours which overlap with multiple demand charge periods. Also, the weight of each demand charge over the optimization period can vary based on the number of hours the demand charge is active, as previously described.

In some embodiments, demand charge module 910 considers several different demand charge structures when incorporating multiple demand charges into the cost function J(x) and optimization constraints. Demand charge structures can vary from one utility to another, or the utility may offer several demand charge options. In order to incorporate the multiple demand charges within the optimization framework, a generally-applicable framework can be defined as previously described. Demand charge module 910 can translate any demand charge structure into this framework. For example, demand charge module 910 can characterize each demand charge by rates, demand charge period start, demand charge period end, and active hours. Advantageously, this allows demand charge module 910 to incorporate multiple demand charges in a generally-applicable format.

The following is another example of how demand charge module 910 can incorporate multiple demand charges into the cost function J(x). Consider, for example, monthly demand charges with all-time, on-peak, partial-peak, and off-peak. In this case, there are four demand charge structures, where each demand charge is characterized by twelve monthly rates, twelve demand charge period start (e.g., beginning of each month), twelve demand charge period end (e.g., end of each month), and hoursActive. The hoursActive is a logical vector where the hours over a year where the demand charge is active are set to one. When running the optimization over a given horizon, demand charge module 910 can implement the applicable demand charges using the hoursActive mask, the relevant period, and the corresponding rate.

In the case of an annual demand charge, demand charge module 910 can set the demand charge period start and period end to the beginning and end of a year. For the annual demand charge, demand charge module 910 can apply a single annual rate. The hoursActive demand charge mask can represent the hours during which the demand charge is active. For an annual demand charge, if there is an all-time, on-peak, partial-peak, and/or off-peak, this translates into at most four annual demand charges with the same period start and end, but different hoursActive and different rates.

In the case of a seasonal demand charge (e.g., a demand charge for which the maximum peak is determined over the indicated season period), demand charge module 910 can represent the demand charge as an annual demand charge. Demand charge module 910 can set the demand charge period start and end to the beginning and end of a year. Demand charge module 910 can set the hoursActive to one during the hours which belong to the season and to zero otherwise. For a seasonal demand charge, if there is an All-time, on-peak, partial, and/or off-peak, this translates into at most four seasonal demand charges with the same period start and end, but different hoursActive and different rates.

In the case of the average of the maximum of current month and the average of the maxima of the eleven previous months, demand charge module 910 can translate the demand charge structure into a monthly demand charge and an annual demand charge. The rate of the monthly demand charge may be half of the given monthly rate and the annual rate may be the sum of given monthly rates divided by two. These and other features of demand charge module 910 are described in greater detail in U.S. patent application Ser. No. 15/405,236 filed Jan. 12, 2017, the entire disclosure of which is incorporated by reference herein.

Incentive Program Incorporation

Referring again to FIG. 9, high level optimizer 632 is shown to include an incentive program module 912. Incentive program module 912 may modify the optimization problem to account for revenue from participating in an incentive-based demand response (IBDR) program. IBDR programs may include any type of incentive-based program that provides revenue in exchange for resources (e.g., electric power) or a reduction in a demand for such resources. For example, energy storage system 500 may provide electric power to an energy grid or an independent service operator as part of a frequency response program (e.g., PJM frequency response) or a synchronized reserve market. In a frequency response program, a participant contracts with an electrical supplier to maintain reserve power capacity that can be supplied or removed from an energy grid by tracking a supplied signal. The participant is paid by the amount of power capacity required to maintain in reserve. In other types of IBDR programs, energy storage system 500 may reduce its demand for resources from a utility as part of a load shedding program. It is contemplated that energy storage system 500 may participate in any number and/or type of IBDR programs.

In some embodiments, incentive program module 912 modifies the cost function J(x) to include revenue generated from participating in an economic load demand response (ELDR) program. ELDR is a type of IBDR program and similar to frequency regulation. In ELDR, the objective is to maximize the revenue generated by the program, while using the battery to participate in other programs and to perform demand management and energy cost reduction. To account for ELDR program participation, incentive program module 912 can modify the cost function J(x) to include the following term:

$$\min_{b_i, P_{bat_i}} \left( -\sum_{i=k}^{k+h-1} b_i r_{ELDR_i} (adjCBL_i - (eLoad_i - P_{bat_i})) \right)$$

where $b_i$ is a binary decision variable indicating whether to participate in the ELDR program during time step i, $r_{ELDR_i}$ is the ELDR incentive rate at which participation is compensated, and $adjCBL_i$ is the symmetric additive adjustment (SAA) on the baseline load. The previous expression can be rewritten as:

$$\min_{b_i, P_{bat_i}} \left( -\sum_{i=k}^{k+h-1} b_i r_{ELDR_i} \left( \sum_{l=1}^{4} \frac{e_{li}}{4} + \sum_{p=m-4}^{m-2} \frac{1}{3}\left( eLoad_p - P_{bat_p} - \sum_{l=1}^{4} \frac{e_{lp}}{4} \right) - (eLoad_i - P_{bat_i}) \right) \right)$$

where $e_{li}$ and $e_{lp}$ are the electric loads at the lth hour of the operating day.

In some embodiments, incentive program module 912 handles the integration of ELDR into the optimization problem as a bilinear problem with two multiplicative decision variables. In order to linearize the cost function J(x) and customize the ELDR problem to the optimization framework, several assumptions may be made. For example, incentive program module 912 can assume that ELDR participation is only in the real-time market, balancing operating reserve charges and make whole payments are ignored, day-ahead prices are used over the horizon, real-time prices are used in calculating the total revenue from ELDR after the decisions are made by the optimization algorithm, and the decision to participate in ELDR is made in advance and passed to the optimization algorithm based on which the battery asset is allocated.

In some embodiments, incentive program module 912 calculates the participation vector $b_i$ as follows:

$$b_i = \begin{cases} 1 & \frac{\forall i}{r_{DA_i}} \geq NBT_i \text{ and } i \in S \\ 0 & \text{otherwise} \end{cases}$$

where $r_{DA_i}$ is the hourly day-ahead price at the ith hour, $NBT_i$ is the net benefits test value corresponding to the month to which the corresponding hour belongs, and S is the set of nonevent days. Nonevent days can be determined for the year by choosing to participate every x number of days with the highest day-ahead prices out of y number of days for a given day type. This approach may ensure that there are nonevent days in the 45 days prior to a given event day when calculating the CBL for the event day.

Given these assumptions and the approach taken by incentive program module 912 to determine when to participate in ELDR, incentive program module 912 can adjust the cost function J(x) as follows:

$$J(x) = -\sum_{i=k}^{k+h-1} r_{e_i} P_{bat_i} - \sum_{i=k}^{k+h-1} r_{FR_i} P_{FR_i} + \sum_{i=k}^{k+h-1} r_{s_i} s_i + w_d r_d d - \sum_{i=k}^{k+h-1} b_i r_{DA_i} \left( \sum_{p=m-4}^{m-2} -\frac{1}{3} P_{bat_p} + P_{bat_i} \right)$$

where $b_i$ and m are known over a given horizon. The resulting term corresponding to ELDR shows that the rates at the ith participation hour are doubled and those corresponding to the SAA are lowered. This means it is expected that high level optimizer 632 will tend to charge the battery during the SAA hours and discharge the battery during the participation hours. Notably, even though a given hour is set to be an ELDR participation hour, high level optimizer 632 may not decide to allocate any of the battery asset during that hour. This is due to the fact that it may be more beneficial at that instant to participate in another incentive program or to perform demand management.

Peak Load Contribution Incorporation

Still referring to FIG. 9, high level optimizer 632 is shown to include a peak load contribution module 914. Peak load contribution (PLC) is a customer's contribution to regional demand peaks that occur in geographic area managed by a regional transmission organization (RTO) or independent system operator (ISO) at certain hours within a base period. The regional demand at a given hour may be the summation of the customer's demand during (i.e., the rate at which the customer purchases electricity or another resource from a utility) as well as the demand of other buildings in the geographic area during that hour. The customer may be billed based on its contribution to the peak regional demand (e.g., $/kW of the customer's PLC) in addition to the energy consumption charges and demand charges previously described.

PLC module 914 can be configured to modify the cost function J(x) to account for a cost associated with the customer's PLC. By incorporating PLC costs into the cost function J(x), PLC module 914 enables high level optimizer 632 to allocate resource consumption and resource purchases to reduce the customer's PLC. High level optimizer 632 can reduce PLC costs by shifting the customer's load to non-peak times or shaving the customer's peak load. This can be done, for example, by precooling the building during non-peak times, using thermal energy storage, and/or using electrical energy storage such as a battery asset.

Accounting for the cost associated with the customer's PLC can be more difficult than accounting for energy consumption costs and demand charges. Unlike demand charge which is calculated based on the customer's maximum demand during predetermined demand charge periods, the hours over which PLC is calculated may not be known in advance. The hours of peak regional demand (i.e., the coincidental peak (CP) hours) may not be known until the end of the base period over which PLC is calculated. For example, the CP hours for a given base period (e.g., one year) may be determined by a RTO at the end of the base period based on the demand of all the buildings within the geographic area managed by the RTO during the base period (e.g., by selecting the hours with the highest regional demand). The customer's PLC may then be determined based on the customer's demand during the designated CP hours and used to calculate a cost of the customer's PLC. This cost may then be billed to the customer during the next time period (e.g., the next year), referred to as the billing period.

Another difficulty in accounting for PLC costs is that the base period, billing period, CP hours, and other factors used to calculate the PLC cost may differ from one RTO to another. For example, a RTO for the Pennsylvania, Jersey, and Maryland (PJM) geographic area may define the base period (i.e., the peak-setting period) as June $1^{st}$ of year Y to May $31^{st}$ of year Y+1. The billing period (i.e., the delivery period) may be defined as June $1^{st}$ of year Y+1 to May $31^{st}$ of year Y+2. PJM may define the CP hours as the five hours with the highest loads over the five highest peak load days across the PJM geographic region.

A customer's PLC in the PJM region may be calculated as the product of the customer's average electric load during the five CP hours and a capacity loss factor (CLF), as shown in the following equation:

$$PLC_{customer} = CLF \times \sum_{i=1}^{5} \frac{eLoad_{cp_i}}{5}$$

where $PLC_{customer}$ is the customer's peak load contribution calculated during year Y, CLF is the capacity loss factor (e.g., CLF=1.05), and $eLoad_{cp_i}$ is the customer's electric load (e.g., kW) during the ith CP hour.

The customer's PLC cost in the PJM region can be calculated as the product of the customer's PLC during year Y and a PLC rate, as shown in the following equation:

$$PLC_{cost} = r_{PLC} \times PLC_{customer}$$

where $PLC_{cost}$ is the customer's PLC charge billed over the delivery year Y+1 (e.g., $) and $r_{PLC}$ is the rate at which the customer is charged for its PLC (e.g., $/kW).

An additional complication in the PJM region relates to the interaction between PLC costs and economic load demand response (ELDR) revenue. In some embodiments, a customer participating in ELDR in the PJM region during one of the CP hours may be prohibited from reducing its PLC while earning ELDR revenue at the same time. Accordingly, a customer wishing to reduce its load during an assumed CP hour for the purpose of reducing its capacity, transmission, and/or demand charge costs may be restricted from making a bid for the same assumed CP hour in the ELDR market.

Another example of an organization which imposes PLC costs is the independent electricity system operator (IESO) in Ontario, Canada. Relative to PJM, IESO may use a different base period, billing period, CP hours, and other factors used to calculate the PLC cost. For example, IESO may define the base period or peak-setting period as May $1^{st}$ of year Y to April $30^{th}$ of year Y+1. The billing period or adjustment period for IESO may be defined as July $1^{st}$ of year Y+1 to June $30^{th}$ of year Y+2. IESO may define the CP hours as the five hours with the highest regional demands across the IESO geographic region.

At the end of the base period, IESO may calculate the customer's peak demand factor ($\theta_{PDF}$). The peak demand factor may be defined as the ratio of the sum of the customer's peak demand to the sum of the region-wide demand peaks during the five CP hours, as shown in the following equation:

$$\theta_{PDF} = \frac{\sum_{i=1}^{5} eLoad_{cp_i}}{\sum_{i=1}^{5} sysLoad_{cp_i}}$$

where $sysLoad_{cp_i}$ is the region-wide peak load during the ith CP hour and $eLoad_{cp_i}$ is the customer's peak load during the ith CP hour.

The customer's PLC cost in the IESO region is known as a global adjustment (GA) charge. The GA charge may be imposed as a monthly charge during the billing period. In some embodiments, the GA charge is calculated by multiplying the customer's peak demand factor by the monthly region-wide global adjustment costs, as shown in the following equation:

$$GA_{cost,month} = \theta_{PDF} \times GA_{total,month}$$

where $GA_{cost,month}$ is the customer's monthly PLC cost (e.g., $) and $GA_{total,month}$ is the region-wide global adjustment cost (e.g., $). The value of $GA_{total,month}$ may be specified by IESO. In some embodiments, $GA_{total,month}$ has a known value. In other embodiments, the value of $GA_{total,month}$ may not be known until the end of the base period.

In order to incorporate PLC costs into the cost function J(x) and allocate resource consumption/purchases in advance, PLC module 914 can generate or obtain a projection of the CP hours for an upcoming base period. The projected CP hours can then be used by high level optimizer 632 as an estimate of the actual CP hours. High level optimizer 632 can use the projected CP hours to allocate one or more assets (e.g., a battery, thermal energy storage, HVAC equipment, etc.) to minimize the customer's demand during the projected CP hours. These and other features of PLC module 914 are described in greater detail in U.S. patent application Ser. No. 15/405,234 filed Jan. 12, 2017, the entire disclosure of which is incorporated by reference herein.

Asset Sizing Incorporation

Still referring to FIG. 9, high level optimizer 632 is shown to include an asset sizing module 916. Asset sizing module 916 can be configured to determine the optimal sizes of various assets in a building, group of buildings, or a central plant. Assets can include individual pieces of equipment or groups of equipment. For example, assets can include boilers, chillers, heat recovery chillers, steam generators, electrical generators, thermal energy storage tanks, batteries, air handling units, or other types of equipment in a building or a central plant (e.g., HVAC equipment, BMS equipment, etc.). In some embodiments, assets include collections of equipment which form a subplant of a central plant (e.g., central plant 118). For example, assets can include heater subplant 521, chiller subplant 522, heat recovery chiller subplant 523, steam subplant 524, electricity subplant 525, or any other type of generator subplant 520. In some embodiments, assets include hot thermal energy storage 531 (e.g., one or more hot water storage tanks), cold thermal energy storage 532 (e.g., one or more cold thermal energy storage tanks), electrical energy storage 533 (e.g., one or more batteries), or any other type of storage subplant 530.

Asset sizes can include a maximum loading of the asset and/or a maximum capacity of the asset. Some assets such as storage subplants 530 may have both a maximum loading and a maximum capacity. For example, battery assets may have a maximum battery power (e.g., a maximum rate at which the battery can be charged or discharged) and a maximum state-of-charge (e.g., a maximum energy storage of the battery). Similarly, thermal energy storage assets may have a maximum charge/discharge rate and a maximum capacity (e.g., maximum fluid storage, etc.). Other assets such as generator subplants 520 may have only a maximum loading. For example, a chiller may have a maximum rate at which the chiller can produce cold thermal energy. Similarly, an electric generator may have a maximum rate at which the generator can produce electricity. Asset sizing module 916 can be configured to determine the maximum loading and/or the maximum capacity of an asset when determining the optimal size of the asset.

In some embodiments, asset sizing module 916 is implemented a component of planning tool 702. In the planning tool framework, asset sizing module 916 can determine the optimal size of an asset for a given application. For example, consider the planning problem described with reference to FIGS. 7-8 in which the high level optimization is solved at a given time instant k over a given time horizon h. With each iteration of the high level optimization, the time horizon h can be shifted forward by a block size equivalent to b time steps and the first b sets of decision variables may be retained. In such a planning problem, the sizes of the assets to be optimally allocated are typically given along with historical load data, utility pricing, and other relative data. However, there are many cases in which the sizes of the assets to be allocated are unknown. For example, when purchasing a new asset for a given application (e.g., adding thermal energy storage or electrical energy storage to a building or central plant), a user may wish to determine the optimal size of the asset to purchase.

Asset sizing module 916 can be configured to determine the optimal size of an asset by considering the potential benefits and costs of the asset. Potential benefits can include, for example, reduced energy costs, reduced demand charges, reduced PLC charges, and/or increased revenue from participating in IBDR programs such as frequency regulation (FR) or economic load demand response (ELDR). Potential costs can include fixed costs (e.g., an initial purchase cost of the asset) as well as marginal costs (e.g., ongoing costs of using the asset) over the time horizon. The potential benefits and costs of an asset may vary based on the application of the asset and/or the system in which the asset will be used. For example, a system that participates in FR programs may realize the benefit of increased IBDR revenue, whereas a system that does not participate in any IBDR programs may not realize such a benefit.

Some of the benefits and costs of an asset may be captured by the original cost function $J(x)$. For example, the cost function $J(x)$ may include terms corresponding to energy cost, multiple demand charges, PLC charges, and/or IBDR revenue, as previously described. Adding one or more new assets may affect the values of some or all of these terms in the original cost function $J(x)$. For example, adding a battery asset may increase IBDR revenue and decrease energy cost, demand charges, and PLC charges. However, the original cost function $J(x)$ may not account for the fixed and marginal costs resulting from new asset purchases. In order to account for these fixed and marginal costs, asset sizing module 916 may add new terms to the original cost function $J(x)$.

Asset sizing module 916 can be configured to augment the cost function $J(x)$ with two new terms that correspond to the cost of purchasing the new assets, resulting in an augmented cost function $J_a(x)$. The additional terms are shown in the following equation:

$$J_a(x)=J(x)+c_f^T v+c_s^T s_a$$

where $J(x)$ is the original cost function, x is the vector of decision variables of the optimization problem over the horizon, $c_f$ is a vector of fixed costs of buying any size of asset (e.g., one element for each potential asset purchase), v is a vector of binary decision variables that indicate whether the corresponding assets are purchased, $c_s$ is a vector of marginal costs per unit of asset size (e.g., cost per unit loading, cost per unit capacity), and $s_a$ is a vector of continuous decision variables corresponding to the asset sizes. Advantageously, the binary purchase decisions and asset size decisions are treated as decision variables which can be optimized along with the decision variables in the vector x. This allows high level optimizer 632 to perform a single optimization to determine optimal values for all of the decision variables in the augmented cost function $J_a(x)$.

In some embodiments, asset sizing module 916 scales the asset purchase costs $c_f^T v$ and $c_s^T s_a$ to the duration of the optimization period h. The cost of purchasing an asset is typically paid over an entire payback period SPP, whereas the operational cost is only over the optimization period h. In order to scale the asset purchase costs to the optimization period, asset sizing module 916 can multiply the terms $c_f^T v$ and $c_s^T s_a$ by the ratio $$\frac{h}{SPP}$$

as shown in the following equation:

$$J_a(x) = J(x) + \frac{h}{8760 \cdot SPP}(c_f^T v + c_s^T s_a)$$

where h is the duration of the optimization period in hours, SPP is the duration of the payback period in years, and 8760 is the number of hours in a year.

High level optimizer 632 can perform an optimization process to determine the optimal values of each of the binary decision variables in the vector v and each of the continuous decision variables in the vector $s_a$. In some embodiments, high level optimizer 632 uses linear programming (LP) or mixed integer linear programming (MILP) to optimize a financial metric such as net present value (NPV), simple payback period (SPP), or internal rate of return (IRR). Each element of the vectors $c_f$, v, $c_s$, and $s_a$ may correspond to a particular asset and/or a particular asset size. Accordingly, high level optimizer 632 can determine the optimal assets to purchase and the optimal sizes to purchase by identifying the optimal values of the binary decision variables in the vector v and the continuous decision variables in the vector $s_a$.

Subplant Curve Incorporation

Still referring to FIG. 9, high level optimizer 632 is shown to include a subplant curves module 930. In the simplest case, it can be assumed that the resource consumption of each subplant is a linear function of the thermal energy load produced by the subplant. However, this assumption may not be true for some subplant equipment, much less for an entire subplant. Subplant curves module 930 may be configured to modify the high level optimization problem to account for subplants that have a nonlinear relationship between resource consumption and load production.

Subplant curves module 930 is shown to include a subplant curve updater 932, a subplant curves database 934, a subplant curve linearizer 936, and a subplant curves incorporator 938. Subplant curve updater 932 may be configured to request subplant curves for each of subplants 520-530 from low level optimizer 634. Each subplant curve may indicate an amount of resource consumption by a particular subplant (e.g., electricity use measured in kW, water use measured in L/s, etc.) as a function of the subplant load.

In some embodiments, low level optimizer 634 generates the subplant curves by running the low level optimization process for various combinations of subplant loads and weather conditions to generate multiple data points. Low level optimizer 634 may fit a curve to the data points to generate the subplant curves and provide the subplant curves to subplant curve updater 832. In other embodiments, low level optimizer 634 provides the data points to subplant curve updater 932 and subplant curve updater 932 generates the subplant curves using the data points. Subplant curve updater 932 may store the subplant curves in subplant curves database 934 for use in the high level optimization process.

In some embodiments, the subplant curves are generated by combining efficiency curves for individual devices of a subplant. A device efficiency curve may indicate the amount of resource consumption by the device as a function of load. The device efficiency curves may be provided by a device manufacturer or generated using experimental data. In some embodiments, the device efficiency curves are based on an initial efficiency curve provided by a device manufacturer and updated using experimental data. The device efficiency curves may be stored in equipment models 618. For some devices, the device efficiency curves may indicate that resource consumption is a U-shaped function of load. Accordingly, when multiple device efficiency curves are combined into a subplant curve for the entire subplant, the resultant subplant curve may be a wavy curve. The waves are caused by a single device loading up before it is more efficient to turn on another device to satisfy the subplant load.

Subplant curve linearizer 936 may be configured to convert the subplant curves into convex curves. A convex curve is a curve for which a line connecting any two points on the curve is always above or along the curve (i.e., not below the curve). Convex curves may be advantageous for use in the high level optimization because they allow for an optimization process that is less computationally expensive relative to an optimization process that uses non-convex functions. Subplant curve linearizer 936 may be configured to break the subplant curves into piecewise linear segments that combine to form a piecewise-defined convex curve. Subplant curve linearizer 936 may store the linearized subplant curves in subplant curves database 934.

Subplant curve incorporator 938 may be configured to modify the high level optimization problem to incorporate the subplant curves into the optimization. In some embodiments, subplant curve incorporator 938 modifies the decision variables to include one or more decision vectors representing the resource consumption of each subplant. Subplant curve incorporator 938 may modify the inequality constraints to ensure that the proper amount of each resource is consumed to serve the predicted thermal energy loads. In some embodiments, subplant curve incorporator 938 formulates inequality constraints that force the resource usage for each resource in the epigraph of the corresponding linearized subplant curve. For example, chiller subplant 522 may have a linearized subplant curve that indicates the electricity use of chiller subplant 522 (i.e., input resource $in_1$) as a function of the cold water production of chiller subplant 522 (i.e., output resource $out_1$). The linearized subplant curve may include a first line segment connecting point $[u_1, Q_1]$ to point $[u_2, Q_2]$, a second line segment connecting point $[u_2, Q_2]$ to point $[u_3, Q_3]$, and a third line segment connecting point $[u_3, Q_3]$ to point $[u_4, Q_4]$.

Subplant curve incorporator 938 may formulate an inequality constraint for each piecewise segment of the subplant curve that constrains the value of the decision variable representing chiller electricity use to be greater than or equal to the amount of electricity use defined by the line segment for the corresponding value of the cold water production. Similar inequality constraints can be formulated for other subplant curves. For example, subplant curve incorporator 938 may generate a set of inequality constraints for the water consumption of chiller subplant 522 using the points defining the linearized subplant curve for the water consumption of chiller subplant 522 as a function of cold water production. In some embodiments, the water consumption of chiller subplant 522 is equal to the cold water production and the linearized subplant curve for water consumption includes a single line segment connecting point $[u_5, Q_5]$ to point $[u_6, Q_6]$. Subplant curve incorporator 938 may repeat this process for each subplant curve for chiller subplant 522 and for the other subplants of the central plant to define a set of inequality constraints for each subplant curve.

The inequality constraints generated by subplant curve incorporator 938 ensure that high level optimizer 632 keeps the resource consumption above all of the line segments of the corresponding subplant curve. In most situations, there is no reason for high level optimizer 632 to choose a resource consumption value that lies above the corresponding subplant curve due to the economic cost associated with resource consumption. High level optimizer 632 can therefore be expected to select resource consumption values that lie on the corresponding subplant curve rather than above it.

The exception to this general rule is heat recovery chiller subplant 523. The equality constraints for heat recovery chiller subplant 523 provide that heat recovery chiller subplant 523 produces hot water at a rate equal to the subplant's cold water production plus the subplant's electricity use. The inequality constraints generated by subplant curve incorporator 938 for heat recovery chiller subplant 523 allow high level optimizer 632 to overuse electricity to make more hot water without increasing the amount of cold water production. This behavior is extremely inefficient and only becomes a realistic possibility when the demand for hot water is high and cannot be met using more efficient techniques. However, this is not how heat recovery chiller subplant 523 actually operates.

To prevent high level optimizer 632 from overusing electricity, subplant curve incorporator 938 may check whether the calculated amount of electricity use (determined by the optimization algorithm) for heat recovery chiller subplant 523 is above the corresponding subplant curve. In some embodiments, the check is performed after each iteration of the optimization algorithm. If the calculated amount of electricity use for heat recovery chiller subplant 523 is above the subplant curve, subplant curve incorporator 938 may determine that high level optimizer 632 is overusing electricity. In response to a determination that high level optimizer 632 is overusing electricity, subplant curve incorporator 938 may constrain the production of heat recovery chiller subplant 523 at its current value and constrain the electricity use of subplant 523 to the corresponding value on the subplant curve. High level optimizer 632 may then rerun the optimization with the new equality constraints. These and other features of subplant curves module 930 are described in greater detail in U.S. patent application Ser. No. 14/634,609 filed Feb. 27, 2015, the entire disclosure of which is incorporated by reference herein.

Economic Load Demand Response (ELDR)

Figure 12:
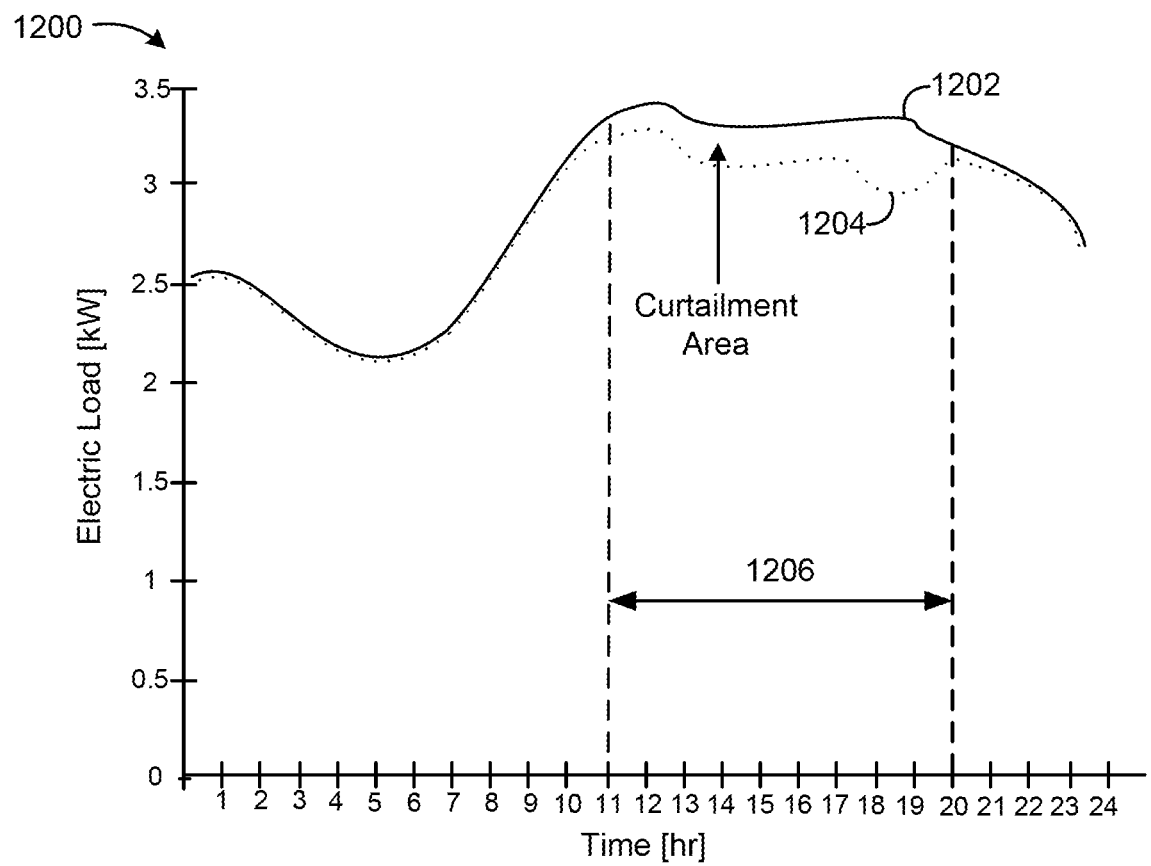
FIG. 12 is a graph illustrating electric load reduction for participation in an ELDR program, according to an exemplary embodiment.

An ELDR program is a type of IBDR program that allows a customer within a region managed by an RTO and/or ISO offering the ELDR program the ability to generate revenue by reducing the electric consumption of a building, facility, or campus owned by the customer during certain hours of a day. The customer can choose particular hours of a day during which the customer would like to participate in the ELDR program. These hours may be times that the electric load of a building owned by the customer will be reduced below a baseline load. FIG. 12 provides an illustration of an electric load over time for a building participating in an ELDR program.

Figure 13:
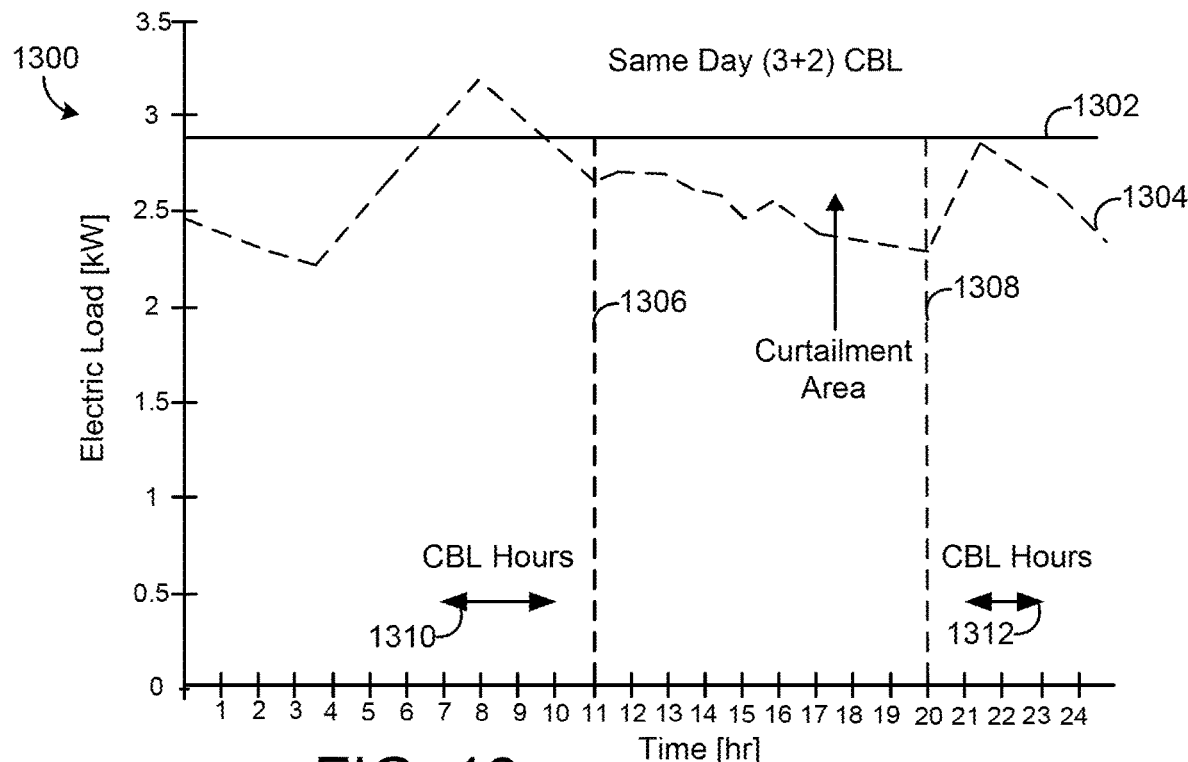
FIG. 13 is a graph illustrating a same day customer baseline load (CBL) that can be determined by the controller of FIG. 10, according to an exemplary embodiment.

In an ELDR program, a customer is compensated for a reduction in electric load based on an electric load of a building during the participation of the ELDR program with respect to a customer baseline load (CBL). The CBL may be a load specific to a particular customer and the typical electric loads of the customer. Further, there may be different types of CBLs. In some cases, there are two types of CBLs, a same day CBL and a symmetric additive adjustment (SAA) CBL. A same day CBL may be entirely dependent on the electric load on the day that the customer participates in the ELDR program, the participation day. The SAA CBL may be dependent on electric loads of previous days in addition to the electric load of the participation day. The same day CBL is illustrated in FIG. 13 while the SAA CBL is illustrated FIG. 14.

An ELDR program, such as the ELDR program discussed herein, may include multiple markets in which a customer can participate. In some cases, the markets are a day-ahead market and a real-time market.

Day-Ahead Market

In the day-ahead market, a customer may submit a bid to the RTO and/or ISO by a predefined time (e.g., 10:30 A.M.) for the following day, the participation day. The bid may be submitted via a curtailment service provider (CSP). The CSP may act as a medium between a customer and the RTO and/or ISO. The bid may include the hours that the customer would like to participate in the ELDR program, an amount that the customer will curtail their electric load by, a minimum number of hours that the customer wants to participate, and/or an amount or rate at which the customer would like to be compensated. In various cases, a customer is allowed to adjust their bid, but only before the predefined time (e.g., 10:30 A.M. on the day before participation in the day ahead market).

At a predefined time on the bidding day (e.g., 1:30 P.M. on the day before the participation day), the bid may become locked and a day-ahead locational marginal price (LMP) may be released by the RTO and/or ISO to the customer. Further, the RTO and/or ISO may indicate which of the participation hours of the customer's bid have been approved. The approved hours may indicate hours that the customer is required to reduce their electric load based on their bid. If the customer does not reduce their electric load during the approved hours, the customer may be subject to penalties.

The day-ahead LMP received by the customer indicates the price at which the customer will be compensated for the participation day. The revenue that a customer can generate may be based on reductions in customer's electric load, as committed in the customer's bid. This is illustrated by the piecewise function below. The piecewise function is shown to include term $C_{DA_1}, \ldots C_{DA_i}$ may represent the amount of revenue that the customer generates during the participation day. The term $P_{red_i}$ [kW] may represent the amount of power in kilowatts that the customer has lowered their electric load (at an $i^{th}$ hour) while the term $r_{DA_i}$ [\$/kWh] may represent the day-ahead LMP with units of dollars per kilowatt hour (at an $i^{th}$ hour). The value NBT (Net Benefits Test) is a threshold value that may have the same units as the day-ahead LMP. In some cases, the value is referred to as a "Net Benefits Threshold" (NBT) which may be the same as the "Net Benefits Test" (NBT) threshold. The NBT threshold may indicate a value at which it is beneficial for the RTO and/or ISO to allow the customer to participate in the ELDR program. The NBT threshold may be a point on a supply curve, the NBT threshold may indicate where net benefits exceeds a load cost. The NBT threshold may indicate elasticity of one for the supply curve. A customer may only be compensated for hours where the NBT threshold is less than or equal to the day-ahead LMP. Comparing these values may be referred to as a "Net Benefits Test." The NBT threshold may be a value that any customer can access via a website of the RTO, ISO, and/or CSP. In some embodiments, the RTO, ISO, and/or CSP posts the NBT threshold on a website on the $15^{th}$ day of every month for the following month.

$$C_{DA_i} = \begin{cases} P_{red_i} * r_{DA_i} & r_{DA_i} \geq NBT \\ 0 & \text{otherwise} \end{cases}$$

Real-Time Market

The real-time ELDR market that the RTO and/or ISO may provide to the customer may allow a customer to place a bid for and participate in the real-time ELDR market on the same day. The real-time ELDR market may require the bid (e.g., a bid similar and/or the same as the bid of the day-ahead market) to be submitted to the RTO and/or ISO at least three hours before the top of the start of a participation hour. The ELDR program may allow a customer to participate in both the real-time ELDR market and the day-ahead ELDR market. In some embodiments, the RTO and/or ISO may require that a bid for the real-time ELDR market be submitted before a predefined time on a day preceding the participation day (e.g., 6:00 P.M.) for a customer to be compensated for both the real-time ELDR market and the day-ahead ELDR market.

A customer may be compensated for participation in the real-time ELDR market based on the NBT previously described above, the $P_{red_i}$ amount previously described above, and a real-time LMP. In some embodiments, in the real-time market, a customer will be awarded participation hours, or there will be a high probability of being awarded participation hours (e.g., 99%) if a customer bid includes a compensation rate that is greater than the NBT threshold. The real-time LMP may be the amount at which a customer is compensated for participation in the real-time ELDR market.

The real-time LMP may be referred to herein as $r_{RT_i}$[$/kWh], specifically, in the piecewise equation below which may indicate the compensation for participation in the real-time ELDR market. The term $C_{RT_i}$[$] below may indi- $$C_{RT_i} = \begin{cases} P_{red_i} * r_{RT_i} & r_{RT_i} \geq NBT \\ 0 & \text{otherwise} \end{cases}$$

cate the amount by which a customer is compensated for participating in the ELDR program. In the equation below, $P_{red_i}$ [kW] may be the amount which the customer reduces their electric load at hour i while $C_{RT_i}$ may the amount at which a customer is compensated at hour i.

In addition to receiving the revenue described with reference to the equation above, a customer may receive a "Make Whole Payment" (MWP). The MWP may be a payment made for a segment when particular conditions are met. The MWP may be available for a customer participating in either or both of the day-ahead ELDR market and the real-time ELDR market. The conditions may be that the electric load curtailment of the customer is within 20% of the bid electric load curtailment. The segments may be contiguous participation hours (e.g., 11 A.M. through 3 P.M.). In the equation below, the term $C_{MWP\_RT_i}$ [$] may represent the amount that a customer is compensated for a MWP at an $i^{th}$ hour. The value $v_{RT_i}$ [$] may represent the real-time load response bid at an $i^{th}$ hour, $v_{bal_i}$ [$] may represent a balancing synchronous reserve revenue above cost at an $i^{th}$ hour, $P_{disp_i}$ may represent a real-time dispatched power at an $i^{th}$ hour, the electric load that may be bid by the customer.

$$C_{MWP\_RT_i} = \begin{cases} v_{RT_i} - v_{bal_i} - C_{RT_i} & r_{bid_{RT_i}} \geq NBT \text{ and } |P_{red_i} - P_{disp_i}| \leq 0.2 \ P_{disp_i} \\ 0 & \text{otherwise} \end{cases}$$

The term of the above equation, $v_{RT_i}$ [$], may be calculated based on the equation below. The equation below minimizes two power values (i.e., $P_{disp_i}$[$] and $P_{red_i}$ described above) multiplied by a value, $r_{bid\_RT_i}$. The value $r_{bid\_RT_i}$ may be a bid that a customer had previously sent to the RTO and/or ISO, indicating the rate at which the customer wants to be compensated.

$$v_{RT_i} = \min(P_{disp_i}, P_{red_i}) r_{bid\_RT_i}$$

The entire payment for a MWP segment may be illustrated by the following equation. The term j may represent a particular segment while the term i may indicate a particular hour. The term $C_{seg\_MWP\_RT_j}$ [$] represents compensation to the customer for the $j^{th}$ segment MWP while the term $C_{shutdown}$[$] may be a shutdown cost that may be submitted in a customer bid. The shutdown cost may not be available as compensation (e.g., the top term of the piecewise function below) if at least one hour of a segment has an electric load reduction deviation that is greater than 20% of the electric load bid (e.g., the power dispatched by a utility).

$$C_{Seg\_MWP\_RT_j} = \begin{cases} \max\left(\sum_{i \in Seq_j} C_{MWP\_RT_i} + C_{shutdown}, 0\right) & \begin{cases} r_{bid\_RT_i} \geq NBT \\ |P_{red_i} - P_{disp_i}| \leq 0.2 \ P_{disp_i} \forall \ i \in Seg_j \end{cases} \\ \max\left(\sum_{i \in Seq_j} C_{MWP\_RT_i}, 0\right) & \begin{cases} r_{bid\_RT_i} \geq NBT \\ \exists \ i \in Seq_j / |P_{red_i} - P_{disp_i}| > 0.2 \ P_{disp_i} \\ \text{otherwise} \end{cases} \end{cases}$$

For both the real-time ELDR market and the day-ahead ELDR market, there may be penalties if the customer fails to reduce their electric load by a proper amount. A balancing operating reserve (BOR) charge may be made by the RTO and/or ISO for hours when the electric load reduced of a customer deviates from the bid electric load (e.g., the power dispatched by the utility) by more than 20%. In some cases, a customer may be charged two BOR penalties, that is, a "RTO BOR" and one of an "East BOR" deviation rate or an "West BOR" deviation rate. The "East BOR" and the "West BOR" deviation rates may be applied based on the location of the customer. A BOR may be defined by the equation below. In the equation below, the term $BOR_{ch_i}$[$] represents a BOR penalty at a particular rate and hour. The term $r_{BOR_i}$[$1 kWh] represents the rate at which a customer is penalized for a particular hour, i. In some cases, one or more rates are applicable for a particular hour. In these cases, several charges may be calculated and summed for that hour. In many cases, the rates are less than a dollar per megawatt hour ($/MWh).

$$BOR_{ch_i} = \begin{cases} |P_{red_i} - P_{disp_i}| r_{BOR_i} & |P_{red_i} - P_{disp_i}| > 0.2 P_{disp_i} \\ 0 & \text{otherwise} \end{cases}$$

Economic Load Demand Response (ELDR) Program Optimization

Figure 10:
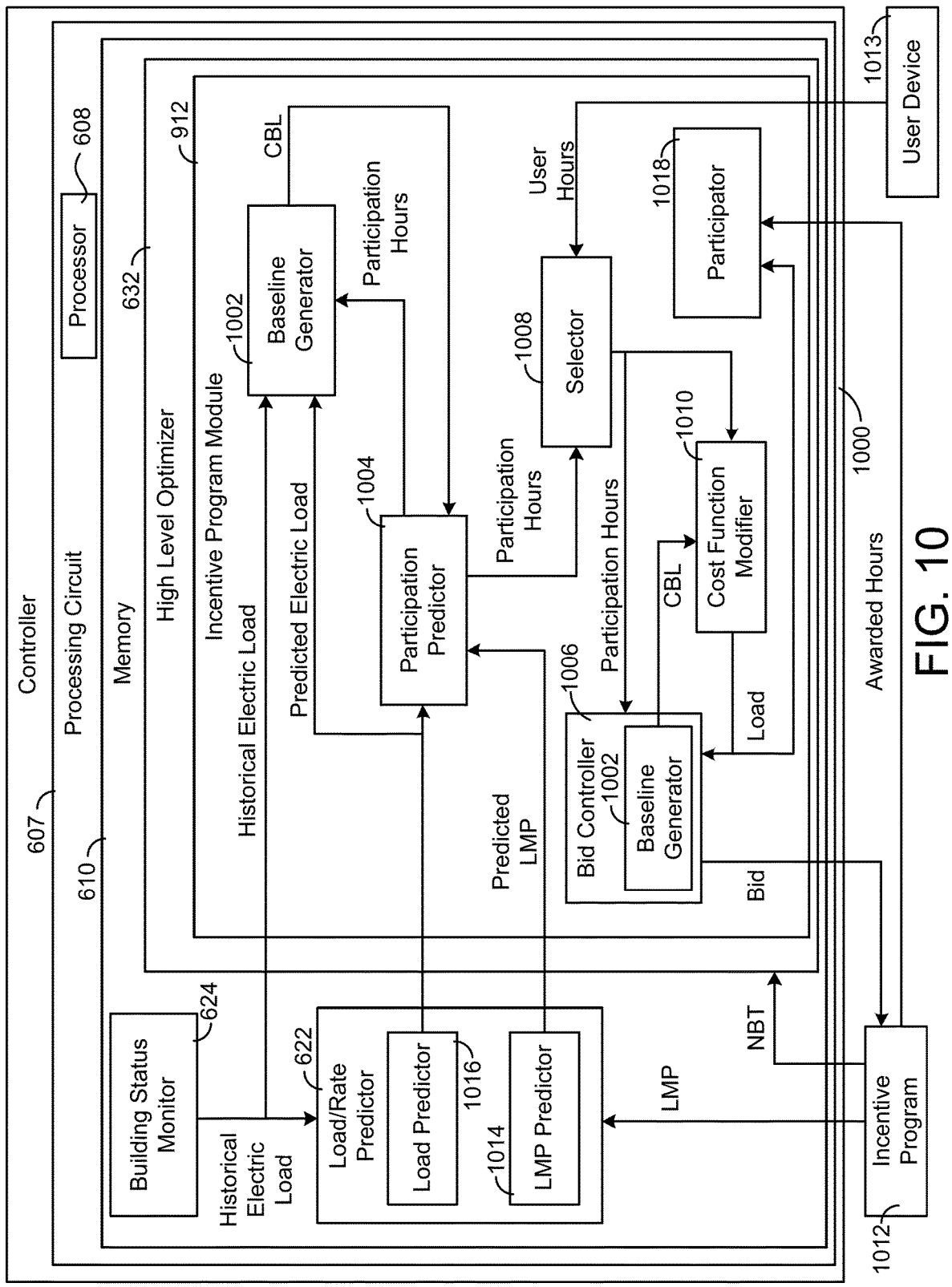
FIG. 10 is a block diagram of a controller including components for participating in an economic load demand response (ELDR) program, according to an exemplary embodiment.

Referring now to FIG. 10, controller 1000 is shown in greater detail to include components configured to perform ELDR optimization, according to an exemplary embodiment. Controller 1000 may be the same and/or similar to energy storage controller 506 as described with reference to FIG. 6A, controller 552 as described with reference to FIG. 6B, and/or planning tool 702 as described with reference to FIG. 7. FIG. 10 is further shown to include incentive program 1012 and user device 1013 in communication with controller 1000. Incentive program 1012 may be a computer system or server of an RTO, ISO, and/or CSP that is configured to allow controllers, e.g., controller 1000, to participate in an ELDR program that the RTO, ISO, and/or CSP may provide. In some cases, incentive program 1012 is a CSP that handles bidding and settlements for a RTO. User device 1013 may be a user device such as a smartphone, a laptop, a desktop, a tablet, and/or any other kind of computing device. The functions of controller 1000 with respect to participating in an ELDR program can be implemented by energy storage controller 506 and/or planning tool 702.

Memory 610 is shown to include building status monitor 624, as described with further reference to FIG. 6. Building status monitor 624 is shown to provide information indicative of the electric load of a building (e.g., buildings 116) to baseline generator 1002 and load/rate predictor 622, historical electric load information. In some embodiments, building status monitor 624 provides historical electric load information to load/rate load predictor 1016. Building status monitor 624, may be in communication with a building management system. In some embodiments, building status monitor 624 communicates with building management system 606 and receives electric load information from building management system 606 (as shown in FIGS. 6A-6B). Based on the electric load information that building status monitor 624 receives, building status monitor 624 can be configured to generate a log of electric load information for a plurality of years, months, days, hours, minutes, seconds, etc. The stored electric load log may be the historical electric load information that building status monitor 624 provides to baseline generator 1002 and load/rate predictor 622.

Load/rate predictor 622 is shown to include load predictor 1016. Load predictor 1016 can be configured to receive electric load information from building status monitor 624. In some embodiments, load predictor 1016 is configured to predict load information based on the historical electric load information received from building status monitor 624. In some embodiments, the predicted load information indicates an electric load at a particular time in the future and/or a period of time in the future. In some embodiments, load predictor 1016 uses weather forecasts, load information and/or any other information that building status monitor 624 has logged, etc. Load/rate predictor 622 can be configured to predict an electric load based on the methods disclosed in U.S. application Ser. No. 14/717,593 filed on May 20, 2015, the entirety of which is incorporated by reference herein.

Load/rate predictor 622 is further shown to include locational marginal price (LMP) predictor 1014. LMP predictor 1014 is shown to receive information indicative of an LMP from incentive program 1012. In some embodiments, the LMP information includes one and/or both of a day-ahead LMP and a real-time LMP. The day-ahead LMP may be a price at which controller 522 may be compensated for reductions in energy use at based on participation in a day-ahead market, a ELDR market in which bids are submitted one day ahead of participation times. Similarly, the real-time LMP may be a price at which controller 1000 is compensated for reductions in energy use for a real-time ELDR market, a market that does not require bids to be submitted a day ahead but rather on the same day as participation. The day-ahead ELDR market and the real-time ELDR market are further illustrated above and elsewhere herein.

LMP predictor 1014 can be configured to generate a predicted LMP based on an LMP received from incentive program 1012. LMP predictor 1014 can be configured to generate a predicted day-ahead LMP and a predicted real-time LMP. In some embodiments, LMP predictor 1014 stores a history of LNIPs received from incentive program 1012. In some embodiments, based on the date, current weather, or other information, LMP predictor 1014 can be configured to generate a predicted real-time LMP and a predicted day-ahead LMP. LMP predictor 1014 can be configured to predict a real-time LMP and/or a day-ahead LMP based on weather forecasts and/or a historical log of past LNIPs. LMP predictor 1014 can be configured to predict the LMP (e.g., the real-time LMP and/or the day ahead LMP) based on the methods disclosed in U.S. application Ser. No. 14/717,593 filed on May 20, 2015. In some embodiments, LMP predictor 1014 uses a stochastic model to predict LMPs. For example, LMP predictor 1014 may use a prediction model and may train the prediction model to generate an LMP model based on historical LMPs to determine coefficients for the model. LMP predictor 1014 can be configured to provide the predicted LMP to participation predictor 1004. In this example, LMP predictor 1014 may predict that an LMP for a weekday is the LMP for the most recently occurring weekday. Similarly, for a weekend, the LMP for the weekend may be the LMP for the most recently occurring weekend.

LMP predictor 1014 can be configured to generate a predicted LMP for each hour of a future day. For example, for one particular day in the future (e.g., the next day), LMP predictor 1014 can be configured to determine a predicted real-time LMP and a predicted day-ahead LMP at each hour of the day. The LMPs can be provided by LMP predictor 1014 to participation predictor 1004. In this regard, the LMPs may be a vector of length 24, with an LMP value for each hour indicated by an index, e.g., 1-24. In some embodiments, LMP predictor 1014 can be configured to generate a predicted LMP for a plurality of days (e.g., for an optimization period that is a plurality of days). For example, LMP predictor 1014 can be configured to generate a predicted LMP for a week in the future, a month in the future, and/or a year in the future.

Incentive program module 912 can be configured to cause controller 1000 to participate in an ELDR program offered by incentive program 1012. Incentive program module 912 can be configured to receive LMPs from incentive program 1012 (e.g., a real-time LMP and a day ahead LMP) and receive a NBT threshold from incentive program 1012. Based on this information and electric load information, incentive program module 912 can be configured to generate a bid and send the bid to incentive program 1012. The bid may include participation hours, a curtailment amount, and a bid amount. The bid amount may be a rate of compensation (e.g., $/kWh). Incentive program module 912 can be configured to receive awarded hours from incentive program 1012, awarded to incentive program module 912 based on the bid provided to incentive program 1012. During the awarded hours, incentive program module 912 can be configured to cause HVAC equipment to operate to meet the curtailment amount of the bid.

Incentive program module 912 can generate a bid (or modify a bid) at a particular interval. The interval may be once every 15 minutes, once every hour, or once every day. In some embodiments, incentive program module 912 generates a single bid for participating in the ELDR program when incentive program 1012 releases a day-ahead LMP. The bid may indicate decisions made by the incentive program module 912 regarding when to participate in the ELDR program (e.g., what hours of an event day or optimization period to participate in the ELDR program) and the amount that incentive program module 912 determines it will curtail an electric load (e.g., grid load) by. This may be at a particular time (e.g., after 1:30 P.M.).

Incentive program module 912, described with reference to FIG. 9, is shown in FIG. 10 to include baseline generator 1002. Baseline generator 1002 can be configured to generate a CBL based on participation hours, a predicted electric load, and historical electric load information. In some embodiments, baseline generator 1002 communicates with participation predictor 1004 to determine an event start hour and an event end hour for participation in the ELDR program. In this regard, participation predictor 1004 may generate participation hours and use the participation hours as a search space to determine an event start hour and an event end hour. In this regard, baseline generator 1002 can be configured to generate a CBL value for a plurality of hours so that participation predictor 1004 can determine an event start hour and an event end hour.

Baseline generator 1002 can be configured to receive historical electric load information from building status monitor 624. The historical electric load information may indicate an electric load of a building (e.g., buildings 116), campus (e.g., campus 12), a central plant (e.g., central plant 118), and energy generation equipment (e.g., energy generator 120) (at one or more times on one or more days (e.g., hourly electric load, electric load for a day, average electric load for a day, etc.). Baseline generator 1002 is further shown to be configured to receive a predicted load from load predictor 1016. The predicted load may predict a load in the future e.g., on a day that controller 522 will be participating in an ELDR program.

Baseline generator 1002 can be configured to generate a same-day CBL and/or an SAA CBL and provide the generated CBL to participation predictor 1004. For an SAA CBL, baseline generator 1002 can be configured to generate a weekday SAA CBL or a weekend/holiday CBL. The differences between the weekday SAA CBL, the weekend/holiday CBL, and the same-day CBL are described below in Table 1.

A CBL may be the threshold from which incentive program 1012 determines how much a customer (e.g., controller 1000) has reduced their electric load for each participation hour. For this reason, customers may be compensated by incentive program 1012 based on the CBL for particular participation days. The CBL may be a baseline for one particular participation day i.e., a CBL may change day to day. Generally, the CBL can be based on the hour at which participation ends and/or starts.

In Table 1, the differences between an SAA and a same-day CBL are illustrated. As can be seen, there are two different types of SAA CBLs, a weekday SAA CBL and a weekend/holiday SAA CBL. If the participation day falls on a weekday, the weekday SAA CBL may be appropriate while if the participation day falls on a weekend/holiday then the weekend/holiday SAA may be applicable.

TABLE 1

Differences in parameters between SAA and same-day CBL

| Parameter | SAA | | Same Day |
|---|---|---|---|
| Day Type | Weekday | Weekend/Holiday | N/A |
| Calculation | Average | Average | Average |
| CBL Basis Days | 5 | 3 | N/A |
| CBL Basis Day Limit | 45 | 45 | N/A |
| Start Selection From X Days Prior To Event | X = 1 | X = 1 | N/A |
| Exclude Previous Curtailment Days? | Yes | Yes | N/A |
| Exclude Long and Short Daylight Saving Time (DST) Days | N/A | Yes | N/A |
| Exclude Average Event Period Usage Less Than A Threshold | Threshold = 25% | Threshold = 25% | N/A |
| Exclude X Number Of Low Usage Days | X = 1 | X = 1 | N/A |
| Use Previous Curtailment If CBL Basis Window Is Incomplete | Yes | Yes | N/A |
| Use Highest Or Recent Previous Curtailment Day | Highest | Highest | N/A |
| Adjustments | SAA | SAA | None |
| Allow Negative Adjustments | Yes | Yes | N/A |
| Adjustments Start (HE0-X) | X = 4 | X = 4 | N/A |
| Number Of Adjustment Basis Hours | 3 | 3 | N/A |

For all three types of CBLs, the CBLs may be determined based on an average calculation. For the SAA CBLs, there may be a 45 day window (days prior to a participation day) for selecting days to use in generating the CBL (e.g., determining an average). Further, for the SAA CBLs, the days selected for generating the CBL may be at least one day prior to the participation day. For SAA CBLs, any participation days may be excluded from use in generating the CBL.

For weekend/holiday SAA CBLs, any days which are daylight saving time days may be excluded from use in generating a weekend/holiday SAA CBL. For both the weekday and weekend/holiday SAA CBLs, a threshold of 25% may be used in removing particular days from use in generating the SAA CBL. This is described in further detail below. When generating the weekday or weekend/holiday SAA CBLs, one lowest energy load participation day may be removed from use in generating the weekday or weekend/holiday SAA CBL. This is also further described below.

In the event that no days are available in the 45 day window for use in generating an SAA CBL, for the both weekday and the weekend/holiday SAA CBLs, days that include participation in the ELDR program may be used in generating the SAA CBL. The participation days used may be the highest electric load days that include participation in the ELDR program. For both SAA CBLs, Table 1 indicates that a particular offset may be used in the SAA CBL, an SAA offset. Table 1 further indicates that this offset may be negative. For a same-day CBL, there may be no offset. The adjustment may be determined based on hours starting four hours before the beginning of participation in the ELDR program. For an SAA CBL, three hours may be used in calculating the SAA adjustment.

Baseline generator 1002 can be configured to generate a customer baseline load (CBL). Baseline generator 1002 can be configured to generate an SAA baseline and/or a same day baseline. In some embodiments, a user may indicate via user device 1013, a selection of SAA or same-day baseline. Based on the selection, baseline generator 1002 can be configured to generate a CBL indicative of the selected CBL type. In some embodiments, baseline generator 1002 receives a selection of CBL type from incentive program 1012. In this regard, baseline generator 1002 can be configured to generate a CBL based on the CBL type indicated by the selection of the incentive program 1012. In some embodiments, incentive program 1012 determines which baseline should be used by controller 1000. Incentive program 1012 may provide a user with a tool (e.g., web tool) to determine which type of CBL (i.e., SAA CBL or same-day CBL) is applicable for a particular customer.

Same Day CBL

Baseline generator 1002 can be configured to generate a same day CBL based on a predicted load received from load predictor 1016 and/or participation hours received from participation predictor 1004. The predicted load information may indicate the electric load of a building (e.g., buildings 116) at various hours, minutes, seconds, days, weeks, months, etc. in the future.

Baseline generator 1002 can be configured to use the equation below to generate a same day CBL. The same-day CBL may be an average of three hours one hour prior to the first hour of participation and two hours one hour after participation. In some embodiments, baseline generator 1002 can be configured to use the equation below to generate a same-day CBL. In the equation below, $e_{CBL,k}$ represents the same-day CBL. The values ES and EE represent a starting hour (ES) and an ending hour (EE) for the time period of participation in the ELDR program (e.g., the first hour of participation and the last hour of participation in a participation day). The starting hour and the ending hour may be the starting and ending hours of the participation hours received from participation predictor 1004. In some embodiments, participation predictor 1004 provides baseline generator 1002 with ES and EE hours of the participation hours in order to "search" the participation hours for hours that are optimal.

The term $e_i$ may be the electric load during the $i^{th}$ hour. In some embodiments, $e_i$ is predicted electric load value received from load predictor 1016. Similarly, $e_1$ may be a value indicative of the predicted electric load of building (e.g., buildings 116) during the $j^{th}$ hour. In some embodiments, $e_1$ is a predicted load value received from load predictor 1016.

$$e_{CBL,k} = \frac{\sum_{i=ES-4}^{ES-2} e_i + \sum_{j=EE+2}^{EE+3} e_j}{5} \forall k = 1 \ldots 24$$

Incentive program module 912 can be configured to not participate in the earliest three hours of a day and the last two hours in the day. This may be a rule set by incentive program 1012 to make sure that there are enough hours to be used by baseline generator 1002 to generate the same-day CBL. For this reason, the ELDR program may not allow a customer to participate in the first three hours of a day and the last two hours of a day to make sure that a same day CBL can be calculated for any day. The same day CBL may be a constant CBL, i.e., the CBL may be the same for every participation hour. This is illustrated in FIG. 13 where the same day CBL is shown as a horizontal line.

Baseline generator 1002 can be configured to generate an SAA CBL. An SAA CBL may be a CBL that is a standard tariff defined CBL which may be applicable for most non-variable economic demand resources. Baseline generator 1002 can be configured to generate the SAA CBL based on electric load information received from building status monitor 624. In some embodiments, baseline generator 1002 stores electric load information received from building status monitor 624 and predicted load information received from load predictor 1016 and uses the electric load information and the predicted load information to generate the SAA CBL.

Baseline generator 1002 can be configured to generate an SAA CBL based on the day which the participation in the ELDR program occurs. Baseline generator 1002 can be configured to determine if the participation time in the ELDR program occurs on a weekday or a weekend and/or holiday and generate an SAA CBL based on whether the participation in the ELDR program falls on a weekday, weekend, or holiday (i.e., generate a weekday SAA CBL or a weekend/holiday CBL).

The SAA CBL may average a different number of days based on what type of day (e.g., weekday, weekend, or holiday), participation in the ELDR program occurs (see Table 1, CBL Basis Days). If the day that participation in the ELDR program occurs is a weekday, baseline generator 1002 can be configured to average four days with the highest electric load out of five days that are the most recent weekdays in which controller 1000 has not participated in the ELDR program. If the day that participation in the ELDR Program occurs is a weekend or holiday, baseline generator 1002 can be configured to average two weekends or holidays with the highest electric load out of the three most recently occurring weekend or holiday days in which controller 1000 has not participated in the ELDR program (see Table 1, Exclude X Number Of Low Usage Days).

Weekday SAA CBL

The description below is an example of determining a weekday SAA CBL by baseline generator 1002. Baseline generator 1002 can be configured to generate a weekday SAA CBL based on the equations illustrated below. The equation immediately below may indicate the five most recently occurring days with no participation in the ELDR program. Baseline generator 1002 can be configured to identify these five week days when the participation day is a weekday and three weekends or holidays when the participation day is a weekend or holiday. For this example, the participation day is a weekday and the term D is the set of weekdays (excluding weekday holidays), i.e., $d_1$, $d_2$, $d_3$, $d_4$, $d_5$. These days may be days that controller 1000 has not participated in the ELDR program and that are the most recently occurring weekdays. Baseline generator 1002 may store a historical log of weekdays, weekends, and holidays. The log may indicate whether a particular day included participation in the ELDR program. Baseline generator 1002 can be configured to retrieve the five most recent non-participation days from the historical log.

$$D = \{d_1, d_2, d_3, d_4, d_5\}$$

Baseline generator 1002 can be configured to receive electric loads for a plurality of days and hours for the past from building status monitor 624. The equation below indicates the hours of each day of the set of days above, where $d_i$ is an hourly load vector. Thus, the following equation can represent the electric load for each hour of a day, i.e., for each day of the set of days in the above equation. In the following equation, the day term, $d_i$, may be a day with a set of electric loads at each hour of an $i^{th}$ day. The term $e_{ij}$ may represent the electric load on the $i^{th}$ day at the $j^{th}$ hour which may be an electric load received from building status monitor 624.

$$d_i = [e_{i1} \ldots e_{i24}]$$

Baseline generator 1002 can be configured to generate a daily average event period electric load for each day of the set of days, D. Baseline generator 1002 can be configured to use the equation below to generate the daily average for each day. For a particular day that controller 1000 is participating in the ELDR program, baseline generator 1002 can be configured to generate a daily average event period electric load. In the equation below, the term $\bar{d}_i$ represents the daily average event period electric load. The term k∈participation represents the participation hours of the day that controller 1000 will be participating in the ELDR program, the participation hours received from participation predictor 1004. These hours may not need to be contiguous. The term n may represent the total number of hours that that controller 1000 will be participating in the ELDR program (e.g., the total number of participation hours received from participation predictor 1004). This may cause the daily average event period electric load to be based on hours that controller 1000 will be participating in the ELDR program.

$$\bar{d}_i = \sum_{k \in participation} \frac{e_{ik}}{n} \forall i = 1, \ldots, 5$$

After determining the daily average event period electric load, baseline generator 1002 can be configured to average the daily average event period electric load for each of the five days of the set of days, D. The term $\overline{D}$ represents the average of each daily average event period electric load, $\bar{d}_i$.

$$\overline{D} = \sum_{i=1}^{5} \frac{\bar{d}_i}{5}$$

After determining the average $\overline{D}$, baseline generator 1002 can be configured to remove days from the set of days, D. Baseline generator 1002 can be configured to use the relationship, $\bar{d}_i < 0.25 \times \overline{D}$ to remove days from the set of days, D (see Table 1 for 0.25, Exclude Average Event Period Usage Less Than A Threshold). If any of the days $\bar{d}_i$ meets the requirement of the relationship, those days are removed from the set of days, D, and the most recent non-event day is used to determine $\overline{D}$ a second time. In some embodiments, baseline generator 1002 only uses the most recent non-event days that occur 45 days before the day which controller 1000 is participating in the ELDR program. Baseline generator 1002 can perform as many iterations of this process as necessary until all of the days of the set of days D are greater and/or equal to, 0.25×D.

Once, the set of days D is finally determined by baseline generator 1002, baseline generator 1002 can be configured to determine an hourly average of four of the five days, the four days having the highest electric loads. If baseline generator 1002 cannot determine five days that do not meet the condition $\bar{d}_i < 0.25 \times \overline{D}$ 45 days prior to the day that controller 1000 will be participating in the ELDR program but can only find four days, baseline generator 1002 can average the four days and may not exclude any days from the average. If baseline generator 1002 only finds three or less days that do not meet the criteria within the forty five day window, then baseline generator 1002 can be configured to select the most recent event day (i.e., a day in which controller 1000 participated in the ELDR program) and use the event day in the determination of the CBL. These event days may be the highest electric load event days of the last 45 days. Baseline generator 1002 can be configured to use event days so that the set of days, D, has at least four days that do not meet the criteria $\bar{d}_i < 0.25 \times \overline{D}$.

The following equation can be used by baseline generator 1002 to generate a preliminary CBL. The preliminary CBL may be an hourly average of the four days of five days that do not meet the criteria $d_i < 0.25 \times \overline{D}$. The four days may be days that make the relationship $i \neq arg_i min(\bar{d}_i)$ true, i.e., the four days do not make $\bar{d}_i$ be a minimum. In the equation below, the term $\bar{e}_i$ represents the hourly average for a plurality of hours.

$$\bar{e}_j = \sum_i \frac{e_{ij}}{4} \quad i \neq arg_i min(\bar{d}_i)$$

Baseline generator 1002 can be configured to offset the preliminary CBL to determine the CBL, the "standard CBL" (e.g., the CBL that baseline generator 1002 provides to participation predictor 1004). The standard CBL is represented by the term $e_{CBL}$ below which is a set of CBL values for each hour of a day.

$$e_{CBL} = [e_{CBL,1} \cdots e_{CBL,24}]$$

Baseline generator 1002 can be configured to generate the CBL by offsetting the preliminary CBL, with an SAA value, $e_{SAA}$.

$$e_{CBL,j} = \bar{e}_j + e_{SAA}$$

Baseline generator 1002 can be configured to determine $e_{CBL,j}$ by first determining the SAA value, $e_{SAA}$. The equation below illustrates one method that baseline generator 1002 can be configured to use to determine $e_{SAA}$. In the equation below, the term EE may represent the starting hour of participation in the ELDR program by controller 1000 while ES may represent the ending hour of participation in the ELDR program (e.g., the hours defined by the participation hours). The time between EE−2 and ES−4 may represent the SAA hours (e.g., SAA hours 1406 of FIG. 14). The term $e_{0k}$ may represent the electric load at the $k^{th}$ hour of the participation day while the value $\bar{e}_k$ may represent the average electric load over the hour. The values $e_{0k}$ and $\bar{e}_k$ may be and/or be based on predicted load information received from load predictor 1016. In some embodiments, the values $e_{0k}$ and $\bar{e}_k$ are determined by baseline generator 1002 based on the predicted load information received from load predictor 1016.

$$e_{SAA} = \sum_{k=ES-4}^{EE-2} \frac{e_{0k} - \bar{e}_k}{3}$$

It should be noted that the electric load during the SAA hours, i.e., between ES−4 and EE−2, impact the CBL, $e_{CBL}$ such that a high electric load during the SAA hours results in a higher baseline. Thus, increasing the curtailment amount and increasing the revenue from participation in the EDLR program. Similarly, a low electric load during the SAA hours results in a lower baseline, thus decreasing the amount reduced and decreasing revenue earned in the participation in the ELDR program. For this reason, incentive program 1012 may have rules in place that prohibit controller 1000 from artificially raising the electric load of building (e.g., buildings 116) during the SAA hours to artificially increase the CBL and thus increase revenue. Incentive program 1012 may use a plurality of rules to determine whether controller 1000 abnormally raised the electric load during the SAA hours and may reject settlements with controller 1000 where controller 1000 artificially raised the electric load. However, incentive program 1012 may allow controller 1000 to increase an electric load during the SAA in response to energy price changes without penalizing (i.e., rejecting a settlement) controller 1000.

Weekend/Holiday SAA CBL

Baseline generator 1002 can be configured to generate weekend/holiday SAA CBL. Baseline generator 1002 can be configure to generate the weekend/holiday SAA CBL based on the electric load information received from building status monitor 624 and the predicted load information received from load predictor 1016. Baseline generator 1002 may generate the weekend/holiday SAA CBL in the same way as it generates the weekday SAA CBL. However, baseline generator 1002 can be configured to use the three most recent Saturdays, Sundays, or Holidays that are not days that controller 522 has participated in the ELDR program as opposed to using weekdays. Of the three days selected by baseline generator 1002 for generating a weekend/holiday SAA CBL, baseline generator 1002 may use two of the three days with the highest electric load, in the same way the baseline generator 1002 uses four of the five days of the set D when generating a weekday CBL. The baseline generator 1002 may be configured to not use any Saturday, Sunday, or Holiday that falls on a daylight savings time day (e.g., the day begins a daylight savings time period or ends a daylight savings time period) (e.g., clocks are shifted backward or forward at the beginning or the ending of the day).

Incentive program module 912 is shown to include participation predictor 1004. Participation predictor 1004 is shown to receive the CBL from baseline generator. Further, Participation predictor 1004 is shown to receive a predicted LMP from LMP predictor 1014 (e.g., a predicted day-ahead LMP and a predicted real-time LMP). Participation predictor 1004 can be configured to generate participation hours. Participation predictor 1004 can be configured to provide selector 1008 with the participation hours.

Participation predictor 1004 can be configured to generate and/or determine (e.g., predict) participation hours. In some embodiments, the participation hours are a vector or mask (e.g., a participation mask) of ones and zeros. The participation hours may represent a full day, e.g., the participation mask may include twenty four total ones and zeros where a one represents participation and a zero represents no participation at a particular hour. The participation hours are provided to selector 1008. Participation predictor 1004 can further be configured to provide the participation hours to baseline generator 1002. Participation predictor 1004 can be configured to use the CBL received from baseline generator 1002 to further determine the participation hours.

Participation predictor 1004 can be configured to set all hours of the participation hours to 0 (e.g., all hours of a particular day to no participation), indicating no participation in any of the hours. Based on a NBT threshold value received from incentive program 1012, the predicted LMPs received from LMP predictor 1014, and/or a CBL received from baseline generator 1002, participation predictor 1004 can be configured to select hours that controller 1000 will participate in the ELDR program. In some embodiments, incentive program module 912 retrieves the NBT threshold value once every month after the 15$^{th}$ of the month from incentive program 1012, the NBT threshold being the NBT threshold for the next month. In some embodiments, participation predictor 1004 may set none, one, some, or all of the participation hours to 1, indicating participation except hours restricted by incentive program 1012 (e.g., hours restricted by incentive program 1012 based on CBL type).

Participation predictor 1004 can be configured to compare the predicted day-ahead LMP and the predicted real-time LMP for each hour of a day to the NBT threshold value to determine if the associated hour should be a participation hour. The steps below illustrate steps that participation predictor 1004 can be configured to perform to determine the participation hours. These steps are further illustrated in FIG. 11A. In some embodiments, only one of the conditions of steps 1104 and 1106 need to be true to set an hour to participation. Participation predictor 1004 can be configured to perform steps 1102-1112 to generate the participation hours or only perform steps 1102-1108 to generate the participation hours. The participation mask generated by participation predictor 1004 can be provided to selector 1008. The participation hours may be the hours where $p_i = 1$.

Figure 11A:
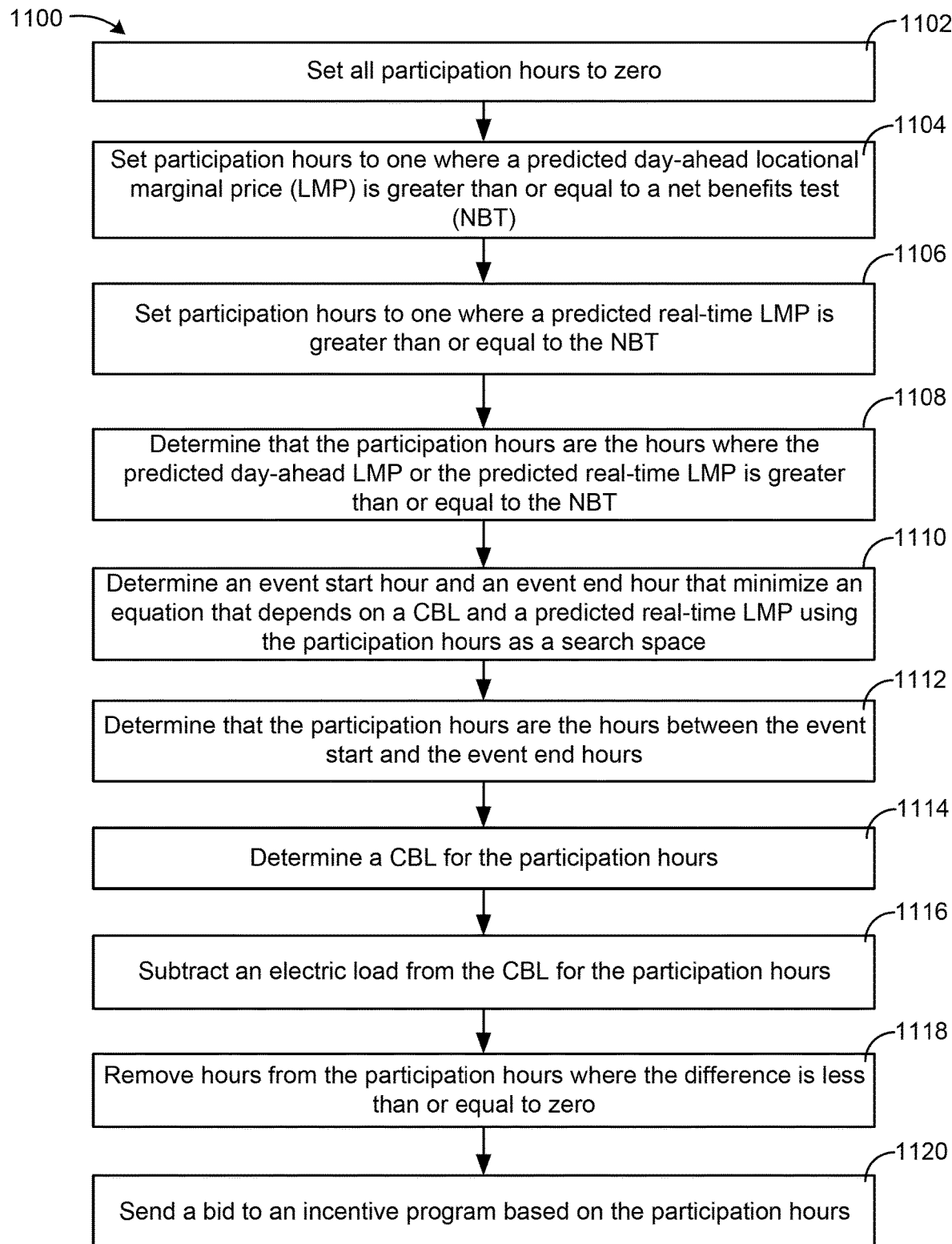
FIG. 11A is a flow diagram of a process for determining participation hours in the ELDR program and sending a bid to an incentive program, according to an exemplary embodiment.

Referring now to FIG. 11A, a process 1100 for determining participation hours and transmitting a bid to incentive program 1012 is shown, according to an exemplary embodiment. Controller 1000 and the various components of controller 1000 can be configured to perform process 1100. Further, energy storage controller 506, controller 552, and/or planning tool 702 can be configured to perform process 1101. In some embodiments, planning tool 702 may not send any bid to incentive program 1012 i.e., may not perform step 1120 of process 1100. In some embodiment, participation predictor 1004 can be configured to perform steps 1102-1108 or steps 1102-1112 of process 1100 to generate the participation hours based only on the NBT threshold and not on the CBL.

Step 1102: Set all participation hours to no participation, i.e., initialize a participation mask $p_i$ and set $p_i = 0$ Step 1104: Set $p_i = 1$ where $r_{DA_i} \geq NBT$ Step 1106: Set $p_i = 1$ where $r_{RT_i} \geq NBT$ Step 1108: The participation hours are the hours where the conditions in Step 1104 or Step 1106 are true In step 1102, participation predictor 1004 can set all participation hours to zero or otherwise to no participation. In some embodiments, the participation hours are represented by a participation mask, $p_i$. The participation mask may be a vector of ones and zeros which indicate either participation or no participation at various hours of an optimization period (e.g., a day). In step 1118, participation predictor 1004 can initialize the participation mask and set the entire participation mask to zero (e.g., all hours of the participation mask to zero).

In steps 1104 and 1106, participation predictor 1004 can determine that the participation hours are hours where the predicted day-ahead LMP received from LMP predictor 1014 is greater than the NBT threshold or the predicted real-time LMP received form the LMP predictor 1014 is greater than the NBT threshold. In some embodiments, process 1100 may include one or both of steps 1104 and 1106. In this regard, the participation hours may be based on the predicted real-time LMP and/or the day ahead LMP. In step 1108, participation predictor 1004 can determine that the participation hours are the hours where the conditions of step 1104 or 1106 are true.

In some embodiments, participation predictor 1004 can be configured to perform steps 1102-1112 to generate the participation hours. This approach may assume a constant maximum energy reduction.

Step 1102: Set all participation hours to no participation, i.e., initialize a participation mask $p_i$ and set $p_i = 0$ Step 1104-1108: Determine that the participation hours are hours where $r_{DA_i} \geq NBT$ or $r_{RT_i} \geq NBT$ are true Step 1110: Determine ES and EE from the equation:

$$\min_{ES,EE}\left(-\sum_{i=ES}^{EE} \hat{r}_{RT_i}(\hat{e}_{CBL,i} - \max((\hat{e}_i - P_{max}), P_{gridLimit}))\right)$$

with $p_i$ as search hours

Step 1112: The participation hours are the hours between the determined ES and EE In steps 1102-1108 above, participation predictor 1004 can determine hours that participation is allowed. These hours may act as a search space for step 1110. The search hours may be provided by participation predictor 1004 to baseline generator 1002 for determining $\bar{e}_{CBL,i}$ in order to determine ES and EE which are used to refine the participation hours.

In step 1110, participation predictor 1004 can minimize the equation with the participation hours determined in steps 1120-1124. The equation of step 1126 is shown to be dependent on a CBL, a predicted electric load, and a real-time LMP. Further, the equation is dependent on $P_{gridLimit}$ and $P_{max}$. Minimizing the equation can maximize potential revenue from participating the in ELDR program. The term, $\hat{e}_{CBL,i}$ may be a CBL determined by baseline generator 1002. This may be a CBL for a plurality of hours based on the search hours determined in steps 1104-1108. The CBL is a function of the event start, ES, and event end, EE hours. The CBL may be a CBL for a plurality of hours, e.g., the $i^{th}$ hours. In some embodiments, the CBL is an SAA CBL, in other embodiments, the CBL is a same-day CBL. The term $\hat{r}_{RT_i}$ may be a real-time predicted LMP received from LMP predictor 1014 for a plurality of hours, e.g., the $i^{th}$ hours while $r_{DA_i}$ may be a day-ahead predicted LMP received from LMP predictor 1014 for a plurality of hours, e.g., the $i^{th}$ hours Further, the $\hat{e}_i$ term may represent a predicted electric load. The predicted electric load may be received from load predictor 1016. Further, the equation of step 1110 is shown to include terms $P_{max}$ and $P_{gridLimit}$. These may be constant values stored by participation predictor 1004. In some embodiments, $P_{max}$ is a customer based value. This amount may indicate the maximum amount a customer can reduce their electric load by. $P_{max}$ may be based on equipment of a customer. For example, a value for $P_{max}$ may be 12 MW for a customer that has two co-gens. In some embodiments, $P_{gridLimit}$ is a value received from a utility. The value $P_{gridLimit}$ may be a minimum imposed on the customer by the utility. In some embodiments, $P_{max}$ and $P_{gridLimit}$ are constants over all hours. In various embodiments, $P_{max}$ and $P_{gridLimit}$ are hourly values. Based on the ES and the EE values determined by participation predictor 1004, participation predictor 1004 can determine, in step 1112, that the participation hours are between the ES and the EE hours.

Referring again to FIG. 10, selector 1008 can be configured to receive the participation hours from participation predictor 1004. Selector 1008 can be configured to further receive user hours from user device 1013. Selector 1008 can be a component that can be configured to select between user hours and participation hours. User hours may have a priority above the participation hours. When selector 1008 receives user hours but does not receive participation hours, selector 1008 can be configured to output participation hours as user hours, regardless of the participation hours received from participation predictor 1004. If selector 1008 does not receive user hours, selector 1008 can be configured to output the participation hours received from participation predictor 1004.

Selector 1008 can be configured to provide cost function modifier 1010 and bid controller 1006 with participation hours. Bid controller 1006 can be configured to receive participation hours from selector 1008 and load information from cost function modifier 1010. Based on the load information and the participation hours, bid controller 1006 can be configured to generate a bid to send to incentive program 1012.

Bid controller 1006 can be configured to generate a bid for participation in the ELDR program based on the participation hours received from selector 1008 and send the bid to incentive program 1012. In some embodiments, bid controller 1006 is configured to refine the participation hours by determining, based on a CBL, whether a participation hour received from selector 1008 should be included in a bid. In some embodiments, the CBL is determined by bid controller 1006 based on the participation hours and an electric load received from cost function modifier 1010, Since bid controller 1006 can be configured to generate a CBL for the participation hours it receives, bid controller 1006 may include an instantiation of baseline generator 1002 and/or may otherwise include all of the functionality of baseline generator 1002.

Referring again to FIG. 11A, bid controller 1006 can be configured to perform steps 1114-1120. Bid controller 1006 can send bids to incentive program 1012 based on the rules of the ELDR program as described above. Bid controller 1006 can perform steps 1114-1120 of process 1101 to generate a bid and send the bid to incentive program 1012.

Step 1114: Determine a CBL based on the participation hours

Step 1116: Subtract the load from the CBL values for the participation hours

Step 1118: Remove participation hours where the difference is less than or equal to zero Step 1120: Transmit a bid to an incentive program In step 1114, bid controller 1006 can calculate CBL values for each hour of the participation hours received from selector 1008. Bid controller 1006 is shown in FIG. 10 to include an instantiation of baseline generator 1002. In this regard, bid controller 1006 can use the participation hours received from selector 1008 and baseline generator 1002 to generate the CBL. In some embodiments, bid controller 1006 uses the participation hours to determine a CBL for each hour of the participation hours. Bid controller 1006 can use the CBL it generates and the participation hours to determine CBL values for the participation hours.

In step 1116, bid controller 1006 can subtract the load received from cost function modifier 1010 for each hour of the participation hours from the CBL load values. This may be the curtailment amount. In 1118, in response to determining that the difference is less than or equal to zero for a particular hour, bid controller 1006 can remove that hour from the participation hours. In step 1120, based on the modified participation hours (or unmodified participation hours), bid controller 1006 can transmit a bid to incentive program 1012 indicative of the participation hours and/or the curtailment amount at each participation hour (e.g., a baseline amount minus the load received from cost function modifier 1010).

Referring again to FIG. 10, based on the bid transmitted by bid controller 1006 to incentive program 1012, incentive program 1012 can be configured to approve or reject the bid. Any hours that incentive program 1012 determines are appropriate may be transmitted to participator 1018 as awarded hours. These may be hours that controller 1000 may be required to reduce the electric load of building (e.g., buildings 116) based on the electric load and/or the electric load reduction for each hour of the awarded hours that was originally transmitted to incentive program 1012 via bid controller 1006.

Participator 1018 can be configured to receive the awarded hours from incentive program 1012 and further receive an electric load for each awarded hour from cost function modifier 1010 (or from high level optimizer 632). The awarded hours may indicate hours that controller 1000 must participate in the ELDR program at a particular electric load amount. These may be hours that controller 1000 cannot change a decision to participate or not participate in the ELDR program. In some embodiments, the awarded hours can be changed if the controller 1000 adjusts or otherwise changes a bid. Participator 1018 can be configured to cause HVAC equipment to operate to meet the electric loads during the awarded hours. In some embodiments, the HVAC equipment includes batteries, co-gens, lighting systems, gas turbines, chillers, air handlers, and/or any other piece of HVAC or building equipment that consumes electricity as described herein or known in the art.

High level optimizer 632 is shown to include cost function modifier 1010. Cost function modifier 1010 can be configured to modify a cost function that high level optimizer 632 can be configured to generate. The cost function (e.g., cost function module 902), further described in FIG. 9 may be a cost function that includes costs and benefits from operating various subplants and participating in various programs, e.g., a frequency regulation program and/or an ELDR program. As described elsewhere herein, the cost function may be in the form of the following equation.

$$J(x) = \sum_{sources} \sum_{horizon} \text{cost}(\text{purchase}_{resource,time}, time) - \sum_{incentives} \sum_{horizon} \text{revenue}(ReservationAmount)$$

As described elsewhere herein, the cost function can be optimized based on various constraints. These constraints may be the constraints illustrated below and/or elsewhere herein. These constraints may balance between resources purchased, produced, discharged, consumed, and requested over an optimization period.

$$\sum_{sources} \text{purchase}_{resource,time} + \sum_{subplants} \text{produces}_{resource}(x_{subplants,internal\ decision,time}, x_{externaldecision,time}, \text{uncontrolled } variable_{time}) \dots -$$
$$\sum_{subplants} \text{consumes}_{resource}(x_{subplant,internaldecision,time}, x_{externaldecision,time}, \text{uncontrolled } variable_{time}) \dots +$$
$$\sum_{storages} \text{discharges}_{resource}(x_{storage,internaldecision,time}, x_{externaldecision,time}) - \sum_{sinks} \text{requests}_{resource} =$$
$$0 \forall \text{ resources}, \forall \text{ time} \in \text{horizon}$$

Cost function modifier 1010 can be configured to generate a term for the cost function, the ELDR term. The ELDR term may have the following format, where k is the length of an optimization period hours (e.g., 24 for a full day), k is an instant in time of the optimization period (e.g., 1, 2, 3 … 24 for each hour of a day), his the length of the optimization period, $p_i$ includes the participation hours (e.g., either 1 or 0) for each hour, $e_{CBL,i}$ is the value of CBL at each time interval, and $e_i$ is the electric load at each time interval (e.g., at each hour) of the optimization period. In some embodiments, the CBL is a CBL received from bid controller 1006 that is a CBL based on the participation hours. In some embodiments, cost function modifier 1010 includes some and/or all of the functionality of baseline generator 1002 and can be configured to generate a CBL based on the participation hours received from selector 1008. The term $\hat{r}_{RT_i}$ may be the predicted real-time LMP generated by LMP predictor 1014.

$$-\sum_{i=k}^{k+h-1} p_i \hat{r}_{RT_i}(e_{CBL,i} - e_i)$$

The cost function may have any number of terms, terms relating to various programs (e.g. other MDR programs), resource consumption, etc. The cost function below highlights a cost function that includes an ELDR term. The ELDR term can be added to the cost function by cost function modifier 1010, according to some embodiments. The term $\hat{r}_{e_i}$ may be an actual electric rate at each instant in time or a predicted electric rate at each instant in time. The term $e_i$ may be electric load and may be a decision variable of the cost function that can be optimized for a plurality of hours by optimizing the cost function. The cost function may include other decision variables, for example, decision variables for battery allocation, chilled water production, and/or any other decision variable. In this regard, the electric load of the cost function may depend on other decision variables of the cost function.

$$J = \sum_{i=k}^{k+h-1} \hat{r}_{e_i} e_i \dots - \sum_{i=k}^{k+h-1} p_i \hat{r}_{RT_i}(e_{CBL,i} - e_i)$$

The ELDR term may be a bilinear term since the term is a function of both the participation hours and the electric load. The bilinear cost function can be solved using mixed integer linear programming (MILP). The cost function can be solved via a cascaded approach in some embodiments. In some embodiments, in order to solve the optimization problem using linear programming, it may be necessary to linearize the ELDR term. Linearization can be achieved by making the assumption that the participation hours are known and are not part of the decision variables of the optimization problem. For this reason, participation predictor 1004 can make a preliminary decision as to the participation hours and these hours are used by cost function modifier 1010. This may be a cascaded approach to solving the optimization problem.

Cost function modifier 1010 (or high level optimizer 632) can be configured to linearize the cost function so that the cost function can be optimized via linear programming or any other optimization. The cost function above can be linearized into the following equation.

$$J = \sum_{i=k}^{k+h-1} (\hat{r}_{e_i} + a_i) e_i$$

where $a_i = f(\hat{r}_{RT_j}) < 0 \; \forall \; i \in CBL \text{ hours}/j \in \text{Participation Hours}$ $a_i = \hat{r}_{RT_j} \; \forall \; i \in \text{Participation Hours}$ $a_i = 0$ otherwise It can be seen in the above equation that the term, $a_i$, is an adjustment to the electric rate, $\hat{r}_{e_i}$. For this reason, it can be understood that participation in the ELDR program is the equivalent of a rate adjustment, an adjustment $a_i$. Participation in the ELDR program may be represented in the cost function as an electric rate adjustment. The electric rate adjustment may be an electric rate adjustment during participation hours and hours used to determine a baseline. High level optimizer 632 can be configured to determine an electric load for various hours based on the rate adjustment. In some embodiments, the participation hours are used by cost function modifier 1010 to determine the necessary electric rate adjustment during the participation hours and/or during the baseline hours. In some embodiments, the electric rate adjustment is a function of the baseline, the participation hours, the predicted real-time LMP and/or the day-ahead LMP.

High level optimizer 632 can be configured to optimize the cost function modified by cost function modifier 1010. In some embodiments, the optimization is based, at least in part, on the electric rate adjustment. In some embodiments, high level optimizer 632 can be configured to use linear programming to optimize the modified cost function. In various embodiments, high level optimizer 632 uses various constraints when optimizing the modified cost function. High level optimizer 632 can be configured to use optimization algorithms (e.g., linear programming, quadratic programming, etc.), iterative methods, global convergence, and/or heuristics and/or any other optimization algorithm or method to optimize the cost function. Optimization and the cost function are further described with reference to FIG. 9 and elsewhere herein. High level optimizer 632 can be configured to determine a plurality of decision variables (e.g., $e_i$, an electric load) and provide the electric load to bid controller 1006. Further, controller 1000 (e.g. participator 1018) can be configured to cause building equipment to be operated to meet the electric loads.

To illustrate the optimization, consider the following example. Cost function modifier 1010 may receive participation hours for a 24 hour optimization period from selector 1008. The participation hours may indicate participation in the ELDR program at the tenth hour of the day through the eighteenth hour of the day. The participation hours can be represented by the vector $p_j$, and is illustrated below.

$$p_i = \begin{cases} 1 & \forall \; i = 10 - 18 \\ 0 & \text{otherwise} \end{cases}$$

In this example, the CBL is a constant CBL, a same day CBL. The CBL is illustrated by the equation below.

$$e_{CBL,i} = \frac{e_6 + e_7 + e_8 + e_{20} + e_{21}}{5}$$

Cost function modifier 1010 can be configured to modify a cost function generated by high level optimizer 632. The modified cost function is shown in the equation below. The CBL received from baseline generator 1002, $e_{CBL,i}$, is an input to the EDLR term of the cost function below. Further, the participation hours, $p_i$, is another binary input to the ELDR term. As can be seen in the cost function below, the optimization period is a day, i.e., 24 hours. For this reason, the summation functions below include indices 1-24. In various embodiments, the optimization period is a day, a month, a year, and/or any other length of time.

$$J = \sum_{i=1}^{24} \hat{r}_{e_i} e_i - \sum_{i=1}^{24} p_i \hat{r}_{RT_i} (e_{CBL,i} - e_i) + \ldots$$

As an example, the CBL illustrated in the above equation can be substituted directly into the cost function illustrated above. The result is the following equation.

$$J = \sum_{i=1}^{5} \hat{r}_{e_i} e_i + \left(\hat{r}_{e_6} - \frac{\sum_{i=10}^{18} \hat{r}_{RT_i}}{5}\right) e_6 + \left(\hat{r}_{e_7} - \frac{\sum_{i=10}^{18} \hat{r}_{RT_i}}{5}\right) e_7 +$$

$$\left(\hat{r}_{e_8} - \frac{\sum_{i=10}^{18} \hat{r}_{RT_i}}{5}\right) e_8 + \hat{r}_{e_9} e_9 + \sum_{i=10}^{18} (\hat{r}_{e_i} + \hat{r}_{RT_i}) e_i + \hat{r}_{e_{19}} e_{19} +$$

$$\left(\hat{r}_{e_{20}} - \frac{\sum_{i=10}^{18} \hat{r}_{RT_i}}{5}\right) e_{20} + \left(\hat{r}_{e_{21}} - \frac{\sum_{i=10}^{18} \hat{r}_{RT_i}}{5}\right) e_{21} + \sum_{i=22}^{24} \hat{r}_{e_i} e_i$$

As can be seen in the equation above, the electric rates, $\hat{r}_{e_i}$, are adjusted by either a negative rate adjustment, a positive rate adjustment, or are not adjusted. For CBL hours, the rate adjustment may be negative. For participation hours, the rate adjustment may be positive. For hours that are neither CBL hours nor participation hours, there may be no rate adjustment. For example, based on the equation above, the rate adjustment may be $$-\frac{\sum_{i=10}^{18} \hat{r}_{RT_i}}{5}$$

for hours 6-8 and 20 and 21 since these hours are CBL hours. The rate adjustment may be $\hat{r}_{RT_i}$ for hours 10-18 since these hours are participation hours. Further, for the hours that are neither CBL hours nor participation hours, there may be no rate adjustment.

In this example, since the electric rates are lower during the CBL hours and higher during the participation hours, it should be expected that the optimization will make the decision to lower the electric use during the participation hours. As a physical example, if a battery exists in building (e.g., buildings 116), based on the optimization (e.g., the electric loads) controller 1000 will tend to charge the battery during the CBL hours and discharge it during the participation hours. Further, if a co-gen exists in the building, based on the optimization (e.g., the electric loads) controller 1000 will tend to turn the co-gen on during the participation hours and turn the co-gen off during the CBL hours.

Figure 11B:
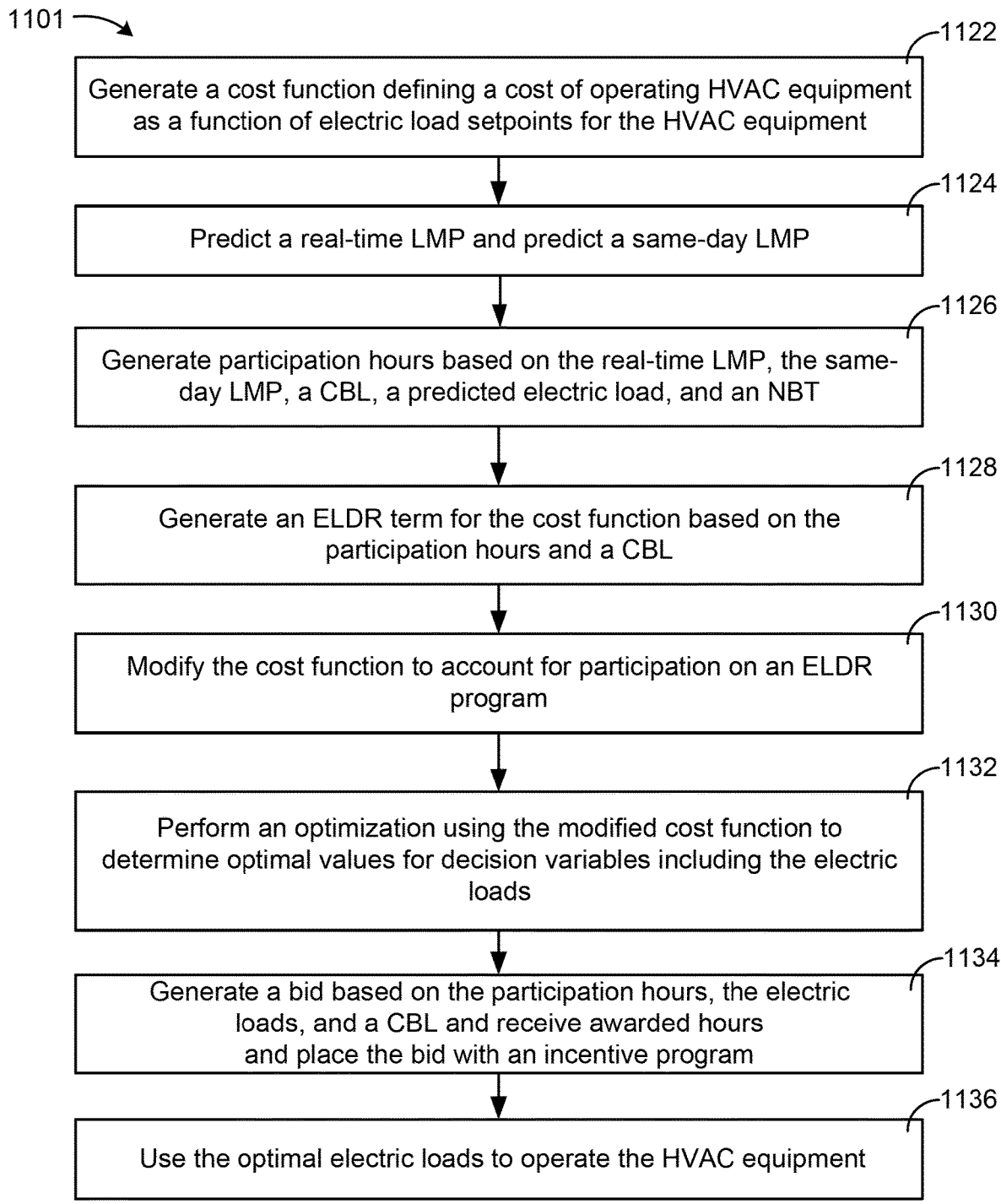
FIG. 11B is a flow diagram of a process for generating and modifying a cost function to determine optimal electric loads for participation in an ELDR program that can be performed by the controller of FIG. 10, according to an exemplary embodiment.

Referring now to FIG. 11B, a flow diagram of a process 1101 for using a cost function to determine optimal electric loads for participation in an ELDR program is shown, according to an exemplary embodiment. Controller 1000, and the various components of controller 1000, can be configured to perform process 1101. In some embodiments, process 1101 is performed by various components of high level optimizer 632 (e.g., asset sizing module 916, cost function module 902, etc.) as described with reference to FIGS. 9-10. Process 1101 can be performed by frequency response optimization system 100, photovoltaic energy system 300, energy storage system 500, planning system 700, or any other type of energy storage system.

In step 1122, process 1101 is shown to include generating a cost function defining a cost of operating HVAC equipment as a function of electric loads (e.g., decision variables) for the HVAC equipment. In some embodiments, the cost function is the original cost function J(x). The cost function J(x) may include terms that accounts for energy purchase costs, demand charges, and peak load contribution (PLC) charges. In some embodiments, the cost function J(x) accounts for revenue from participating in IBDR programs such as frequency regulation (FR).

The HVAC equipment may include individual HVAC devices (e.g., chillers, boilers, fans, pumps, valves, batteries, co-gens, etc.) or collections of HVAC devices (e.g., a chiller subplant, a heater subplant, a cooling tower subplant, etc.). In some embodiments, the HVAC equipment include energy storage such as thermal energy storage and/or electrical energy storage (e.g., batteries). Although HVAC equipment is used as an example in process 1101, it should be understood that any type of equipment can be used. For example, the cost function generated in step 1122 may account for the cost associated with operating any type of equipment.

In step 1124, LMP predictor 1014 can generate a predicted real-time LMP and a predicted day-ahead LMP. In some embodiments, LMP predictor 1014 generates the predicted real-time LMP and the day-ahead LMP based on an actual real-time LMP and/or an actual day-ahead LMP received from incentive program 1012. LMP predictor 1014 can be configured to retrieve and/or receive a real-time LMP from incentive program every fifteen minutes and/or a day ahead LMP once every day. In some embodiments, the prediction is made based on weather data (e.g., daily temperatures, humidities, rain forecasts, etc.) In some embodiments, LMP predictor 1014 stores historical LMP data based on LMP data received from incentive program 1012 and uses the historical LMP data to train a predictive model that LMP predictor 1012 can use to generate a predicted LMP.

In step 1126, participation predictor 1004 can generate participation hours.

Participation predictor 1004 can use a CBL, the predicted real-time LMP, the predicted day-ahead LMP, the predicted electric load, and/or an NBT threshold value. In some embodiments, participation predictor 1004 determines the participation hours by determining that the participation hours are hours where the predicted real-time LMP is greater than or equal to the NBT threshold value or the predicted day-ahead LMP is greater than or equal to the NBT threshold value.

In some embodiments, participation predictor 1004 further refines the participation hours by using a CBL, the predicted electric load, a maximum power limit, and a grid power limit. Using the participation hours as a searching space (e.g., search hours) participation predictor 1004 can minimize the equation below to determine a starting time (e.g., event start ES) and an ending time (e.g., event end EE) that defines the participation hours.

$$\min_{ES,EE}\left(-\sum_{i=ES}^{EE} \hat{r}_{RT_i}(\hat{e}_{CBL,i} - \max((\hat{e}_i - P_{max}), P_{gridLimit}))\right)$$

In step 1128, based on the participation hours, cost function modifier 1010 can generate an ELDR term for the cost function based on the participation hours and a CBL. Cost function modifier can replace the various terms of the ELDR term with the participation hours, a CBL based on the participation hours, and the predicted real-time LMP. The term $e_{CBL,i}$ may be replaced with the CBL, the term $\hat{r}_{RT_i}$ may be replaced with the predicted real-time LMP, while the term $p_i$ may be replaced with the participation hours (e.g., a vector indicating participation at the $i^{th}$ hour).

$$-\sum_{i=k}^{k+h-1} p_i \hat{r}_{RT_i}(e_{CBL,i} - e_i)$$

In step 1130, cost function modifier 1010 can modify the cost function with the ELDR term generated in step 1110. In some embodiments, modifying the cost function involves adding the ELDR term to the cost function. An example of a modified cost function including the ELDR term is the equation below.

$$J = \sum_{i=k}^{k+h-1} \hat{r}_{e_i} e_i - \sum_{i=k}^{k+h-1} p_i \hat{r}_{RT_i}(e_{CBL,i} - e_i)$$

In step 1132, high level optimizer 632 optimizes the modified cost function of step 1130. High level optimizer 632 can use one or more of a plurality of different types of optimizations known in the art. In some embodiments, the optimization is performed by linear programming and/or mixed integer linear programming. In some embodiments, high level optimizer 632 uses one or more constraints when performing the optimization. The result of the optimization may be one or more electric loads, $e_i$, wherein $e_i$ is the electric load at a plurality of hours, i.

In step 1134, bid controller 1006 can generate a bid to send to incentive program 1012. The bid may be generated based on the participation hours and/or the electric loads. In some embodiments, the bid is further based on the predicted real-time LMP and the predicted day-ahead LMP. In some embodiments, the bid includes a curtailment amount which bid controller 1006 can determine. The curtailment amount may be the difference between a CBL and the electric load at each of a plurality of hours. The bid may further include the participation hours. Finally, the bid may include a compensation amount and/or rate for each hour. The compensation rate may be the predicted real-time LMP and/or the predicted same day LMP and/or a compensation amount determined based on the predicted real-time LMP and/or the predicted same day LMP. In some embodiments, bid controller 1006 can remove participation hours from the bid where the participation hours have a corresponding curtailment less than or equal to zero.

In step 1136, participator 1018 can receive awarded hours. The awarded hours may be hours bid controller 1006 sends to incentive program 1012. Participator 1018, high level optimizer and/or otherwise controller 1000 can control the HVAC equipment based on the awarded hours and the electric loads that correspond to the awarded hours. In some embodiments, participator 1018 uses an operating constraint to operate the HVAC equipment based on the electric loads for the awarded hours.

Referring now to FIG. 12 a graph 1200 illustrating participation in the ELDR program is shown, according to an exemplary embodiment. Graph 1200 is shown to include electric load in kilowatts on the vertical y-axis and time in hours on the horizontal x-axis. The solid line, electric load 1202, represents a typical electric load of a campus (e.g., campus 102), building, or facility. The dotted line indicates the electric load, ELDR load 1204, of the campus when participating in the ELDR program. Electric load 1202 may represent a typical electric load of campus 102. As can be seen, ELDR load 1204 is a reduction in electric load as compared to the typical electric load, electric load 1202. The ELDR load 1204, indicates a reduction in electric load for the campus during the participation time 1206

Referring now to FIG. 13, a graph 1300 illustrating a same day CBL is shown, according to an exemplary embodiment. Graph 1300 is shown to include CBL 1302 and electric load 1304. CBL 1302 is shown to be a constant value. Electric load 1304 may represent the electric load of a campus (e.g., campus 102) over time. Start time 1306 and end time 1308 are shown as vertical lines marking the beginning and the end of a plurality of participation in the ELDR program. In graph 1300, start time 1306 is hour 11 while end time 1308 is hour 20. CBL Hours 1310 represent the hours that baseline generator 1002 can be configured to use when calculating a same day CBL. CBL hours 1310 are the three hours one hour before the participation time begins. Similarly, CBL hours 1312 can be used by baseline generator 1002 to generate a same day CBL. These hours represent the two hours that occur one hour after the end of the participation period. The curtailment amount in indicted in FIG. 13. The difference between electric load 1304 and same day CBL 1302 is the curtailment amount.

Figure 14:
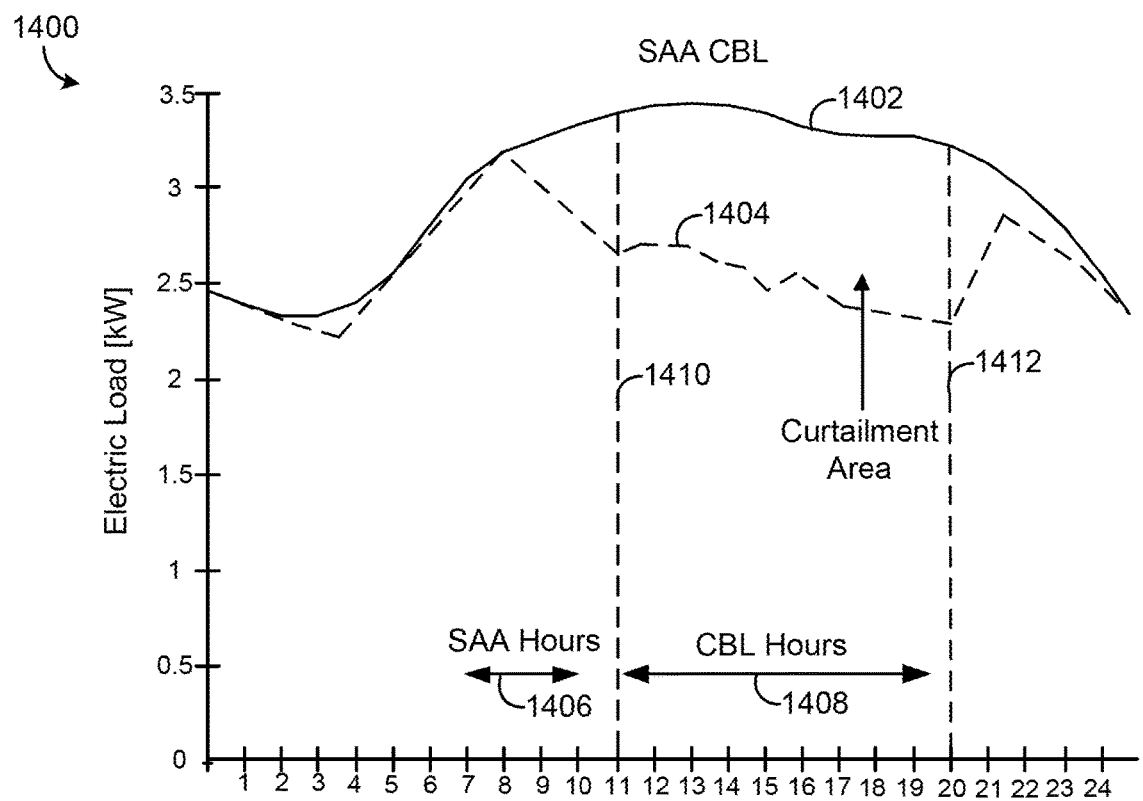
FIG. 14 is a graph illustrating a symmetric additive adjustment (SAA) CBL that can be determined by the controller of FIG. 10, according to an exemplary embodiment.

Referring now to FIG. 14, a graph 1400 illustrating an SAA CBL 1402 is shown, according to an exemplary embodiment. SAA CBL 1402 may be an example of the CBL that baseline generator 1002 provides participation predictor 1004 with. In graph 1400, SAA CBL 1402 is shown in addition to electric load 1404. As can be seen, electric load 1404 is reduced between start time 1410 and end time 1412. The length of time between start time 1410 and end time 1412 may represent the time that controller 1000 participates in the ELDR program, CBL hours 1408. SAA CBL 1402 may be determined by baseline generator 1002. The equation below may represent SAA CBL 1402.

$$e_{CBL} = [e_{CBL,1} \cdots e_{CBL,24}]$$

Start time 1410 and end time 1412 may represent the time that a controller (e.g., controller 1000) participates in an ELDR program. Graph 1400 is shown to include SAA hours 1406. SAA hours 1406 may be the duration of three hours that occur one hour before start time 1410. The electric load 1404 during SAA hours 1406 may be used to calculate $e_{SAA}$ as described with reference to FIG. 10, specifically baseline generator 1002. Baseline generator 1002 may use the equation below to generate $e_{SAA}$. Start time 1410 may correspond to the term ES while end time 1412 may correspond to the term EE. The terms $e_{0k}$ and $\bar{e}_k$ may be derived from electric load 1404.

$$e_{SAA} = \sum_{k=ES-4}^{EE-2} \frac{e_{0k} - \bar{e}_k}{3}$$

CBL Hours 1408 may be the hours that are used by baseline generator 1002 to generate the average electric load for each day. CBL Hours 1408 may be represented by the term k∈participation in the equation below. However, it should be understood that the electric load at an hour of CBL Hours 1408, $e_{ik}$, is not electric load 1404. Rather, it is the electric load for the $i^{th}$ day, which is a day prior to the day with participation in the ELDR program illustrated in graph 1400.

$$\bar{d}_i = \sum_{k \in participation} \frac{e_{ik}}{n} \ \forall \ i = 1, \ldots, 5$$

Figure 15:
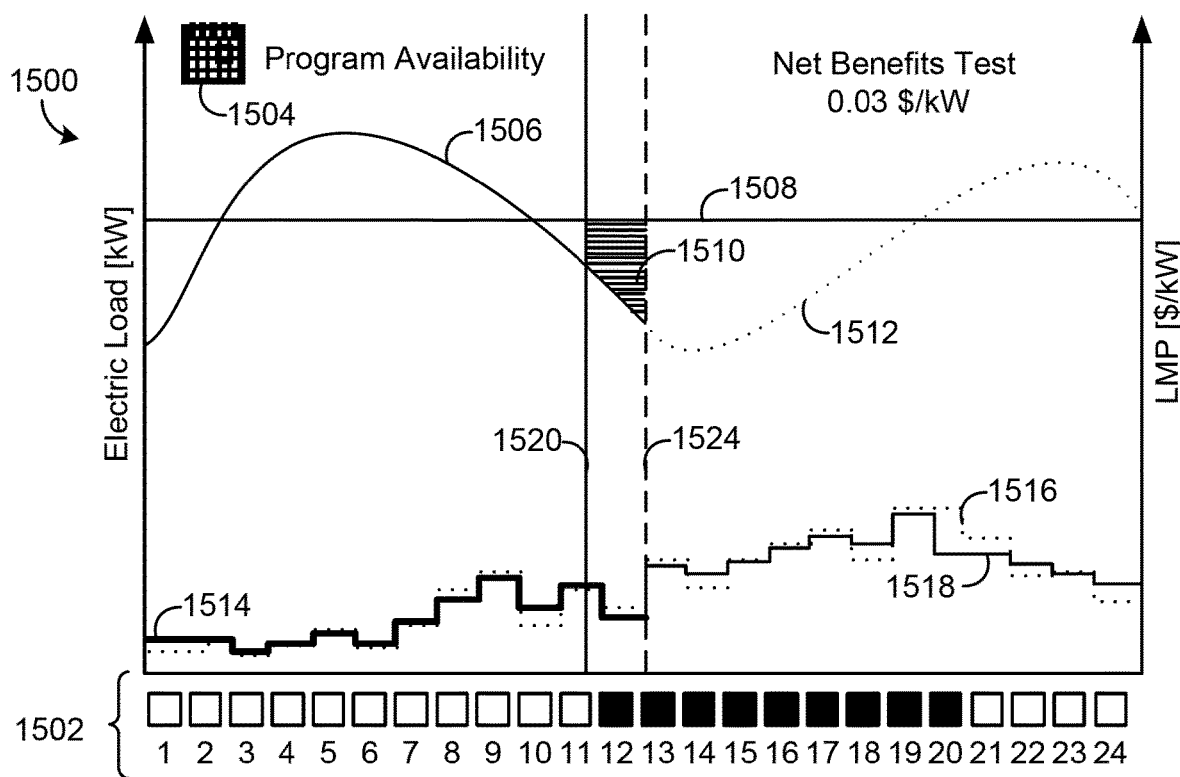
FIG. 15 is an interface for a user to adjust participation in an ELDR program, according to an exemplary embodiment.
Figure 16:
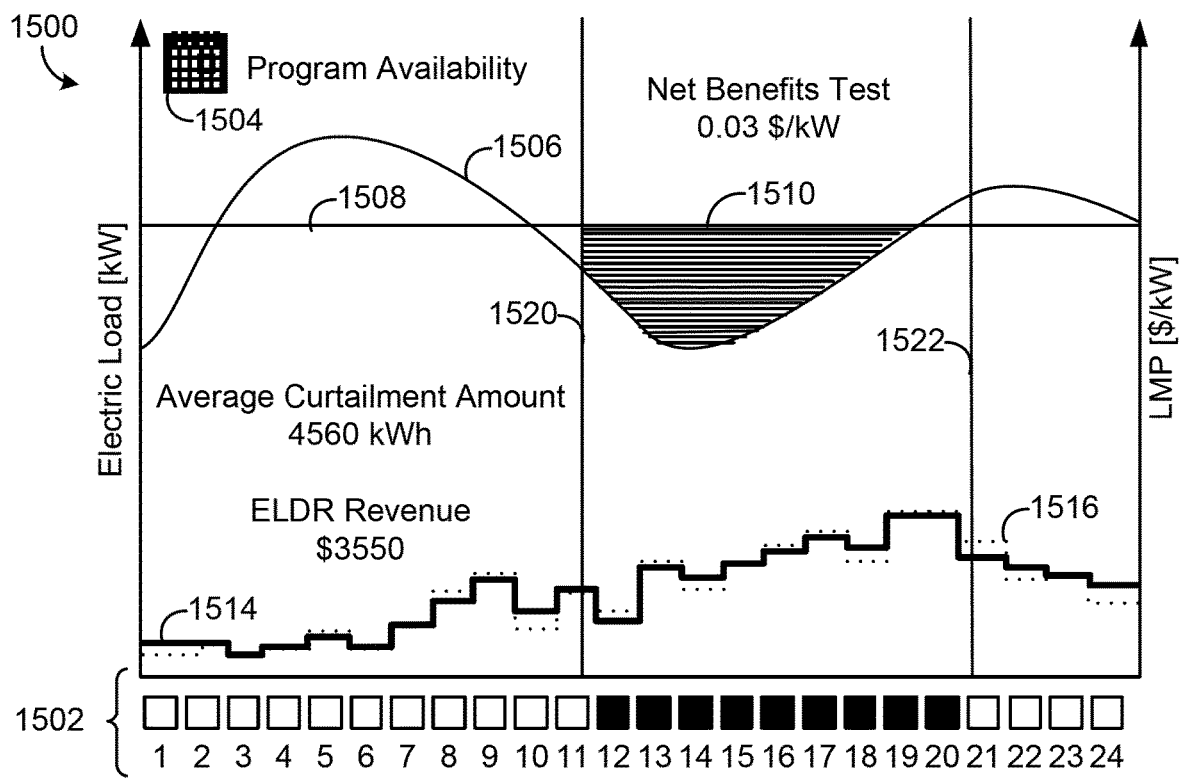
FIG. 16 is an interface for a user to adjust participation in an ELDR program, the interface illustrating revenue generated by the ELDR program, according to an exemplary embodiment.

Referring now to FIGS. 15-16, an interface 1500 for controller 1000 is shown for outputting information for participation in an ELDR program to a user and receiving user input is shown, according to an exemplary embodiment. Interface 1500 may be an interface generated by GUI engine 614. In various embodiments, interface 1500 is an interface displayed on a terminal connected to controller 1000 that GUI engine 614 is configured to operate. In various embodiments, interface 1500 is an interface of an application on a mobile device or computer (e.g., user device 1013). FIG. 15 is an illustration of interface 1500 during participation in an ELDR program on a particular day. FIG. 16 is an illustration of interface 1500 of a previous day on which controller 1000 participated in the ELDR program.

In FIGS. 15-16, interface 1500 illustrates electric loads at various hours of a particular day. The hours 1502, located along the horizontal axis of the graph shown in interface 1500 includes a plurality of boxes for each hour of a day. The boxes allow a user to select one or more times that the user would like to controller 1000 to participate in the ELDR program. The user may only be able to select a time while controller 1000 can be configured to determine the curtailment for the selected time. In various embodiments, the user can also view the hours that controller 1000 has automatically determined it will participate in the ELDR program. In this regard, a user can "deselect" a box that indicates participation to override the participation on the ELDR program at a particular hour or hours. A user can view a plurality of different days in the future and/or in the past. A user may interact with program availability icon 1504 to navigate to a plurality of different days, weeks, months, or years to view the ELDR program participation information for a particular day, week, month, and/or year.

In interface 1500, the vertical line, start time 1520, indicates the start time of participation in the ELDR program while the vertical line, end time 1522 indicates the ending time of participation in the ELDR program. Current time line 1524 indicates the current time of day. The curtailment area 1510 indicates the difference between an actual electric load 1506 and baseline 1508. In some embodiments, the participation hours are not contiguous, in this embodiment, there may be multiple curtailment areas. Predicted electric load 1512 graphically illustrates a predicted electric load.

This may be a plurality of power setpoints that high level optimizer 632 determines by optimizing a cost function. Interface 1500 is further shown to include day-ahead LMP 1516. Day-ahead LMP 1516 may be the actual day-ahead LMP that controller 1000 receives from incentive program 1012. Real-time LMP 1514 shown in interface 1500 is a real-time LMP received from incentive program 1012. Predicted real-time LMP 1518 may be a real-time LMP predicted by LMP predictor 1014.

In some embodiments, interface 1500 indicates various information pertaining to the participation in the ELDR program. In some embodiments, a current operating day date is displayed on interface 1500, a NBT threshold value for the operating day is displayed, and a predicted curtailment amount is displayed. In some embodiments, interface 1500 includes an indicator which indicates which hours are locked and cannot be modified by a user and which hours a user can modify (e.g., hours where the current time is at least three hours before the top of the hour). If a user override is available via interface 1500, the hours that the user can override may be a particular color and/or have a particular shading. In some embodiments, when a user hovers over curtailment area 1510, a popup may appear indicating the curtailment amount and a current revenue made (e.g., for the participation period and/or for a particular hour).

When a particular day is over and/or the ELDR participation is over, interface 1500 may display metrics regarding the performance in the ELDR participation. In some embodiments, the metrics include average curtailment amount and/or ELDR revenue (see FIG. 16). In various embodiments, interface 1500, specifically the current operating day, is a default home screen. In various embodiments, a user can select data to display on interface 1500 and can zoom in on various locations of interface 1500.

In some embodiments, interface 1500 includes multiple settings that are set in the code of interface 1500 by a programmer or are set by interface 1500 based on the type of baseline that controller 1000 generates. The settings may include a "Calculation" setting. The calculation setting may be a setting to use a median or an average to calculate the CBL. The average or median may be used to calculate the CBL after the usage days have been identified and any low usage days excluded. The setting "CBL Basis Window" may be a display that indicates the typical electric load. The CBL basis window may be the electric load of five days, the five days is used to calculate the CBL. The five days may be all five days used to calculate the CBL or may include any day (e.g., low usage day, participation day, etc.) that would normally be excluded from the CBL calculation. The "CBL Basis Window Limit" may indicate the number of days that will be the pool of days that baseline generator 1002 selects from when determining the CBL. In some embodiments, the number of days prior to the participation day is 45 calendar days. This may be displayed to the user with the explanation that the 45 days ensure recent information is used when predicting future energy consumption e.g., generating a CBL.

A "Start Selection From Days Prior To Event" display may indicate to the user that baseline generator 1002 selects the most recent days with a similar day type (e.g., weekend, holiday, weekday) to the participation day. A display may indicate "1" or "2." A "1" may indicate that baseline generator 1002 would select the most recent day for calculating the CBL while "2" may indicate that baseline generator 1002 will skip the most recent day when selecting days to use in calculation the CBL.

An "Exclude Previous Curtailment Days" setting can be "Yes" or "No." When "Exclude Previous Curtailment Days" is "Yes," baseline generator 1002 may exclude any previous day which included at least one hour of participation in the ELDR program (e.g., pending or confirmed economic settlements for the days) from use in calculating the CBL. When it is "No," baseline generator 1002 may use previous days which include at least one hour of participation in the ELDR program when determining the CBL.

A setting "Exclude Long/Short DST Days" may be "Yes" or "No." If the setting is set to "Yes," baseline generator 1002 may exclude any DST days from being used to determine the CBL. If the setting is set to "No," baseline generator 1002 may be configured to use DST days when determining the CBL. A display "Exclude Average Event Period Usage Less Than Threshold" may indicate that if the Average Daily Event Period Usage for a CBL day selected is less than the threshold indicated, then that day will be excluded from a CBL basis window.

A setting "Exclude Number of Low Usage Days" may be a number of the days used to determine the CBL by baseline generator 1002 will be excluded i.e., the number (e.g., 1, 2, 3, or 4) of the lowest days that are to be excluded. A setting "Use Previous Curtailment If CBL Basis Window Incomplete" may be set to "Yes" to use previous days that include participation in the ELDR program to determine the CBL if baseline generator 1002 cannot find enough non-participation days within the 45 day period to generate the CBL. If "Use Previous Curtailment If CBL Basis Window Incomplete" is "Yes" the setting "Exclude Previous Curtailment Days" may also need to be set to "Yes."

A setting "Use Highest or Recent Previous Curtailment Day" may be a setting that can be set if the setting "Use Previous Curtailment Day if CBL Incomplete" is "Yes." A setting of "Highest" for the "Use Highest Or Recent Previous Curtailment Day" may cause baseline generator 1002 to rank previous curtailment days based on event period usage within the CBL Basis Day Limit and add them to the CBL Basis Days in descending order until the CBL Basis Days contains the minimum number of days required to calculate CBL. The setting "Recent" may cause baseline generator 1002 to start adding days to the CBL Basis Days starting with the Most Recent Curtailment Day that was excluded until the CBL Basis Days contains the minimum number of days required to calculate CBL.

A display "Adjustments" may indicate that Symmetric Additive Adjustment is a CBL average usage for an event day divided by Adjustment Basis Hours for the same hours. The display may further indicate that a weather sensitivity adjustment compares weather over CBL days to weather on event days and then calculates the adjustment based on weather sensitivity.

A setting "Allow Negative Adjustments" may be set to "Yes" in which case adjustments may be either positive or negative. If this setting is not "Yes," adjustments may always be greater than zero. A display "Adjustments Start (HE0-x)" may indicate a starting point for hours to be used in calculating the Adjustments. If the event starts with HE13 and Adjustment Start is 4, then HE9 may be the first hour used to calculate Adjustments. A display "Adjustment Basis Hours" may indicate that the total number of hours used to determine the adjustment from "Adjustment Start." If the event is on HE13, "Adjustment Start" is 4, and "Adjustment Basis Hours" is 3, then the adjustment may be based on the load from HE9-HE11.

Figure 17:
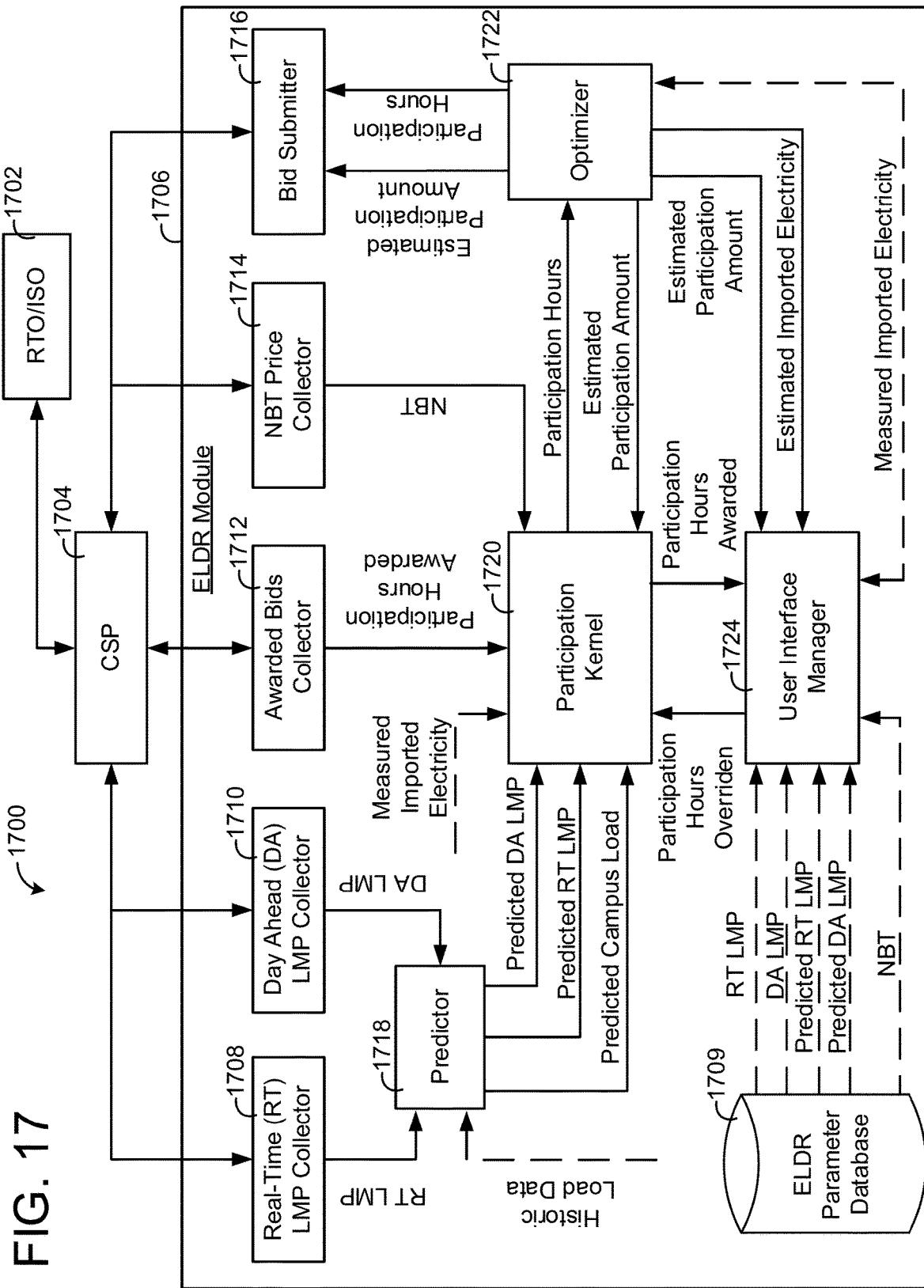
FIG. 17 is a block diagram of an ELDR module for participating in the ELDR program, according to an exemplary embodiment.

Automated and Dynamic Economic Load Demand Response (ELDR) Program Participation with ELDR User Interfaces Referring now to FIG. 17, a block diagram of system 1700 including an ELDR module 1706, a Curtailment Service Provider (CSP) 1704, and a regional transmission organization and/or independent system operator (RTO/ISO) 1702 are shown, according to an exemplary embodiment. ELDR module 1706 can be a module of incentive program module 912 and/or high level optimizer 632. ELDR module 1706 can perform some and/or all of the ELDR related functions as described with reference to FIGS. 10-16 to participate in an ELDR program.

CSP 1704 may be one or more computing systems, servers, and/or devices configured to facilitate the ELDR program. CSP 1704 can be a system configured to facilitate participation in the ELDR program. In some embodiments, CSP 1704 is "CPower." RTO/ISO 1702 can include one or more computing systems, servers, and/or devices. RTO/ISO 1702 can be configured to perform the ELDR program by generating various ELDR parameters and providing the ELDR parameters to ELDR module 1706 via CSP 1704. Furthermore, ELDR module 1706 can provide various load reduction bids to RTO/ISO 1702 via CSP 1704. RTO/ISO 1702 can be, as an example, the Pennsylvania, New Jersey, and Maryland (PJM) RTO.

System 1700 provides a high-level description of an automated and dynamic participation process that ELDR module 1706 can be configured to perform for ELDR program participation. In some cases, participation in the ELDR program may be manual and involve human interaction. For example, a user associated with a power plant of a building and/or campus could make the participation decisions (e.g., participation hours and a constant kW load reduction amount) for an ELDR program for a following day. The user could make a selection manually through a user interface of CSP 1704. Based on the participation decision, the user can determine the schedule of the plant equipment (e.g., Gas Turbines, chillers, boilers, etc.) in order to meet his ELDR commitment for the following day.

The schedule of the equipment and the kW participation amount do not change dynamically with the dynamic changes and/or updates of market prices, plant status the day of participation, awarded bids, etc. when manual selection of participation is used. In this regard, ELDR module 1706 can remove direct user interaction for participating in the ELDR program in order to automate the participation in the ELDR program, making the ELDR participation dynamic and adaptive to changes in prices, schedules, weather, etc. However, ELDR module 1706 can provide the user with a user interface and the ability to override various participation decisions of ELDR module 1706. This allows a user to have control over participation in the ELDR program but participate in the ELDR program in an automated and dynamic manner such that the benefit of participation in the ELDR program is maximized.

The automated ELDR program participation provided by ELDR module 1706 can perform various functions to dynamically participate in the ELDR program. ELDR module 1706 can be configured to perform prediction of ELDR parameters. For example, ELDR module 1706 can be configured to perform predictions of real-time LMP and day-ahead LMP prices based on current prices (e.g., current values for real-time LMP and/or day-ahead LMP), weather forecast data, time of day, and/or day of week. The ELDR can be configured to dynamically respond to changes in market prices. For example, the participation hours and/or participation amounts may by dynamically adjusted throughout a particular day and/or preceding the particular day to account for changes in market prices so that ELDR module 1706 maximizes the potential revenue from participating in the ELDR program.

Furthermore, ELDR module 1706 can be configured to perform optimal allocation of equipment in order to minimize cost while maximizing the benefit of the ELDR program. ELDR module 1706 can be configured to perform automatic determination of the kW participation amount, automatically submit bids to CSP 1704, automatically read the status (e.g., awarded or not awarded) of submitted participation hours, and/or dynamically update equipment allocation based on the awarded status of participation hours.

ELDR module 1706 is shown to include various "collectors" configured to collect ELDR parameters from CSP 1704 and/or receive awarded hours from CSP 1704. The collectors may be one single module and/or multiple modules. In FIG. 17, multiple collector modules are shown. ELDR module 1706 is shown to include a real-time LMP collector 1708, a day-ahead LMP collector 1710, an awarded bids collector 1712, and a NBT price collector 1714. Furthermore, ELDR module 1706 is shown to include a bid submitter 1716 for submitting bids to CSP 1704. CSP 1704 may include a specific application programing interface (API) for communicating ELDR data with ELDR module 1706. In this regard, the collectors of ELDR module 1706 can be configured to integrate with the API of CSP 1704 to send and/or receive data from the CSP 1704.

All settings of ELDR module 706 e.g., ELDR program settings, job scheduling (e.g., collection periods and/or frequencies of collectors 1708-1714), and retry settings can be configurable at deployment time of ELDR module 1706 and/or after the deployment time. Collection jobs can be individually disabled if necessary, for example, during commissioning when ELDR module 1706 is not set up to submit bids. A technician could disable the scheduled collection of day-ahead LMP by day-ahead LMP collector 1710 but allow real-time LMP collector 1708 to continue to perform collection of the real-time LMP in order to perform trouble shooting. Setting changes to ELDR module 1706 may require a service restart.

Collectors 1708-1714 and bid submitter 1716 can each be configured (or can collectively be configured) to generate a log that details interactions with CSP 1704. The log may indicate errors and/or error codes returned by CSP 1704 responsive to a message (e.g., a collection message). For example, if the awarded bids collector 1712 attempts to retrieve an indication of an awarded bid but instead receives an error, awarded bids collector 1712 can be configured to generate an error log and/or update an existing error log with an indication of the error and/or an error code. Collectors 1708-1714 and bid submitter 1716 may include various general settings used for collecting data from CSP 1704. The settings may include an endpoint, a username, and/or a password for connecting with CSP 1704. The settings can include an identification of RTO/ISO 1702, "IsoName." An example of an "IsoName" may be "PJM." The settings can further include a "ZoneName," a "BidGroupName," a "ProductTypeName," and an "IsoTimeZoneId."

Real-time LMP collector 1708 can be configured to collect a sub-hourly real-time LMP from CSP 1704. Real-time LMP collector 1708 can be configured to send a read command to CSP 1704 for a real-time LMP value and receive the value for the real-time LMP from CSP 1704 in response to sending the read command. In some embodiments, real-time LMP collector 1708 can be configured to periodically read the real-time LMP and store the real-time LMP in a database. In some embodiments, real-time LMP collector 1708 can collect the real-time LMP on an sub-hourly period (e.g., every minute, every ten minutes, every half hour, etc.) Real-time LMP collector 1708 can include a database configured to store collected real-time LMP values. In some embodiments, real-time LMP collector 1708 can share a database with the other collectors, e.g., an ELDR parameter database 1709. The ELDR parameter database 1709 can act as a data repository for the various collected ELDR parameters, generated ELDR parameters (e.g., predicted ELDR parameters), and/or any other ELDR information.

CSP 1704 can include an endpoint for real-time LMP, e.g., "lmp/zoneinterval endpoint." Real-time LMP collector 1708 can use this endpoint to periodically collect (e.g., five minute) real-time LMP values. Real-time LMP collector 1708 can be configured to determine a sliding window average (e.g., a moving average window, an exponentially weighted moving average filter, etc.) which we use to calculate an average. In some embodiments, there may be gaps in the real-time LMP prices since RTO/ISO 1702 may withhold the prices to prevent market manipulation. The sliding window average allows ELDR module 1706 to handle these gaps in real-time LMP prices as well as smooth out sudden spikes in real-time LMP prices.

Real-time LMP collector 1708 may include specific configurable settings for collecting real-time LMP prices from CSP 1704. The settings may include a "Job Scheduled Period" which defines the rate at which real-time LMP collector 1708 collects real-time LMP prices from the CSP 1704. The settings may further include an "Offset" parameter providing an offset to the collected real-time LMP prices, and/or an enabled flag which causes real-time LMP collector 1708 to collect real-time LMP prices from CSP 1704 when enabled. The settings may include a "RealTimeLmpWindowSize" which may define the size of the moving average window (e.g., the number of samples used to determine the averaged real-time LMP price). Real-time LMP collector 1708 can include a "RealTimeLmpOutgoingSampleInterval" which may be a setting defining the rate at which real-time LMP collector 1708 determines an outgoing real-time LMP price for providing to predictor 1718 and/or storing in ELDR parameter database 1709.

Day-ahead LMP collector 1710 can be configured to collect an hourly day-ahead LMP from CSP 1704. Day-ahead LMP collector 1710 can be configured to send a read command to CSP 1704 for a day-ahead LMP and receive a value for the day-ahead LMP from CSP 1704. In some embodiments, day-ahead LMP collector 1710 can be configured to periodically read the hourly day-ahead LMP and store the day-ahead LMP in a database. In some embodiments, day-ahead LMP collector 1710 can collect the day-ahead LMP on an hourly period. Day-ahead LMP collector 1710 can include a database configured to store the collected real-time LMP values. In some embodiments, day-ahead LMP collector 1710 can share a database with the other collectors, e.g., ELDR parameter database 1709.

The day-ahead LMP prices may be made available by CSP 1704 for a following day after a particular time on a current day (e.g., 12:30 P.M.) Sometimes, CSP 1704 may post the day-ahead LMP prices late or may later revise the posted day-ahead LMP prices. To compensate in this uncertainty in posting time and/or updating, day-ahead LMP collector 1710 can be configured to periodically read the day-ahead LMP prices throughout the day. In some embodiments, CSP 1704 make the day-ahead LMP prices available at a specific endpoint, e.g., a "lmp/zone endpoint" where day-ahead LMP collector 1710 can be configured to retrieve the day-ahead LMP values from.

Day-ahead LMP collector 1710 can include multiple configurable settings. The settings may include a "Job Scheduled Period" which defines how frequently day-ahead LMP collector 1710 collects the day-ahead LMP prices. Day-ahead LMP collector 1710 can further include an offset parameter which can provide an offset to the collected day-ahead LMP prices. Day-ahead LMP collector 1710 can include an enabled flag which causes day-ahead LMP collector 1710 to collect the day-ahead LMP values from CSP 1704 whenever enabled. Day-ahead LMP collector 1710 may periodically collect the day-ahead LMP price after a particular time on a given day. This time may be configurable and may be a setting "DayAheadPriceAvailabilityTimeOfDay." After the particular set time passes, day-ahead LMP collector 1710 can be configured to periodically collect day-ahead LMP values for CSP 1704.

Awarded bids collector 1712 can be configured to collect awarded bids from the CSP 1704. The awarded bids may be indications that particular participation hours submitted in a bid by bid submitter 1716 have been approved. Awarded bids collector 1712 can be configured to send a read command to CSP 1704 for awarded bids and receive an indication of the awarded bids from the CSP 1704 responsive to submitting the read command. In some embodiments, the awarded bids collector 1712 can be configured to periodically read the awarded bids and store the awarded bids in a database. In some embodiments, awarded bids collector 1712 can collect the awarded bids on an hourly and/or sub-hourly period (e.g., every minute, every ten minutes, every half hour, every hour, every two hours, etc.). Awarded bids collector 1712 can include a database configured to store the collected awarded bids. In some embodiments, awarded bids collector 1712 can share a database with the other collectors, e.g., ELDR parameter database 1709.

In response to RTO/ISO 1702 awarding the first bid of a particular day, CSP 1704 may indicate that all bids for all hours of the particular day are awarded even though RTO/ISO 1702 may later decline bids. Awarded bids collector 1712 can include multiple settings for collected awarded bids, e.g., the participation hours that have been awarded, from CSP 1704. The settings may include a job scheduled period which causes awarded bids collector 1712 to collect bids at a particular rate. Awarded bids collector 1712 can also include an offset setting. Furthermore, awarded bids collector 1712 can include an "Enabled Flag" which causes awarded bids collector 1712 to collect awarded bids from CSP 1704 at a particular defined rate.

Awarded bids collector 1712 may include a "AwardedBidsHorizon" setting which defines a time span preceding a particular participation hour. Once a current time is within the timespan, the particular participation hour will be assumed to be awarded if the current status of the particular participation hour is awarded. Similarly, awarded bids collector 1712 can include a "NotAwardedBidsHorizon" which may define another timespan preceding a participation hour. If the current time is within the timespan and the status of the particular participation hour is not awarded, awarded bids collector 1712 can assume that the current participation hour is not awarded.

NBT price collector 1714 can be configured to collect NBT threshold values from CSP 1704. Awarded bids collector 1712 can be configured to send a read command to CSP 1704 for an NBT threshold value and receive the NBT threshold value from CSP 1704 responsive to sending the read command to CSP 1704. NBT price collector 1714 can be configured to periodically, e.g., every day, collect the NBT threshold value and store the collected NBT threshold value. NBT price collector 1714 can store the collected NBT threshold value by itself or otherwise store the NBT threshold value in ELDR parameter database 1709.

RTO/ISO 1702 may provide CSP 1704 with an NBT threshold for a following month on a particular day of a current month (e.g., the 15$^{th}$ of the current month). CSP 1704 may make the NBT threshold available at least a predefined amount of time before the next month, e.g., at least 10 days before the end of the month. CSP 1704 may include a particular endpoint where CSP 1704 can make the NBT threshold available. For example, the endpoint may be an "nbt/price" endpoint. In some cases, CSP 1704 may not provide an indication as to whether the NBT threshold value is available or not. Furthermore, in some cases, the NBT threshold can even be updated during a particular month for which the NBT threshold value applies. For this reason, NBT price collector 1714 can be configured to collect the NBT threshold value on a periodic basis e.g., daily.

NBT price collector 1714 can include one or multiple settings for collecting the NBT price value from CSP 1704. The NBT setting can include a job scheduled period which defines the rate at which NBT price collector 1714 collects the NBT threshold from CSP 1704. Furthermore, NBT price collector 1714 may include an offset which may provide an offset to the value of the NBT threshold. Furthermore, NBT price collector 1714 can include an enabled flag which enables or disables the operation of NBT price collector 1714. In some embodiments, NBT price collector 1714 can include a retry sleep duration time and a retry count. The retry time may be a particular time which NBT price collector 1714 waits before retrying to collect the NBT threshold value from CSP 1704 in response to NBT price collector 1714 failing to collect the NBT threshold value. NBT price collector 1714 can be configured to count the number of retry attempts that NBT price collector 1714 attempts. If the number of attempted retries is greater than a predefined amount, NBT price collector 1714 may stop retrying to retrieve the NBT threshold value and may resume collecting the NBT price collector based on the job scheduled period.

Bid submitter 1716 can be configured to submit bids received from optimizer 1722 to CSP 1704. In some embodiments, bid submitter 1716 can submit participation hours and estimated participation amounts for each participation hour. In some embodiments, bid submitter 1716 submits a bid in response to optimizer 1722 determining an estimated participation amount and/or participation hours. In some embodiments, optimizer 1722 may determine the estimated participation amount and/or participation hours on a periodic basis, e.g., every fifteen minutes. In this regard, bid submitter 1716 can be configured to submit a bid to CSP 1704 every fifteen minutes.

Bid submitter 1716 can sign up for a notification regarding when optimizer 1722 creates a dispatch for ELDR module 1706 (e.g., determine an estimated participation amount for participation hours determined by participation kernel 1720). Bid submitter 1716 can be configured to generate a bid to provide to CSP 1704 based on the estimated participation amount and the participation hours received from optimizer 1722. In some embodiments, the bid that bid submitter 1716 provides to CSP 1704 includes the estimated participation amount and/or the participation hours determined by optimizer 1722 and/or participation kernel 1720. The dispatch results can include the participation hours and amounts that we should include in our bid.

Bid submitter 1716 can include multiple configurable settings for providing a bid to CSP 1704. The settings may include a job enabled flag which indicates whether bid submitter 1716 should operate. The settings may further include a "MaximumBidQuantityMw" which may be a cap for the estimated participation amount so that the participation amount does not exceed a reasonable level. The settings may include a "MinimumBidQuantityMw" which acts as a bottom level for the estimated participation amount. Any participation hour associated with an estimated participation amount below the minimum level may be considered a non-participation hour and left out of the bid to CSP 1704. Bid submitter 1716 can further include a "BidQuantityFractionalDigits" setting which defines the precision for the estimated participation amounts that CSP 1704 may be willing to accept. Bid submitter 1716 may also include a lockout period setting. This lockout period setting may also be implemented by user interface manager 1724. This setting may define a time span preceding a particular participation hour within which the user is not allowed to override or otherwise change the participation hour, causing a change to the bids placed to CSP 1704. Prior to the timespan, a user can be allowed to make changes to the participation hours via user interface manager 1724 and provide participation hour overrides to participation kernel 1720. This may cause bid submitter 1716 to made adjustments to current bids by submitting a second bid. However, within the time span, both user interface manager 1724 and/or bid submitter 1716 may stop making adjustments or placing new bids for a particular participation hour.

Since the collection of ELDR parameters and/or awarded bids may be performed over a network (e.g., the communication between ELDR module 1706 and CSP 1704 may be performed over a network such as the Internet), ELDR module 1706 can be configured to detect and/or recover from transient network errors and/or longer network and service outages. Collectors 1708-1714 can implement retry mechanisms (e.g., sending a message a second time if the first message is not delivered) to recover from transient network errors. In some embodiments, ELDR module 1706 can be configured to perform a long retry mechanism for collectors that run infrequently, e.g., NBT price collector 1714. The periodic scheduling of collection jobs and periodic nature of the optimization runs which trigger bid submission, provide another level of retries for handling longer outages. The collectors that read time series data (e.g., prices, NBT threshold, awarded bids) (e.g., collectors 1708-1714) can be configured to backfill with past data to fill gaps in data collection caused by network outages. Furthermore, any call to a database of collectors 1708-1714 and/or ELDR parameter database 1709 can use a retry mechanism to protect from transient errors.

In some embodiments, ELDR module 1706 is implemented on a server. Each of collectors 1708-1714 and/or bid submitter 1716 may be a MICROSOFT WINDOWS® service that can automatically start whenever the server is restarted and can be configured to automatically restart if the service crashes. In some embodiments, upon a startup of ELDR module 1706, each of collectors 1708-1714 can be configured to backfill time series data that may be missing from the time period where collectors 1708-1714 were not collecting data.

Predictor 1718 can be configured to receive real-time LMP values from real-time LMP collector 1708, day-ahead LMP values from day-ahead LMP collector 1710, and/or historic electric load data. Based on the received data, predictor 1718 can be configured to predict the received data into the future. Predictor 1718 is shown to generate a predicted day-ahead LMP, a predicted real-time LMP, and a predicted campus load. Predictor 1718 may be the same as and/or similar to load/rate predictor 622 as described with reference to FIG. 10 and elsewhere herein.

Participation kernel 1720 can be configured to generate participation hours to be used by optimizer 1722. Participation kernel 1720 can be configured to generate the participation hours based on the predicted day-ahead LMP, the predicted real-time LMP, a predicted campus load, a measured imported electricity, awarded participation hours, and/or a NBT threshold value. Participation kernel 1720 can be and/or include the functionality of participation predictor 1004 and/or selector 1008. Participation kernel 1720 can include some and/or all of the functionality for generating the participation hours as described with reference to FIGS. 10-16.

Participation kernel 1720 can be configured to determine the participation hours and/or estimated participation amounts for hours of one day or multiple days into the future. In this regard, the participation decisions that are shown in the user interfaces generated by user interface manager 1724 can provide a user with insight into the current day or into multiple days into the future.

In some embodiments, participation kernel 1720 can be configured to determine the participation hours based on how likely hours of a particular day will be awarded by the CSP 1704. For example, various modeling and/or classification techniques (e.g., neural networks, support vector machines, decision trees, etc.) can be used by participation kernel 1720 to determine the participation hours. For example, participation kernel 1720 can be configured to set a particular hour at as an hour to participate in the ELDR program based on a classification of whether or not the particular hour will be awarded based on historic hour data for real-time LMP, day-ahead LMP, weather data, past bid awards and/or rejections. If participation kernel 1720 determines, based on the classification, that it is unlikely that a particular hour is awarded, the participation kernel 1720 may not determine to participate in that hour.

Optimizer 1722 can be configured to generate an estimated participation amount for each of the participation hours generated by participation kernel 1720. The estimated participation amount may be a curtailment amount for reducing an electric load by for a particular participation hour. Optimizer 1722 can include some and/or all of the functionality of high level optimizer 632 and/or cost function modifier 1010. Optimizer 1722 can be configured to generate the objective function described herein with an ELDR term as generated by cost function modifier 1010. Optimizer 1722 can be configured to optimize the generated objective function to determine the estimated participation amounts. Furthermore, the optimizer 1722 can, by optimizing the objective function, determine operating load amounts for building equipment and cause the building equipment to operate based on the operating load amounts.

User interface manager 1724 can be configured to generate a user interface to present a user with ELDR information (e.g., actual and/or predicted ELDR parameters, load usage, CBL values, etc.) and receive ELDR hour overrides from a user. User interface manager 1724 can be configured to generate the user interfaces of FIGS. 15-16 and/or FIGS. 23-31. User interface manager 1724 can receive overridden participation hours from the user interface. The overridden participation hours may be hours that participation kernel 1720 has determined but a user does not want to participate in. Furthermore, the overridden participation hours may be hours of a particular day that have not been determined to be participation hours but the user would like ELDR module 1706 to participate in. User interface manager 1724 can provide the overridden participation hours to participation kernel 1720 so that the user override decisions of the user are implemented by participation kernel 1720 as desired by the user.

Still referring to FIG. 17, participation kernel 1720 can be configured to determine whether to participate in the ELDR program for a particular day in response to participation hours for the particular day not being awarded. ELDR module 1706 can be configured to maximize the revenue from participating in the ELDR program while minimizing the cost of operating equipment and purchasing resources. In the case of ELDR, the revenue may be a function of the CBL, which can be either a function of the first and last hour of participation, or the first hour of participation only. The CBL may be a "Same Day" CBL, a Same Day Three Before and Two After baseline is described with reference to FIG. 10 and elsewhere herein. For a same day CBL, both the first and last hour of participation of a particular day can determine the baseline hours used to generate the same day CBL.

To maximize revenue, ELDR module 1706 can be configured, via optimizer 1722, to increase electrical import during baseline hours, while decreasing the electrical import during participation hours. This keeps the CBL at an optimally high value such that a difference of the same day CBL and the electric load consumption during participation hours is maximized. ELDR module 1706 may have a dynamic response to the awarded status of participation hours on a given day. When participating in the Real-Time ELDR Market, a participation hour may or may not get awarded for curtailment by RTO/ISO 1702. The awarded status of a participation hour may be known by ELDR module 1706 an hour before the top of that hour.

When the first hour of participation does not get dispatched, ELDR module 1706, via participation kernel 1720 and/or optimizer 1722, can update its allocation decision in order to maintain a high CBL. This behavior may be advantageous since it maintains a high CBL. However, ELDR module 1706 may not be awarded for multiple "first hours" for which participation was bid on a particular day, i.e., it may be late in the day before a bid participation hour is awarded. This can be problematic since the CBL is being held high for a long period of time unnecessarily. The hours where ELDR module 1706 may be holding the electric load high are not turning out to actually be baseline hours.

Figure 21:
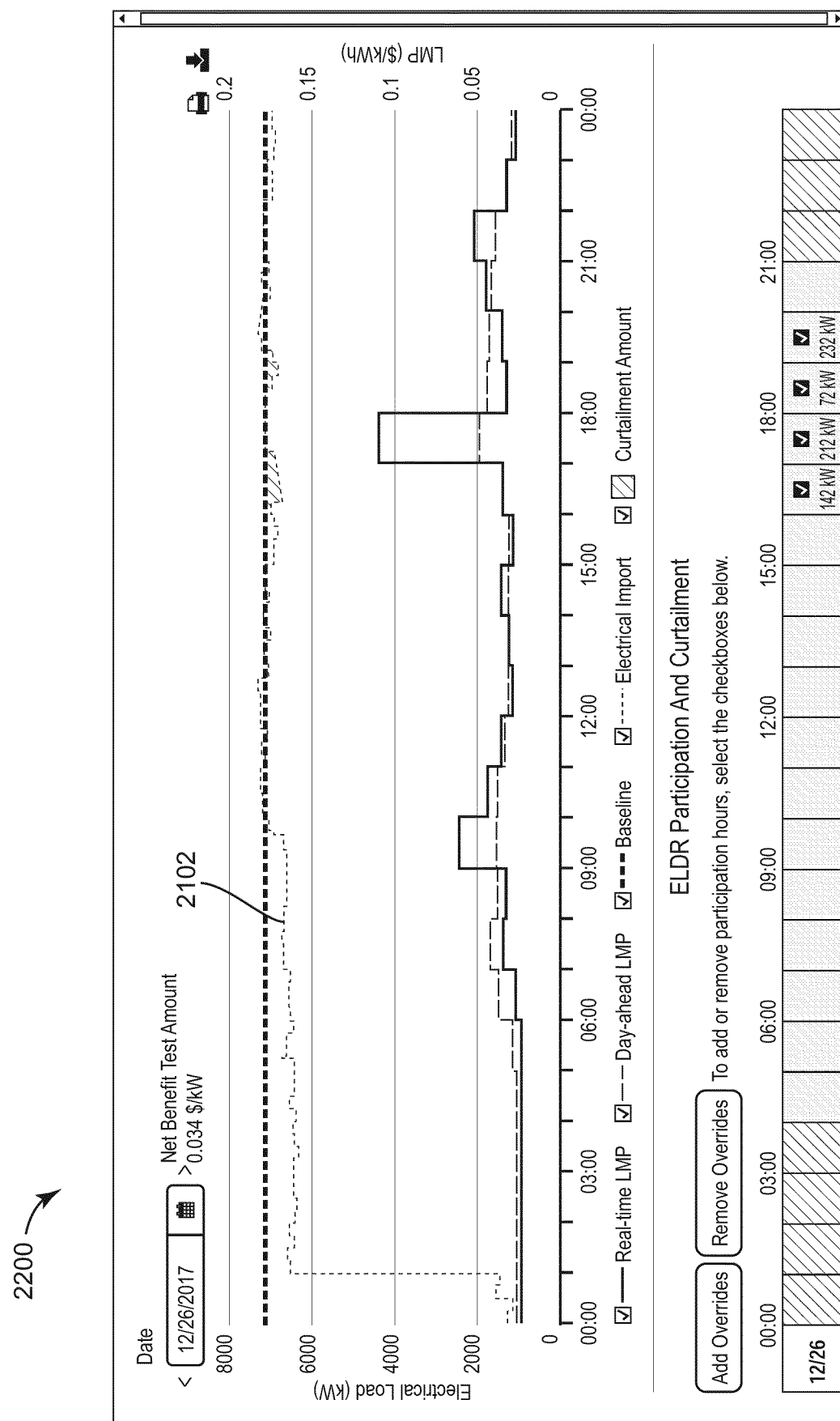
FIG. 21 is another chart illustrating the participation in the ELDR program when the first hours of the ELDR program participation bid are rejected, according to an exemplary embodiment.
Figure 22:
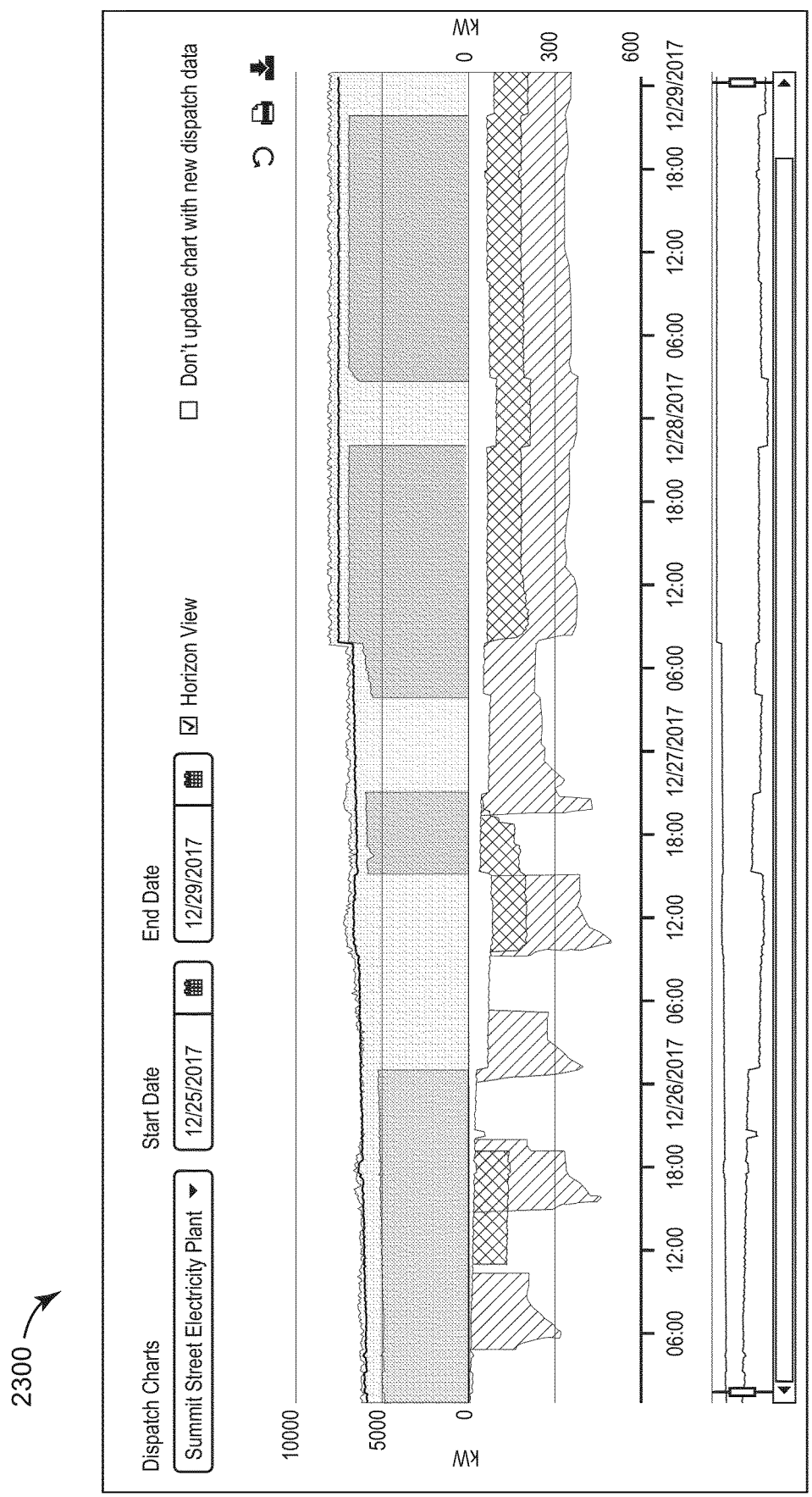
FIG. 22 is yet another chart illustrating the participation in the ELDR program when the first hours of the ELDR program participation bid are rejected, according to an exemplary embodiment.

This performance is shown in FIGS. 21 and 22. For example, the optimization of the cost function may push the start of the gas turbines to later in the day in order to maintain the high CBL, but at the end of the day the cost of electrical import has surpassed the potential revenue from ELDR since optimizer 1722 has kept the energy usage high. This is because ELDR module 1706 makes its decision based on the current status of the plant and what is predicted over the horizon. Therefore, participation kernel 1720 can be configured to determine whether to abandon participation in the ELDR program if ELDR module 1706 does not receive a first awarded participation hour for an extended period of time on a particular day.

When the first hour of participation does not get dispatched, it affects the value of the CBL and consequently the revenue from ELDR for the day by ELDR module 1706. In order to overcome the cost of not getting dispatched, participation kernel 1720 can be configured to determine a benefit by taking into account the revenue for the day and the cost of resources in order to generate this revenue. Participation kernel 1720 can be configured to determine whether the benefit is less than a predefined threshold. In response to determining that the benefit is less than the predefined threshold, participation kernel 1720 can be configured to abandon participation in the ELDR program for the remainder of the day. Participation kernel 1720 can be configured to determine the benefit based on the benefit function (an objective function):

$$J = \sum_{i=1}^{24} p_i r_{DA_i} \max(e_{CBL} - e_{grid_i}, 0) - \max\left(\sum_{i=1}^{24} (r_{e_i} - r_{ng_i}\eta_{GT})\max(e_{grid_i} - e_{gridLL}, 0), 0\right)$$

where $p_i$ is the participation status of the $i^{th}$ hour in the day. $p_i=0$ if it is not a participation hour or if the hour was not awarded and $p_i=1$ if it is a participation hour or the hour was awarded. $r_{DA_i}$ [$/kWh] is the Day-Ahead LMP of the $i^{th}$ hour. $e_{CBL}$ [kW] is the customer baseline load. $e_{grid_i}$ [kW] is the $i^{th}$ electricity import in kW. It is the actual electricity import for the hours prior to the current time and the estimated electricity import for the hours in the remainder of the day. $r_{e_i}$ [$/kWh]: is the electricity rate. $r_{ng_i}$ [$/kWh] is the natural gas rate. $\eta_{GT}$ is the estimated efficiency of the gas turbine. $e_{gridLL}$ [kW]: is the lower limit on the electricity import.

The first term of the benefit function is the total estimated revenue for the day:

$$\sum_{i=1}^{24} p_i r_{DA_i} \max(e_{CBL} - e_{grid_i}, 0)$$

The second term is the benefit function of the additional electricity being imported in order to maintain a high baseline or in other words the opportunity cost. If this additional import were to be generated by gas turbines instead, that would result in a natural gas cost. This is why the equivalent natural gas cost is subtracted from the cost of electricity import. In the case where the opportunity cost is negative, it means that it would have cost us more to generate the additional import to make the revenue. This is why the term is maxed at zero.

In some embodiments, the opportunity cost can be calculated using the electrical import of the whole day. In other cases without any gas turbines, the opportunity cost can be calculated using only the electrical import outside of participation hours:

$$\max\left(\sum_{i=1}^{24} (r_{e_i} - r_{ng_i}\eta_{GT})\max(e_{grid_i} - e_{gridLL}, 0), 0\right)$$

At every dispatch, participation kernel 1720 can be configured to make its participation decision based on whether the benefit is above the threshold or not and the NBT threshold value, predicted real-time LMP, and day-ahead LMP. If the benefit is greater than the threshold, then participation kernel 1720 can be configured to continue to participate for the remainder of the day. If the benefit gets to a point where it is below the threshold, then the decision would be to quit participating for the remainder of the day. Participation kernel 1720 can be configured to abandon the remainder of the day by setting the participation mask to zeros and keeping the participation mask at zeros for the remainder of the day. Determining to abandon participation for a particular day may result in an updated bid being sent to CSP 1704.

In some embodiments, participation kernel 1720 can perform the benefit test for the current day of operation and/or for every day over a particular horizon. The additional advantage of this approach is that the NBT threshold value can be continued to be used as is without a buffer and for those days where there only few hours of participation, the benefit would end up being lower than the pre-determined threshold and thus choose to opt out of participation.

In some embodiments, the benefit threshold is $1,000. Since the DA-LMP can be used in the determination of the benefit, it should be noted that at higher prices and if the first hour is not getting dispatched, it would take us couple of hours until participation for the day is abandoned.

Figure 18A:
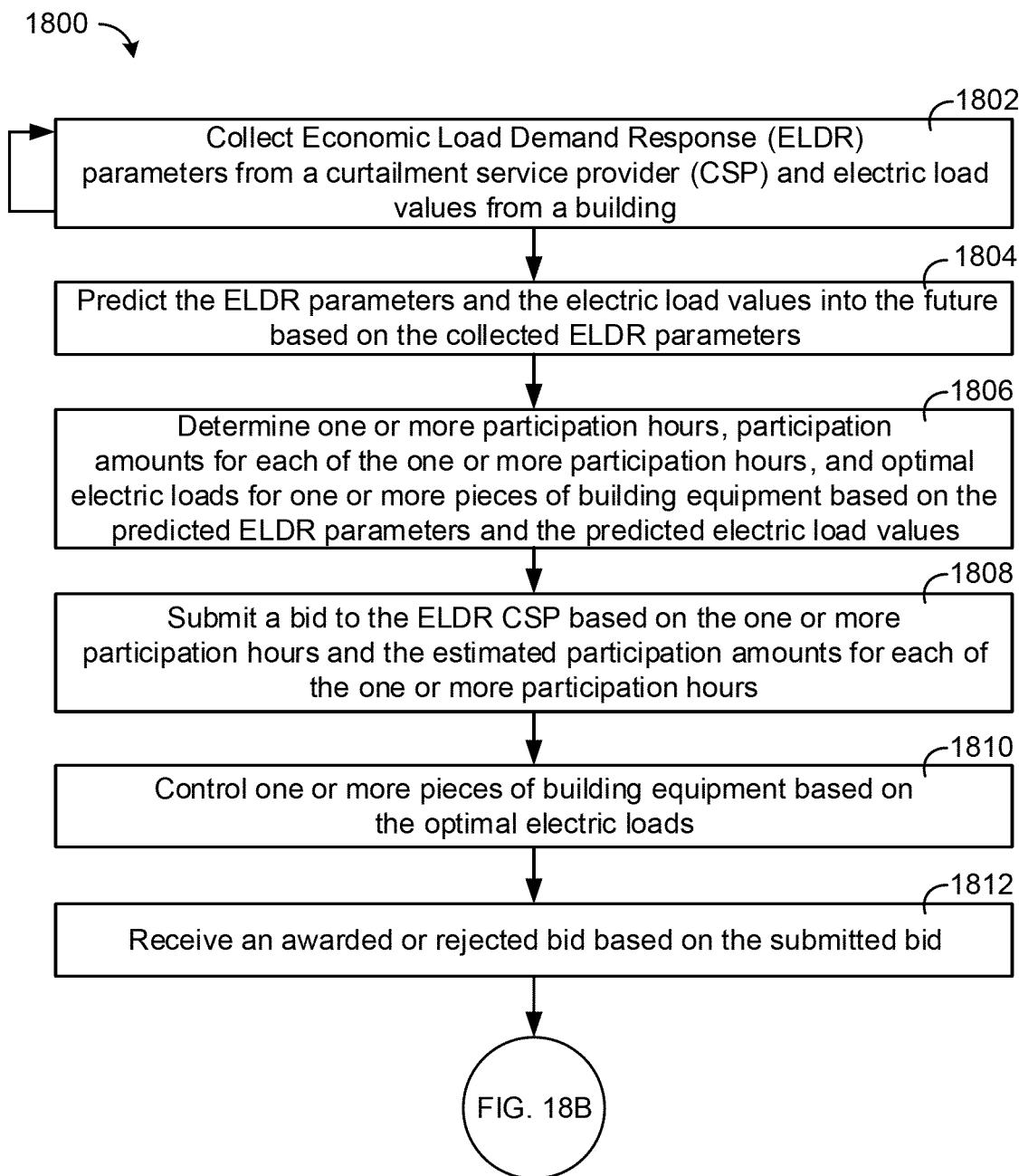
FIG. 18A is a flow diagram of a process for dynamically and automatically participating in the ELDR program via the ELDR module of FIG. 17, according to an exemplary embodiment.
Figure 18B:
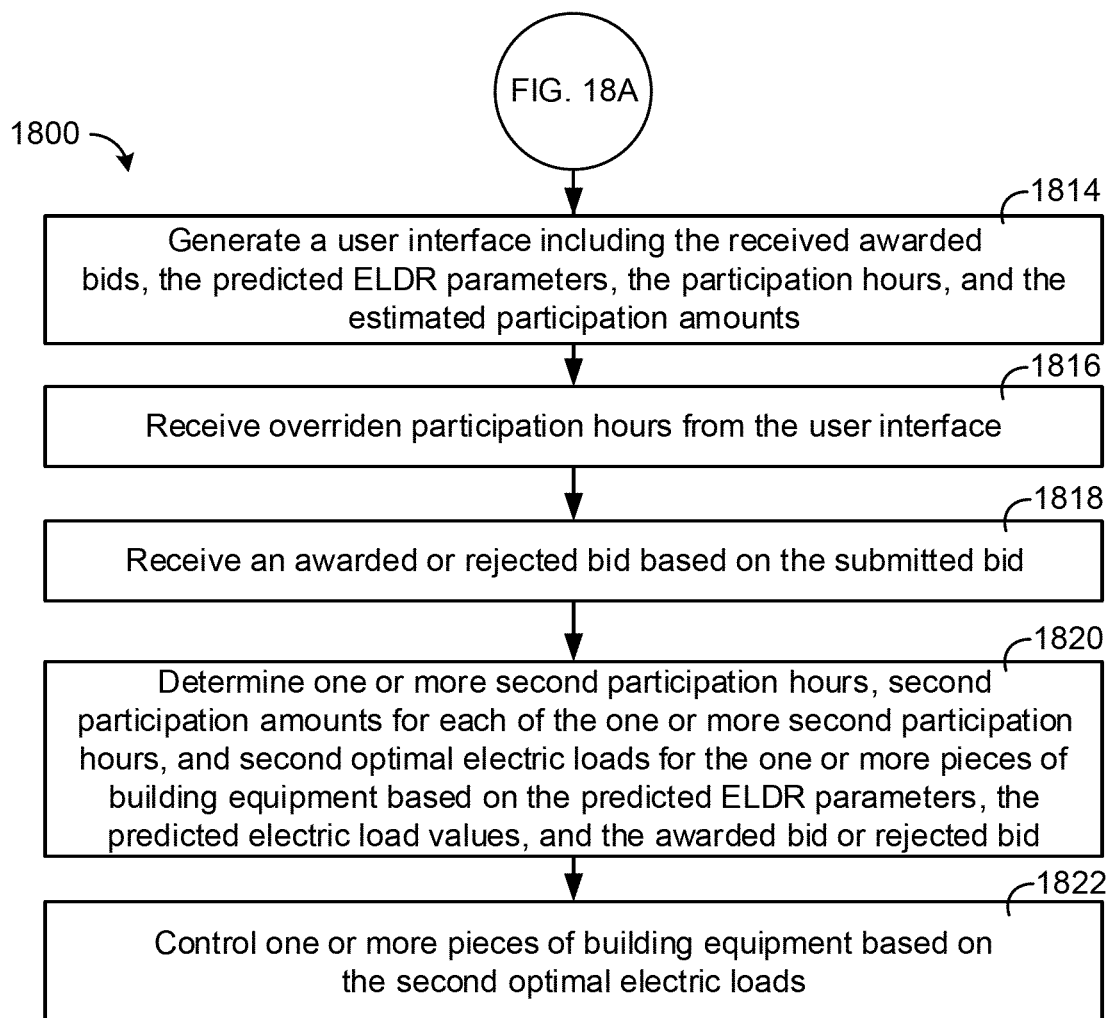
FIG. 18B is flow diagram of the process of FIG. 18A, according to an exemplary embodiment.

Referring now to FIGS. 18A-18B a process 1800 is shown for dynamically adapting control of building equipment for an ELDR program, according to an exemplary embodiment. Process 1800 can be performed by a computing device, e.g., ELDR module 1706. Although process 1800 is described with reference to ELDR module 1706, any computing device described herein can be configured to perform process 1800.

In step 1802, ELDR module 1706 can collect ELDR parameters from CSP 1704 and/or collect electric load values for a building. For example, the ELDR parameters may be real-time LMP values collected by real-time LMP collector 1708, day-ahead LMP values collected by the day-ahead LMP collector 1710, and/or NBT threshold values collected by NBT price collector 1714. The electric load values may be historic load data collected by building status monitoring devices. For example, in FIG. 10, a building status monitor 624 collects historic electric load data.

Step 1802 may be a periodic step, i.e., the ELDR parameters can be collected periodically. In some embodiments, each of the ELDR parameters is collected at a particular period. Process 1800 performs an optimization to determine bids, electric load reduction amounts, and optimal operating load values for building equipment. Since the ELDR parameters are collected periodically, the optimization of process 1800 can adapt to changes in the ELDR parameters over time.

In step 1804, ELDR module 1706 can predict the ELDR parameters and/or the electric load values of the building into the future. Predictor 1718 can predict a day-ahead LMP into the future, a real-time LMP into the future, and/or the electric load values of the building. These predicted values can be provided by predictor 1718 to participation kernel 1720 for determination of the participation hours.

In step 1806, based on the predicted ELDR parameters and the predicted electric load values, ELDR module 1706 can generate participation hours and determine participation amounts for each of the participation hours. The participation hours may be determined by participation kernel 1720 according to the methods described in FIGS. 10-12. For each of the participation hours, optimizer 1722 can determine a participation amount, an amount that ELDR module 1706 will reduce its electric load by with reference to a CBL. Furthermore, optimizer 1722 can determine optimal electric loads for building equipment of the building. The electric loads of the building equipment may be loads which cause the building equipment to consume an amount of energy such that the participation amount for each of the participation hours is appropriately met and/or revenue generated by participating in the ELDR program is maximized.

In step 1808, ELDR module 1706 can provide a bid to CSP 1704 based on the participation hours and participation amounts determined in step 1806. More specifically, bid submitter 1716 can submit a bid, including the participation hours and the participation amount for each participation hour to CSP 1704. In step 1810, based on the determined optimal electric loads of the step 1808, ELDR module 1706 can control the building equipment. Controlling the building equipment based on the determined optimal electric loads may cause the building equipment to operate at control parameters that cause the optimal electric load to be realized.

Responsive to submitting a bid, CSP 1704 may award some, none, or all of the bid participation hours. Awarded bids collector 1712 can collect the indication of whether an hour is awarded or not. Based on the awarded or rejected participation hours, future allocation of the building equipment and/or future participation in the ELDR program can be updated, steps 1814-1822 describe this dynamic adjustment in further detail.

In step 1814, ELDR module 1706 can generate a user interface for displaying the received awarded bids of step 1812, the actual and/or predicted ELDR parameters, the participation hours, and the estimated participation amounts. More specifically, user interface manager 1724 of ELDR module 1706 can generate the user interface. In some embodiments, the user interface is the same as and/or similar to the user interfaces shown in FIGS. 23-31. The user interface may display information to a user and receive various overrides from the user. For example, the user interface may indicate that a particular hour of a particular day is a participation hour for participating in the ELDR program. If a user does not want to participate in that hour, the user can indicate an override of the hour and the optimization of step 1820 can reflect the updates to the user preferred participation. In step 1816, user interface manager 1724 can receive the overridden participation hours from the user interface.

Based on submitted bid of step 1808, awarded bids collector 1712 can receive awarded and/or rejected participation hours from CSP 1704. More specifically, awarded bids collector 1712 can be configured to determine which hours are awarded or not awarded by reading the awarded hours from CSP 1704.

Based on the awarded hours (step 1818), overridden participation hours (step 1816), and changes to the ELDR parameters which may be periodically collected (step 1802), ELDR module 1706 can determine second participation hours, second participation amounts for the participation hours, and second optimal electric loads for the building equipment. Step 1820 may be similar to step 1806 but may be a second iteration of step 1806. The determination of participation hours, participation amounts, and optimal electric loads may be performed on a periodic basis to account for changes in the ELDR parameters, awarded bids, and/or user overrides. Although only two iterations of the determination are shown in process 1800, there may be any number of iterations performed. For example, after step 1820, ELDR module 1706 can submit a second bid (e.g., perform step 1808 again), receive more awarded or rejected bids (e.g., perform step 1812 again), collect more ELDR parameters (e.g., perform step 1802 again), receive more overridden hours (e.g., perform step 1818 again) and finally perform step 1820 again.

In step 1822, ELDR module 1706 can control the building equipment based on the second optimal electric loads. The second optimal electric loads may be the same as or different than the first electric loads. In this regard, the performance of the building equipment can adapt to changes in participation, awarded hours, overrides, changes in ELDR parameters, etc.

Figure 19:
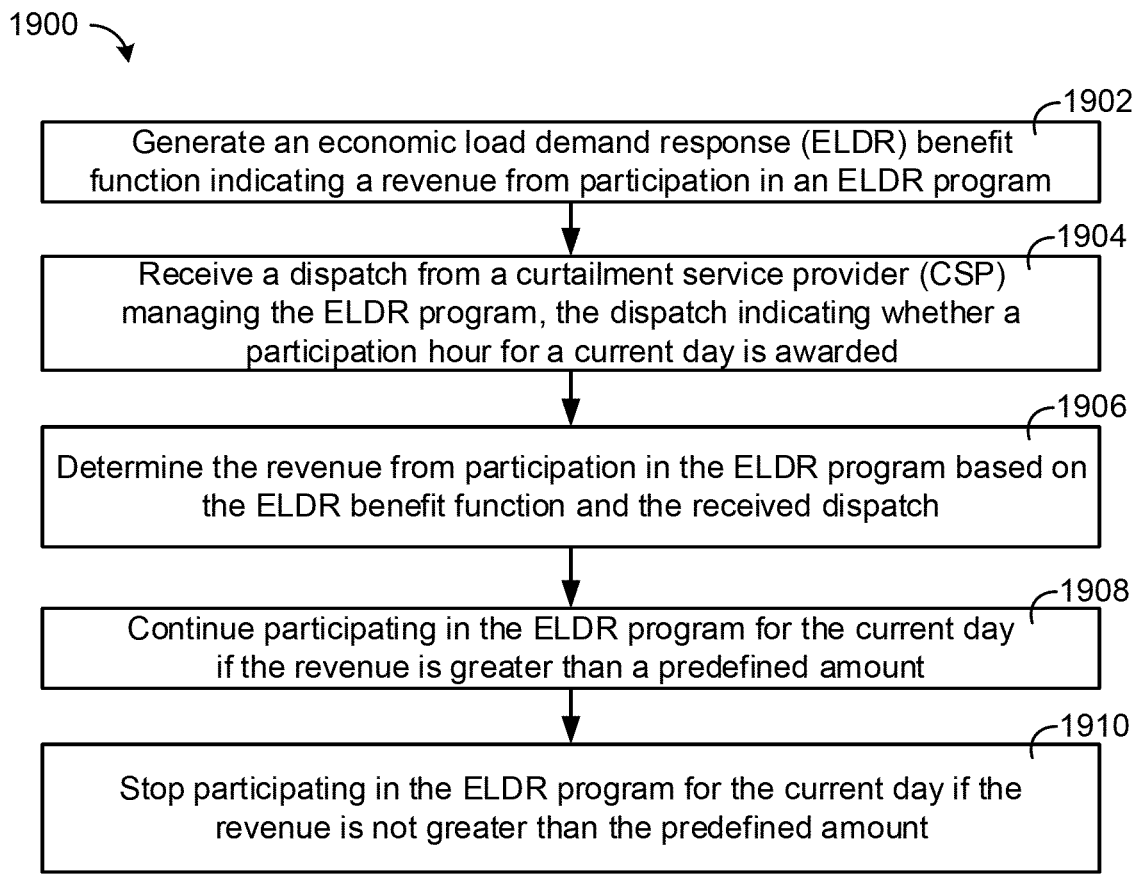
FIG. 19 is a flow diagram of a process that can be performed by the ELDR module of FIG. 17 for determining whether to participate in the ELDR program in response to receiving rejected bids, according to an exemplary embodiment.

Referring now to FIG. 19, a process 1900 for determining whether to continue participation in the ELDR program or abort participation in the ELDR program in response to receiving rejected participation hours is shown, according to an exemplary embodiment. Process 1900 can be performed by a computing device, e.g., ELDR module 1706. Although process 1900 is described with reference to participation kernel 1720 of ELDR module 1706, any computing device described herein can be configured to perform process 1900.

When participating in the ELDR program, ELDR module 1706 may determine optimal electric load amounts for building equipment to be high during baseline hours. Baseline hours may be hours where the load of a facility during the baseline hours is used to determine the CBL for the facility. By raising the value of the CBL, the ELDR module 1706 can maximize revenue when curtailing energy usage. However, the baseline hours used to determine the CBL are based on the first awarded participation hour for a day. In this regard, if the first bid participation hour of ELDR module 1706 is not accepted, ELDR module 1706 has raised the optimal electric load for no benefit. In this regard, process 1900 determines how ELDR module 1706 should respond to participation hours being rejected by CSP 1704.

In step 1902, participation kernel 1720 can generate an ELDR benefit function. The ELDR benefit function can indicate revenue generated from participating in an ELDR program. The benefit function may be:

$$J = \sum_{i=1}^{24} p_i r_{DA_i} \max(e_{CBL} - e_{grid_i}, 0) - \max\left(\sum_{i=1}^{24} (r_{e_i} - r_{ng_i} \eta_{GT}) \max(e_{grid_i} - e_{gridLL}, 0), 0\right)$$

where $p_i$ is the participation status of the $i^{th}$ hour in the day. $p_i=0$ if it is not a participation hour or if the hour was not awarded and $p_i=1$ if it is a participation hour or the hour was awarded. $r_{DA_i}$ [$/kWh] is the Day-Ahead LMP of the $i^{th}$ hour. $e_{CBL}$ [kW] is the customer baseline load. $e_{grid_i}$ [kW] is the $i^{th}$ electricity import in kW, it is the actual electricity import for the hours prior to the current time and the estimated electricity import for the hours in the remainder of the day. $r_{e_i}$ [$/kWh] is the electricity rate. $r_{ng_i}$ [$/kWh] is the natural gas rate. $\eta_{GT}$ is the estimated efficiency of the gas turbine. $e_{gridLL}$ [kW]: is the lower limit on the electricity import.

In step 1904, awarded bids collector 1712 can receive indications regarding whether particular bid participation hours have been awarded or rejected. The indication of the awarded or rejected participation hours can be provided by awarded bids collector 1712 to participation kernel 1720. Step 1904 may be similar to and/or the same as step 1812 of process 1800 as described with reference to FIG. 18A.

In step 1906, participation kernel 1720 can determine the revenue from participating in the ELDR program based on the ELDR benefit function based on the received indications of whether participation hours were awarded or rejected. In step 1908, participation kernel 1720 can continue participating in the ELDR program for the current day in response to determining that the revenue of step 1906 is greater than a predefined amount. However, if the revenue is less than the predefined amount, the participation kernel 1720 can determine to stop participating in the ELDR program for the particular day (step 1910). To stop participating in the ELDR program for the particular day, participation kernel 1720 can set all of the participation statuses of all the participation hours to zero.

Figure 20:
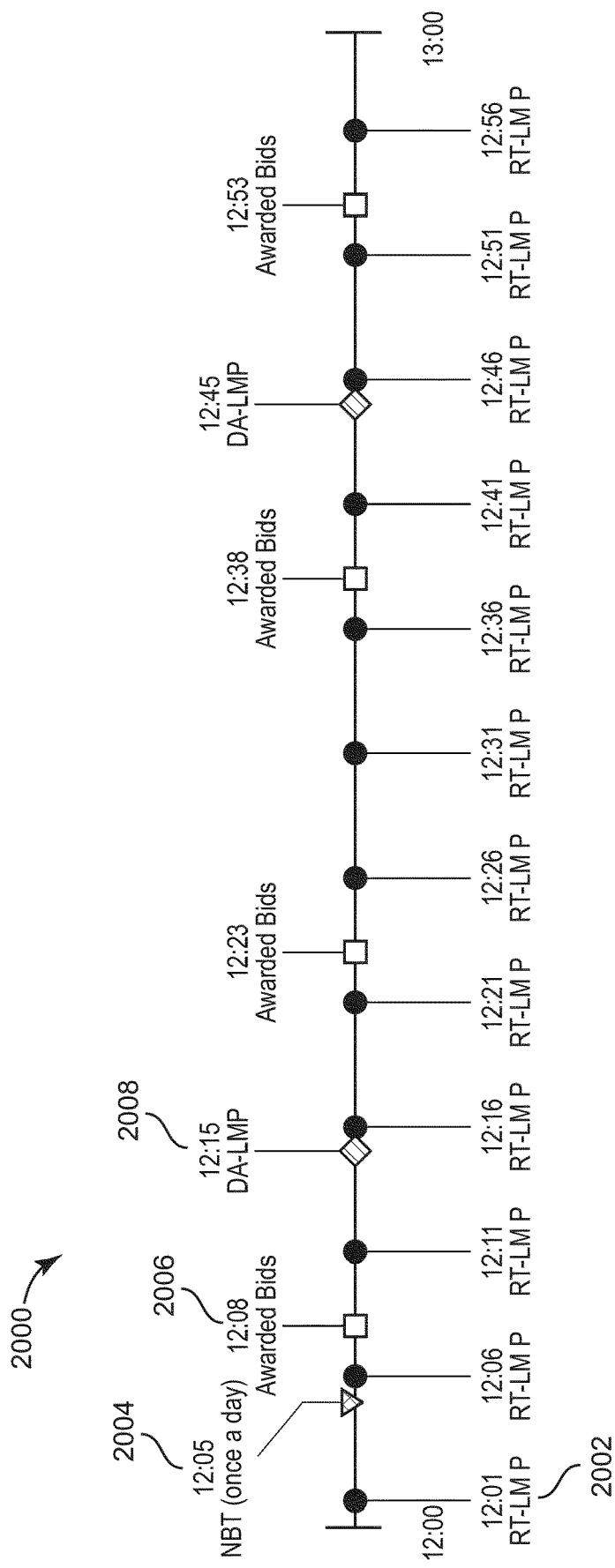
FIG. 20 is a timeline of collection events for collecting ELDR parameters by the ELDR module of FIG. 17 and dispatch events received by the ELDR module of FIG. 17, according to an exemplary embodiment.

Referring now to FIG. 20, a timeline 2000 illustrating the collection of various ELDR parameters by ELDR module 1706 is shown for a particular hour, according to an exemplary embodiment. Timeline 2000 illustrates the ELDR parameters collected by real-time LMP collector 1708, day-ahead LMP collector 1710, awarded bids collector 1712, and awarded bids collector 1712. Timeline 2000 illustrates collection events for real-time LMP (event 2002), collection events for awarded bids, (collection event 2006), collection events for day-ahead LMP (collection event 2008), and a collection event for the NBT threshold (collection event 2004). In timeline 2000, the real-time LMP is shown to be collected by real-time LMP collector 1708 at five minute intervals with the first collection of the hour occurring at 12:01. However, the collection of the real-time LMP may occur at any interval. The collection of the NBT threshold value by NBT price collector 1714 is shown to occur once in a particular day, in the timeline 2000 at 12:05 P.M. Finally, day-ahead LMP collector 1710 can collect the day-ahead LMP values. In timeline 2000, the day-ahead LMP values are shown to be collected at a thirty minute interval.

Referring now to FIGS. 21 and 22, electric load levels are shown on a day where the CSP 1704 rejects participation hours at the beginning of the day and ELDR module 1706 attempts to keep the CBL high, according to an exemplary embodiment. FIGS. 21 and 22, via graphs 2100, 2200, and 2300, provide an example of the problem that may occur if participation kernel 1720 does not perform process 1900 to determine whether or not to abandon participation in the ELDR program for a particular day. For example, as shown in graphs 2100 and 2200, all the participation hours were rejected except for hours 16:00 (e.g., 4:00 PM), 17:00 (e.g., 5:00 PM), 18:00 (e.g., 6:00 PM), and 19:00 (e.g., 7:00 PM). The electric load, indicated by marker 2102, is shown to be kept high all day since the early morning participation hours were rejected. It may not be worthwhile to keep the electric load high for such a long time preceding the awarded participation hours that occur late in the day. Therefore, process 1900 of FIG. 19 performed by participation kernel 1720 can identify whether or not to abandon participation in the ELDR program for a particular day.

Referring generally to FIGS. 23-31, interfaces 2400 and 2900 are shown for providing ELDR information to a user and receiving hours overrides from the user, according to an exemplary embodiment. Interfaces 2400 and 2900 can be generated by user interface manager 1724. A user, via a user device (e.g., user device 1013) can view interfaces 2400 and/or 2900. In some embodiments, interface manager 1724 causes user device 1013 to generate and display interfaces 2400-2900. In some embodiments, interfaces 2400 and 2900 are accessed via a web browser of interface manager 1724. In some embodiments, interfaces 2400 and 2900 are generated based on an application running on user device 1013.

ELDR module 1706 can automate participation in the ELDR program. Therefore, a user interface may be necessary to view and/or override the automated decisions and participation of ELDR module 1706. ELDR module 1706 may partially or fully remove the user from making decisions in the ELDR program. However, the user may be able to monitor the performance of ELDR module 1706 via user interfaces 2400 and/or 2900. All and/or some of the data used to make the various participation hour decisions by participation kernel 1720 can be displayed in user interfaces 2400 and/or 2900 for user review. Furthermore, the participation hours overridden used by participation kernel 1720 to determine the participation hours can be generated by user interface manager 1724 based on the decisions input by the user via interfaces 2400 and/or 2900.

Figure 23:
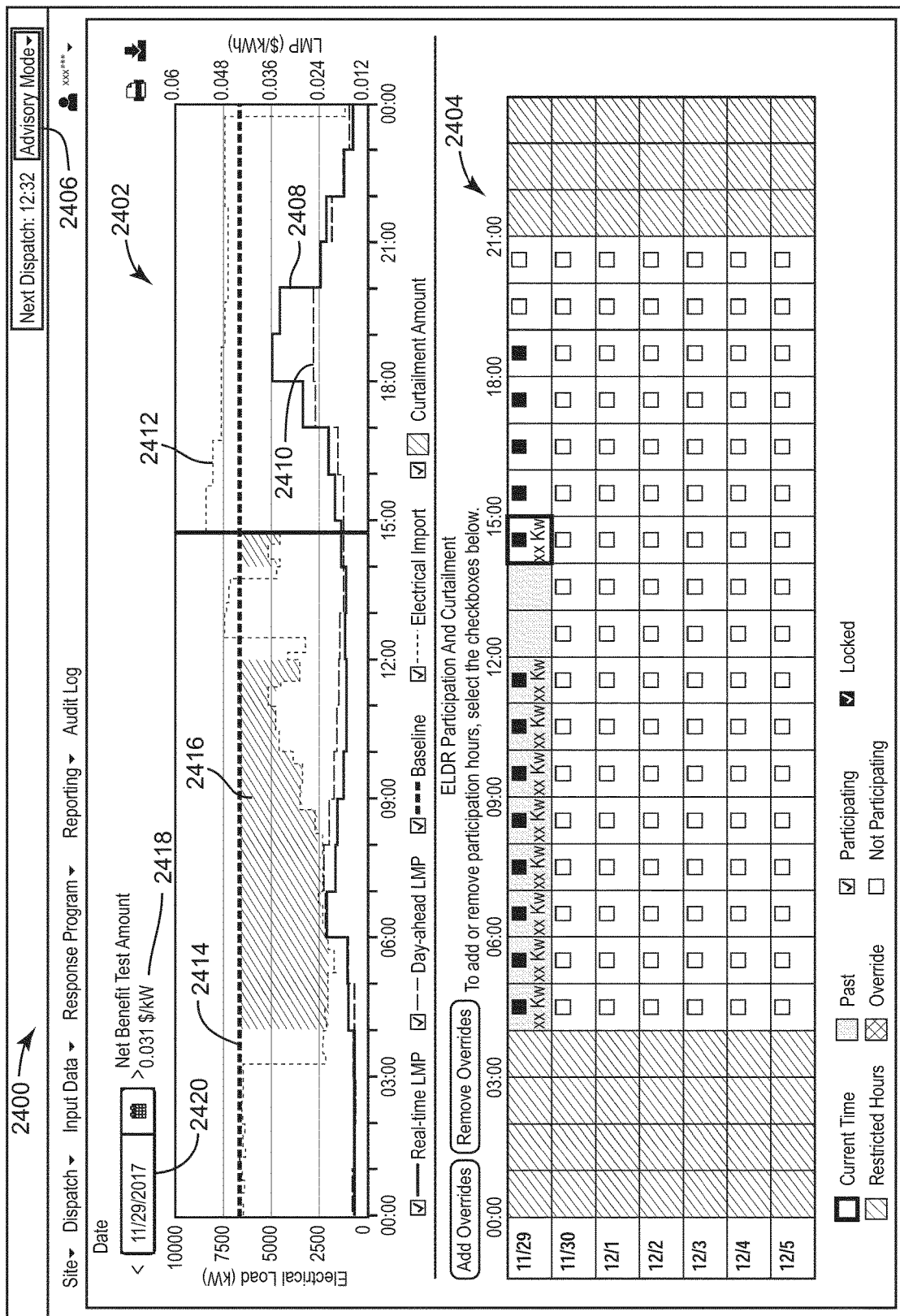
FIG. 23 is an interface that the ELDR module of FIG. 17 can generate for the ELDR program, according to an exemplary embodiment.

Referring to FIG. 23, interface 2400 is shown in greater detail, according to an exemplary embodiment. Interface 2400 is shown to include a graph 2402. Graph 2402 can be a plot of ELDR parameters and actual and/or determined electric load values for a building and/or campus.

User interface manager 1724 can be configured to generate graph 2402 based on data collected by collectors 1708-1714 and/or bid submitter 1716. Graph 2402 may display hourly and/or sub-hourly data. For example, the real-time LMP collected by real-time LMP collector 1708 can be plotted as real-time LMP 2408 in graph 2402. The day-ahead LMP collected by day-ahead LMP collector 1710 is plotted as day-ahead LMP 2410 in graph 2402. The electric load determined by optimizer 1722 and/or a monitored actual electric load (e.g., an electric load monitored by building status monitor 624) can be plotted as electric load 2412 in graph 2402. A baseline, a CBL, can be determined by interface manager 1724 and plotted as baseline 2414 so that a user viewing graph 2402 has a reference to see the load reduction. Finally, the curtailment amount, the difference between the baseline and the electric load for a participation hour, is marked by area 2416.

Graph 2402 is shown to display the hours for a particular day. The particular day is indicated by date 2420. In some embodiments, graph 2402 displays predicted data trends. For example, the predicted real-time LMP, the predicted day-ahead LMP, and/or the predicted campus load, all predicted by predictor 1718 can be displayed in graph 2402. Graph 2402 can also display overridden pricing, e.g., an overridden real-time LMP and/or an overridden day-ahead LMP that a user may manually define. Furthermore, graph 2402 can display an indication of the NBT threshold value, the indication marked by 2418.

Chart 2404 can display participation hours for participating in the ELDR program for multiple hours of a day and/or multiple hours of multiple days. The participation hours determined by participation kernel 1720 can be displayed in the chart along with an indication of the load reduction amount associated with the participation hour. Furthermore, chart 2404 may identify which hours, if any, were overridden by a user. For example, a user may add an override to cause participation kernel 1720 to define a particular hour as a participation hour even if it otherwise would not determine that the overridden hour is a participation hour. Similarly, the user can override a participation hour determined by participation kernel 1720 if the user does not want to participate in a particular hour that participation kernel 1720 determines.

In some embodiments, chart 2404 indicates which participation hours are awarded by CSP 1704 and/or which hours are rejected by CSP 1704. In some embodiments, the current hour is highlighted to indicate the current time to the user. Furthermore, chart 2404 may indicate which hours are locked and cannot be overridden by a user. In some embodiments, the hours lock a predefined amount of time before they occur. For example, an hour may become locked three hours before the occurs.

In some embodiments, interface 2400 indicates a total revenue generated for a particular day. In some embodiments, interface 2400 may provide an indication of a predicted revenue for a particular day and continuously update the total revenue throughout the day. Similarly, interface 2400 may display a total and/or average curtailment amount for a day. The total and/or average curtailment amount can be a predicted and/or actual value. In some embodiments, the total and/or average curtailment amount is updated continuously throughout the day.

Both graph 2402 and chart 2404 can display data for part of or an entire day, i.e., from midnight to midnight. The user can view current and/or past information via the graph 2402 and chart 2404 (e.g., the past sixty days of information) and can navigate through the past information. Chart 2404 can display both the hours of the current day and the hours of days into the future (e.g., nine days into the future). Furthermore, chart 2404 can allow a user to perform a navigation action to display more days into the future (e.g., swipe up or scroll down). For example, user interface manger 1724 may store past data and/or may otherwise be able to retrieve past data (e.g., retrieve past data from the ELDR parameter database 1709).

The overrides that the user can make via interface 2400 can include participation overrides and pricing overrides. The user can override participation hours on an hour by hour basis if the participation hours are not yet locked (e.g., the hours may become locked within at a predefined amount of time into the future). Interface 2400 may provide an indication of which hours are overridden and what the original decision for the hour was. Interface 2400 may simultaneously display the user override decision, whether to participate or not participate at the particular hour, and the decision to participate or not participate as determined by participation kernel 1720.

Furthermore, a user can override the real-time LMP and/or the day-ahead LMP via interface 2400. The user can override the values for the real-time LMP and/or the day-ahead LMP on an hour by hour basis (or can input a constant value for a particular day). The user may only be able to override the prices for an hour a predefined amount of time before the hour occurs. Hours that are locked, e.g., the current hour plus the three following hours, the user may not be able to override with an overridden price. Interface 2400 may display both the user overridden price and/or the original and/or actual price. This data may be displayed simultaneously in the user interface.

Interface 2400 is shown to include a selector 2406 for operating in either an advisory mode or an auto mode. When the auto mode is selected, ELDR module 1706 can be configured to participate automatically without any user input. When the advisory mode is selected, ELDR module 1706 can be configured to participate automatically but take into account user overrides. In some embodiments, when the advisory mode is selected, the ELDR program may not be executed by ELDR module 1706.

Figure 24:
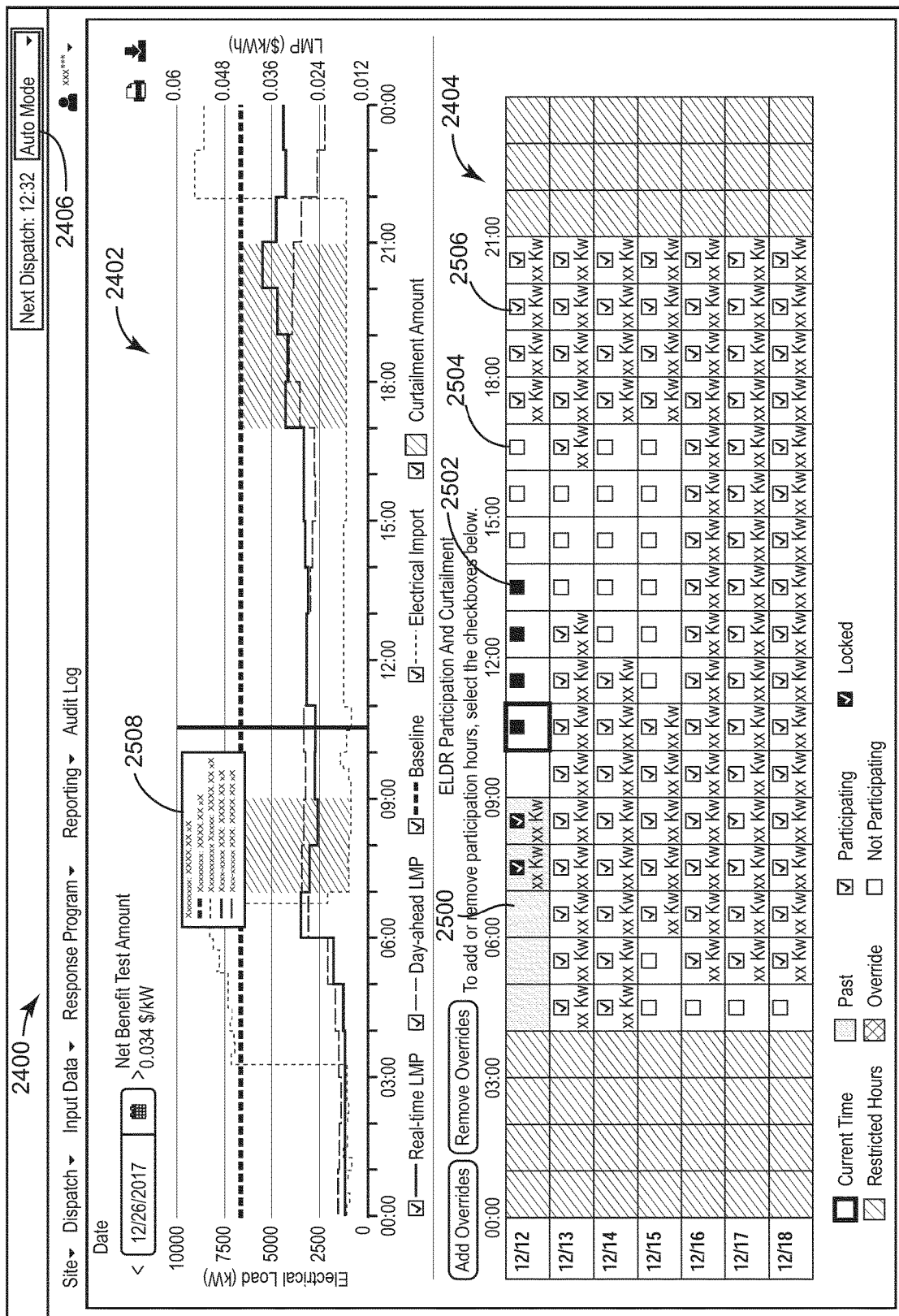
FIG. 24 is the interface of FIG. 23 illustrating various participation hours and participation amounts for multiple days into the future for participating in the ELDR program, according to an exemplary embodiment.

Referring now to FIG. 24, interface 2400 is shown in greater detail display participation decisions for multiple hours and days into the future, according to an exemplary embodiment. As shown in FIG. 24, participation decisions and participation amounts are shown in chart 2404. Some of the hours are marked as participation hours with the associated participation amounts. The participation hours and the participation amounts can be determined by the participation kernel 1720 and optimizer 1722. An example of a participation hour is the hour marked by 2506. A user can be able to edit and override these participation hours, in addition to the hours where no participation has been determined.

Furthermore, a user can override an hour where no participation has been determined, for example, the hour marked by 2504. However, some hours may be locked once they are within a predefined time into the future. For example, the hour marked by 2502 is a locked hour and a user cannot override the locked hour. An example of a past participation hour and an indication of the participation amount for the past participation hour is marked by 2500. Graph 2402 is shown to include a pop-up window 2508. When a user hovers over the graph 2402 at a particular location, the values for the plotted ELDR parameters can be displayed to the user based on the time associated with the location where the user hovered and the values of the ELDR parameters associated with the particular time can be displayed.

Figure 25:
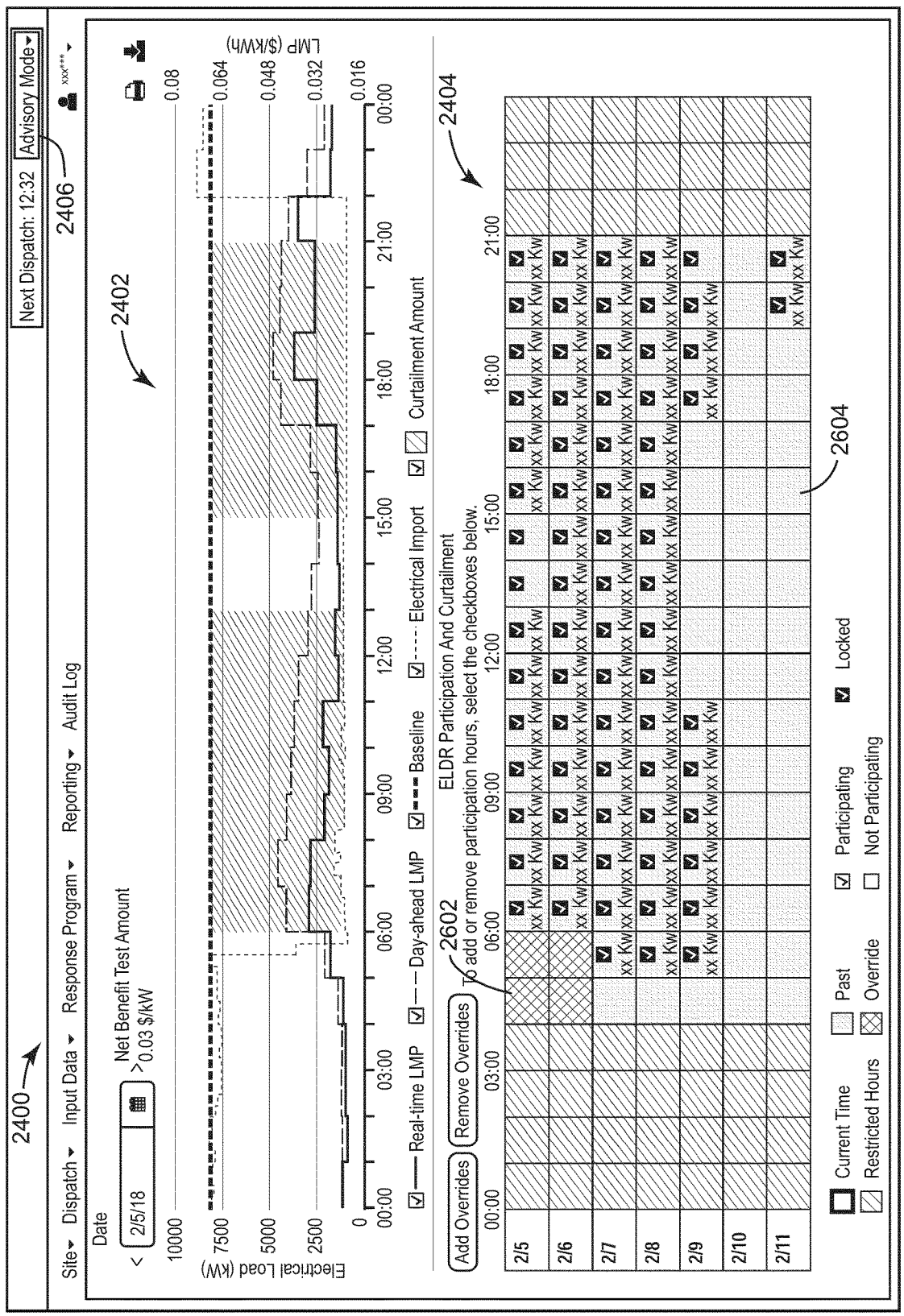
FIG. 25 is the interface of FIG. 23 illustrating overridden participation hours and past participation hours, according to an exemplary embodiment.
Figure 26:
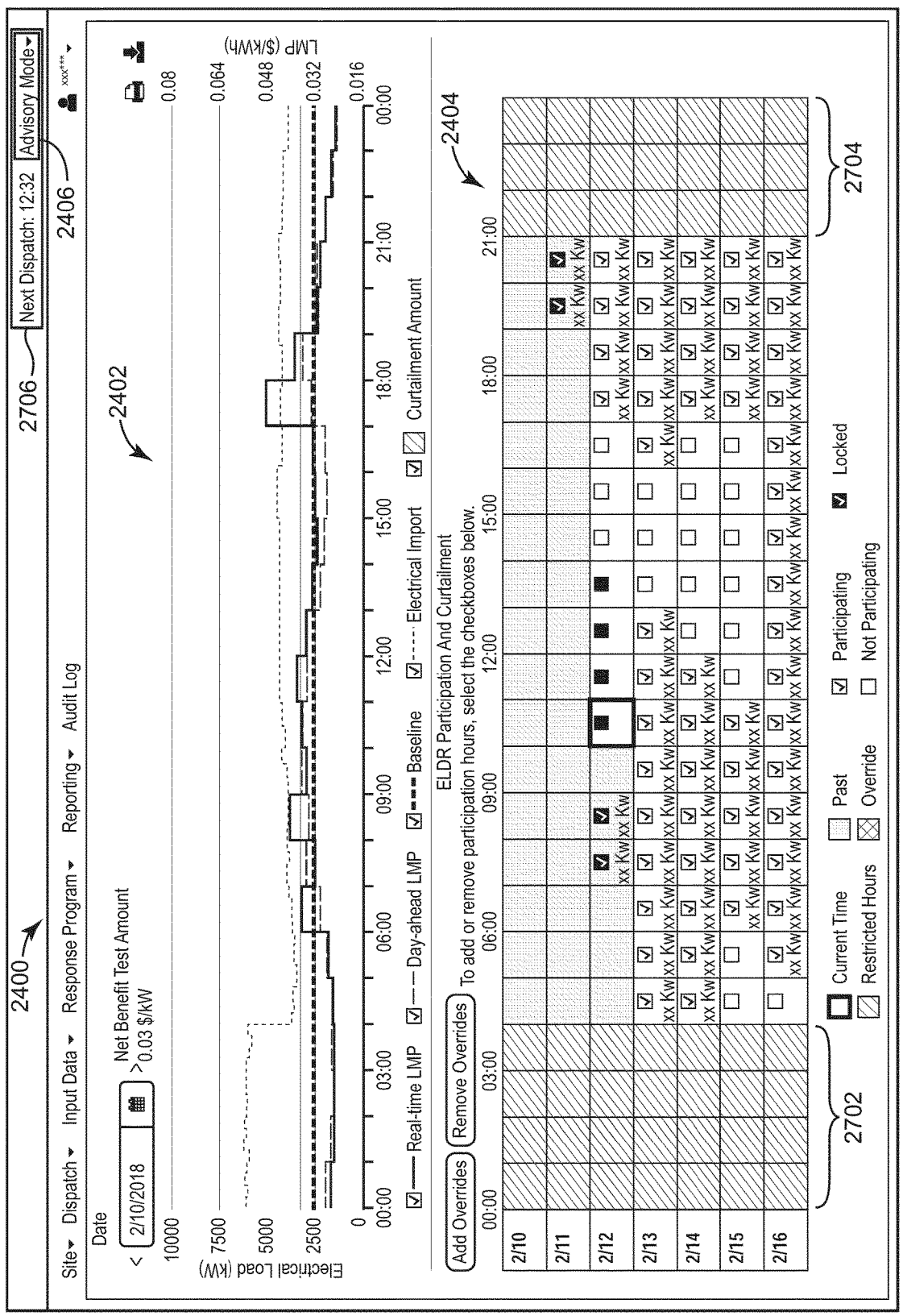
FIG. 26 is the interface of FIG. 23 illustrating a small number of participation hours and participation amounts for some days, according to an exemplary embodiment.

Referring now to FIG. 25, interface 2400 to include overridden participation hours and past participation hours, according to an exemplary embodiment. An example of an overridden participation hour is hour 2602. Hour 2602 can be an hour where the user indicated that participation should not occur. All of the hours shown in FIG. 25 are past hours, these are hours which have already occurred and ELDR module 1706 may have already participated in. Hour 2604 provides an example of a past hour where no participation in the ELDR program occurred. Referring now to FIG. 26, another example of user interface 2400 is shown, according to an exemplary embodiment. FIG. 26 is an example where the ELDR module 1706 determines it is best to participate only a small amount of hours, six hours total in this case, for a particular day.

Figure 27:
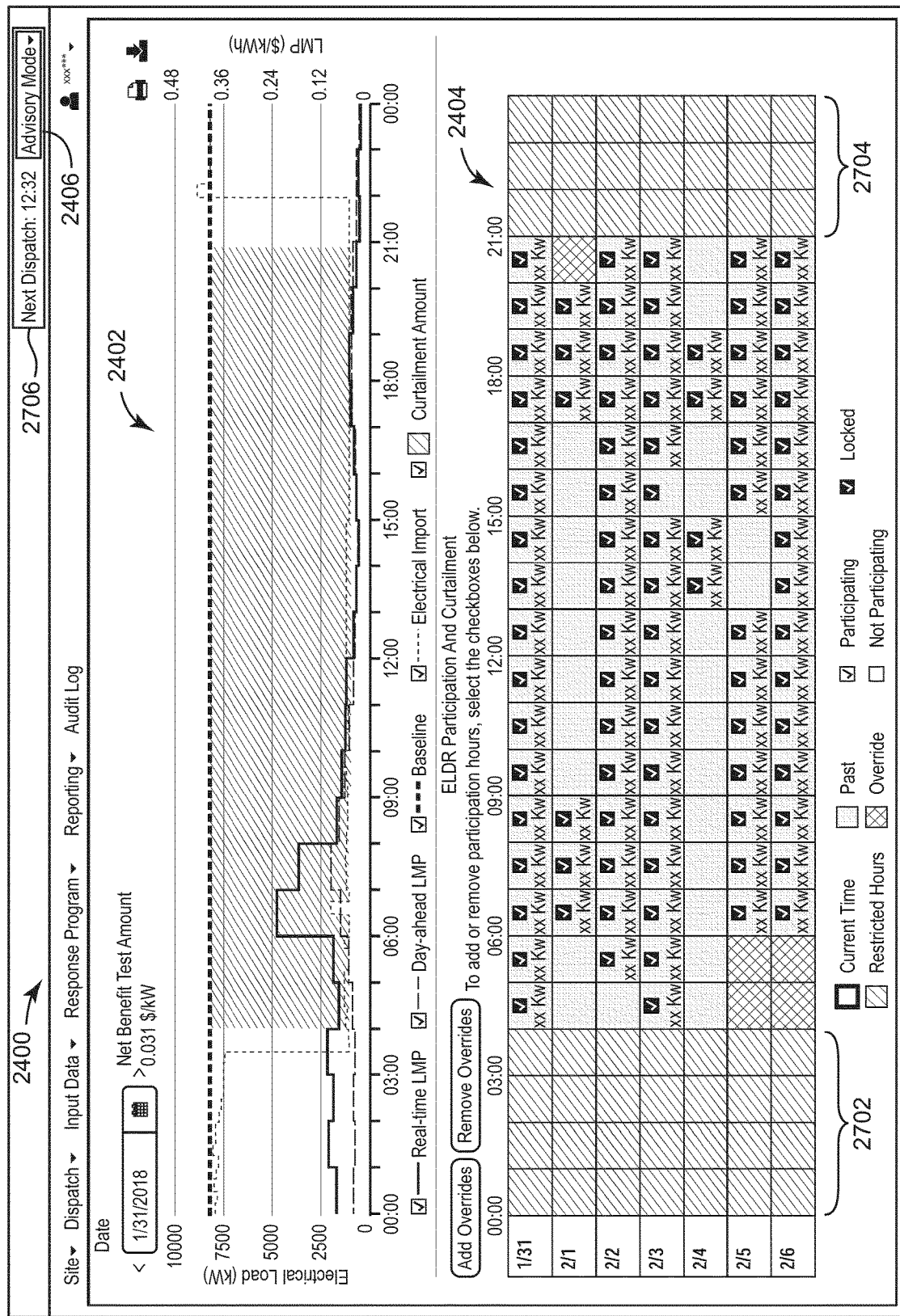
FIG. 27 is the interface of FIG. 23 illustrating a large number of participation hours and participation amounts for some days, according to an exemplary embodiment.

Referring now to FIG. 27, yet another example of user interface 2400 is shown. In FIG. 27, a large number of days are participated in, for the date of Jan. 31, 2018, every possible hour of participation is shown. In both FIGS. 26 and 27, some hours of the days are permanently locked. Morning hours 2702 and the evening hours 2704 are shown to be locked. These hours may be unsupported hours, i.e., hours that the ELDR program does not allow participation. In some embodiments, the hours are between midnight and 4:00 A.M. (the morning hours 2702) and between 9:00 P.M. and midnight (the evening hours 2704). Furthermore, user interface 2400 can display a time 2706 which may correspond to a dispatch time. The dispatch time may be the next time that the awarded bids collector 1712 will attempt to collect the awarded bids from CSP 1704.

Figure 28:
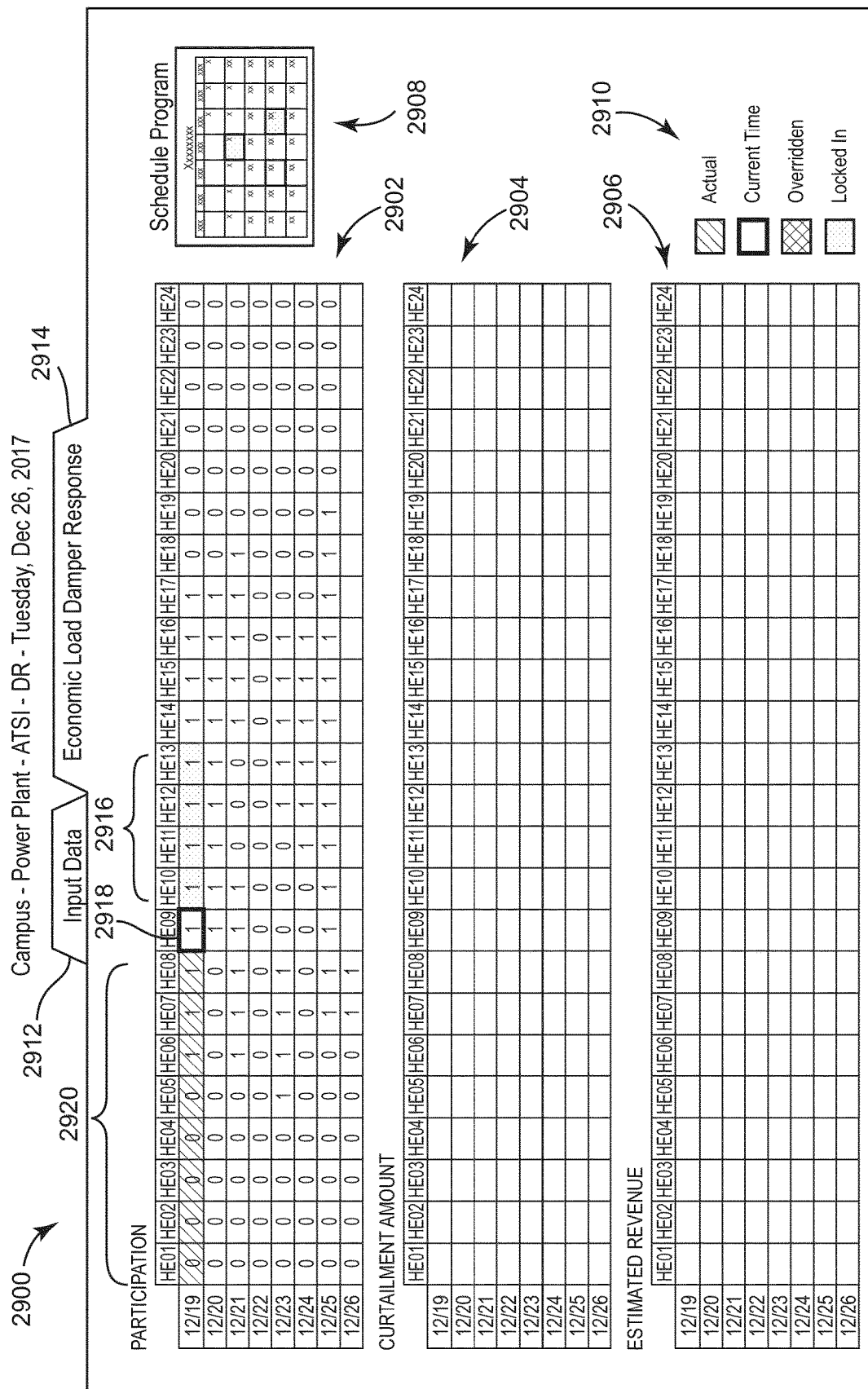
FIG. 28 is another interface that the ELDR module of FIG. 17 can generate for the ELDR program, according to an exemplary embodiment.

Referring now to FIG. 28, interface 2900 is shown in detail, according to an exemplary embodiment. Interface 2900 is shown to include multiple tabs, an input data tab 2912 and an economic load demand response tab 2914. Input data tab 2912 is shown in greater detail in FIG. 31. In economic load demand response tab 2914, tables 2902-2906 are shown. Table 2902 illustrates the various participation hours. The hours may be marked as either a one or a zero, a one indicating participation while a zero indicates no participation. Hours that are locked may be displayed in a first color (red), e.g., hours 2916 are shown to be locked hours, hour 2918 is shown to be the current hour, while hours 2920 are shown to be past hours.

Table 2904 can display a curtailment amount for each of the participation hours. For an hour where there is no participation hour, where table 2902 indicates a zero, the corresponding entry of table 2904 may also be a zero. However, for an hour with participation, where table 2902 indicates a one, the corresponding entry of table 2904 may indicate the amount of the participation. Furthermore, table 2906 may indicate the revenue generated for each hour. Legend 2910 may indicate various colors, patterns, or other visual markers for actual past hours, the current hour, an overridden hour, and a locked in hour. Element 2908 may allow a user to navigate between various different days and view ELDR participation information for various different days.

Figure 29:
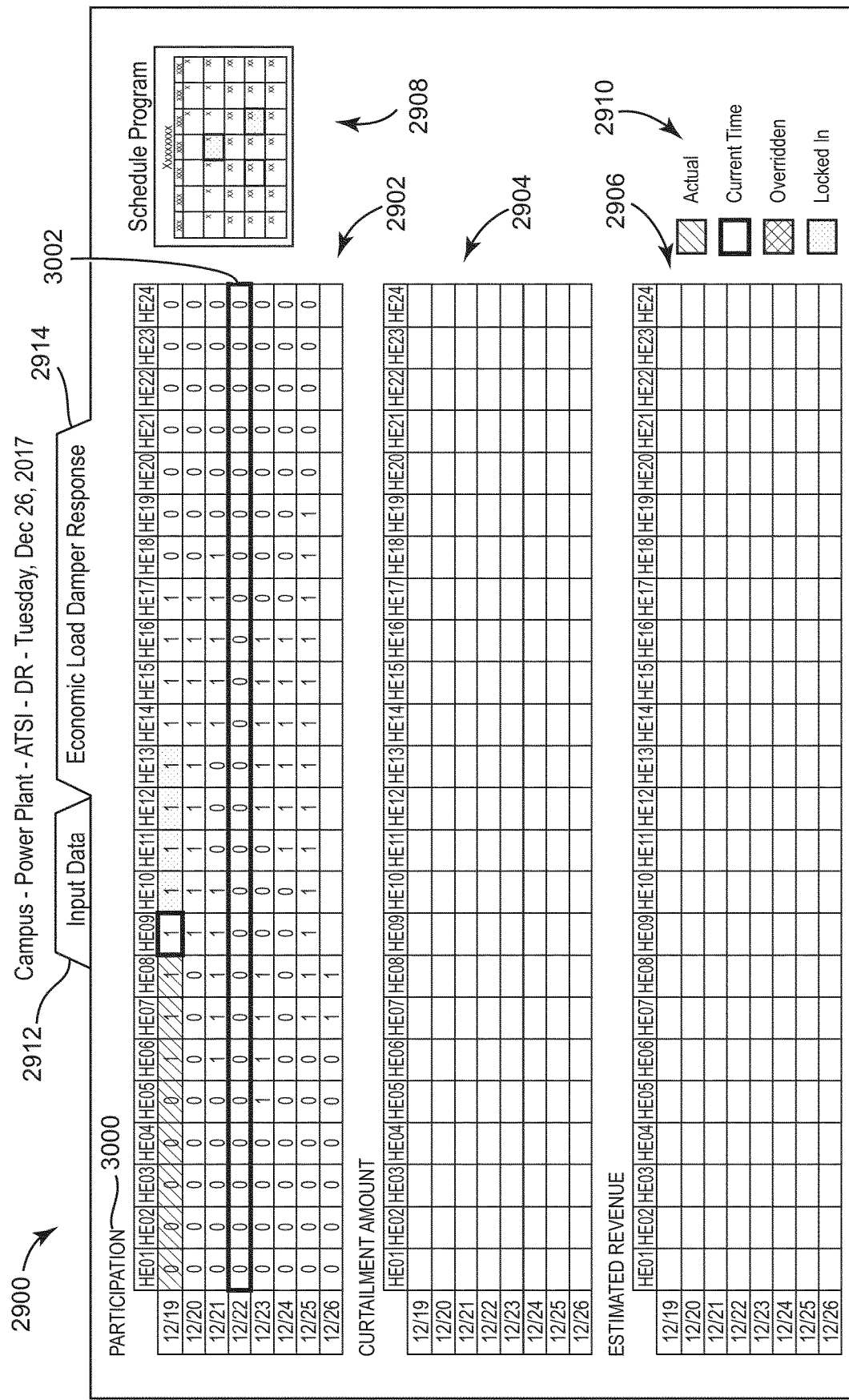
FIG. 29 is an example of selecting and overriding various hours in the interface of FIG. 28, according to an exemplary embodiment.

Referring now to FIG. 29, interface 2900 is shown to allow a user to select and override various hours, according to an exemplary embodiment. In FIG. 29, non-participation hours 3002 are shown to be selected by a user. The user may interact with the participation button 3000 causing all of the selected hours to become participation hours. Likewise, the user could select participation hours and cause the participation hours to become non-participation hours.

Figure 30:
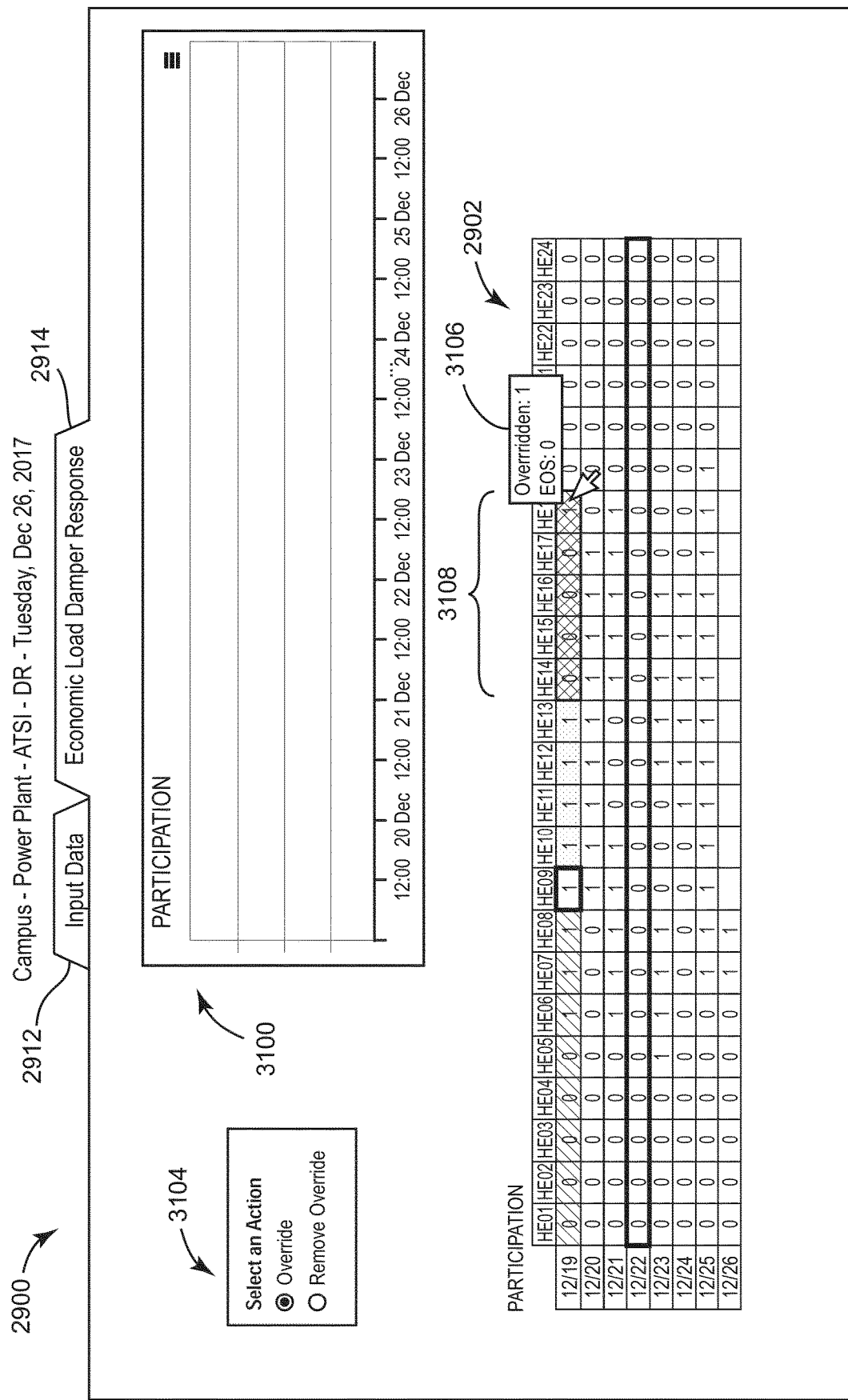
FIG. 30 is the interface of FIG. 28 illustrating a plot of ELDR parameters and an indication of overridden participation hours.

Referring now to FIG. 30, interface 2900 is shown to include a plot of ELDR parameters and an indication of overridden participation hours, according to an exemplary embodiment. The interface 2900 is shown to include plot 3100 which may plot various ELDR parameters. Plot 3100 may be similar to and/or the same as graph 2402 as described with reference to FIGS. 23-27. Interface 2900 is shown to include override box 3104 which presents a user with an button to add an override and/or remove an override. If a user selects a particular hour of table 2902 and presses the override button, the hour may be overridden (e.g., overridden from a participation hour to a non-participation hour or from a non-participation hour to a participation hour). The user can also remove the override, returning the participation decision to the decision made by ELDR module 1706.

In FIG. 30, overridden hours 3108 are shown. These hours can be shaded a particular color to indicate to a user which hours of table 2902 have been overridden. If the user hovers a cursor over overridden hours 3108, a pop-up 3106 may be displayed indicating both the user override decision and the decision of ELDR module 1706.

Figure 31:
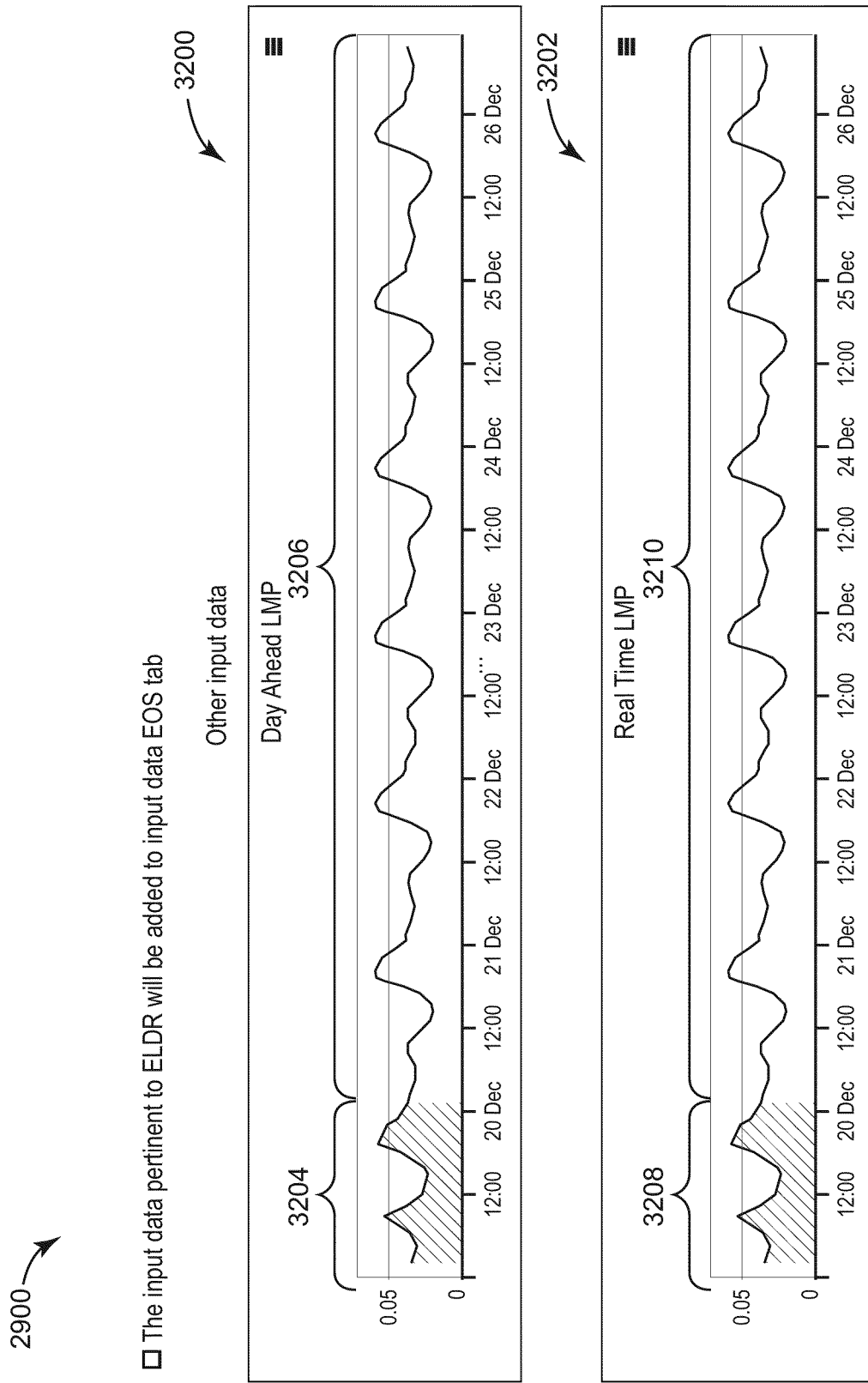
FIG. 31 is the interface of FIG. 28 illustrating plots of a real-time locational marginal price (LMP) and a day ahead LMP, according to an exemplary embodiment.

Referring now to FIG. 31, input data tab 2912 is shown in greater detail, according to an exemplary embodiment. If the user interacts with input tab 2912, interface 2900 may display graphs 3200 and 3202 as shown in FIG. 31. The graphs may be graphs of ELDR parameters, in FIG. 31, the graphs are of values for the day-ahead LMP and the real-time LMP. Each of the graphs 3299 and 3202 can be broken into two sections, past values 3204 and 3208, and future values 3206 and 3210. The past values may be actual values collected from CSP 1704 while future values may be values predicted by predictor 1718.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An energy optimization system for a building, the system comprising:
    a processing circuit configured to:
        perform an optimization to generate one or more first participation hours and a first load reduction amount for each of the one or more first participation hours and provide a first bid comprising the one or more first participation hours and the first load reduction amount for each of the one or more first participation hours to a computing system configured to facilitate an economic load demand response (ELDR) program;
        operate one or more pieces of building equipment to affect an environmental condition of the building based on one or more first equipment loads for participating in the ELDR program;
        receive one or more awarded or rejected participation hours from the computing system responsive to the first bid;
        generate one or more second participation hours for participating in the ELDR program, a second load reduction amount for each of the one or more second participation hours, and one or more second equipment loads for the one or more pieces of building equipment based on the one or more awarded or rejected participation hours by performing the optimization a second time; and
operate the one or more pieces of building equipment to affect the environmental condition of the building based on the one or more second equipment loads.

2. The system of claim 1, wherein the processing circuit is configured to:
generate a predicted campus electric load based on at least one of historical campus electric load values, predicted market resource prices, predicted equipment loads, or predicted chilled water loads; and
generate the one or more second participation hours for participating in the ELDR program, the second load reduction amount for each of the one or more second participation hours, and the one or more second equipment loads for the one or more pieces of building equipment based on the one or more awarded or rejected participation hours and on the predicted campus electric load by performing the optimization the second time.

3. The system of claim 1, wherein the processing circuit is configured to:
generate a second bid comprising the one or more second participation hours and the second load reduction amount for each of the one or more second participation hours;
provide the second bid to the computing system configured to facilitate the ELDR program; and
receive one or more second awarded or rejected hours from the computing system responsive to the second bid.

4. The system of claim 3, wherein the second bid is an update to the first bid, the one or more second participation hours are an update to the one or more first participation hours, and the second load reduction amount for each of the one or more second participation hours is an update to the first load reduction amount for each of the one or more first participation hours.

5. The system of claim 1, wherein the one or more awarded or rejected hours and the one or more second participation hours are hours of a particular day, wherein the processing circuit is configured to:
determine a revenue benefit for the particular day based on a benefit function and the one or more awarded or rejected hours; and
determine whether to participate in the ELDR program for the particular day based on a comparison of the revenue benefit to a predefined threshold.

6. The system of claim 5, wherein the processing circuit is configured to determine whether to participate in the ELDR program for the particular day based on the comparison of the revenue benefit to the predefined threshold by:
determining to participate in the ELDR program for the particular day in response to a determination that the revenue benefit is greater than the predefined threshold; and
determining not to participate in the ELDR program for the particular day in response to a determination that the revenue benefit is less than the predefined threshold.

7. The system of claim 1, wherein the processing circuit is configured to perform the optimization to generate the one or more first participation hours for participating in the ELDR program, the first load reduction amount for each of the one or more first participation hours, and the one or more first equipment loads for the one or more pieces of building equipment based on one or more ELDR parameters for the ELDR program.

8. The system of claim 7, wherein the one or more ELDR parameters comprise at least one of a day ahead locational marginal price which is an electricity price for a particular area on a future day, a real-time locational marginal price which is an electricity price at a current time, or a net benefits test (NBT) threshold which is a value indicating whether a particular hour should be a participation hour.

9. The system of claim 1, wherein the processing circuit is configured to:
periodically collect one or more ELDR parameters from the computing system configured to facilitate the ELDR program; and
generate the one or more second participation hours for participating in the ELDR program, the second load reduction amount for each of the one or more second participation hours, and the one or more second equipment loads for the one or more pieces of building equipment based on the one or more first awarded or rejected participation hours and the periodically collected ELDR parameters by performing the optimization the second time.

10. The system of claim 9, wherein the processing circuit is configured to:
generate one or more predictions of the one or more ELDR parameters based on the one or more ELDR parameters; and
generate the one or more second participation hours for participating in the ELDR program, the second load reduction amount for each of the one or more second participation hours, and the one or more second equipment loads for the one or more pieces of building equipment based on the one or more first awarded or rejected participation hours and the one or more predictions of the one or more ELDR parameters by performing the optimization the second time.

11. A method for optimizing energy use of a building, the method comprising:
performing an optimization to generate one or more first participation hours and a first load reduction amount for each of the one or more first participation hours and providing a first bid comprising the one or more first participation hours and the first load reduction amount for each of the one or more first participation hours to a computing system configured to facilitate an economic load demand response (ELDR) program;
operating one or more pieces of building equipment to affect an environmental condition of the building based on one or more first equipment loads for participating in the ELDR program;
receiving one or more awarded or rejected participation hours from the computing system in response to providing the first bid to the computing system;
generating one or more second participation hours for participating in the ELDR program, a second load reduction amount for each of the one or more second participation hours, and one or more second equipment loads for the one or more pieces of building equipment based on the one or more awarded or rejected participation hours by performing the optimization a second time; and
operating the one or more pieces of building equipment to affect the environmental condition of the building based on the one or more second equipment loads.

12. The method of claim 11, further comprising:
generating a predicted campus electric load based on at least one of historical campus electric load values, predicted market resource prices, predicted equipment loads, or predicted chilled water loads; and
generating the one or more second participation hours for participating in the ELDR program, the second load reduction amount for each of the one or more second participation hours, and the one or more second equipment loads for the one or more pieces of building equipment based on the one or more awarded or rejected participation hours and on the predicted campus electric load.

13. The method of claim 11, further comprising:
generating a second bid comprising the one or more second participation hours and the second load reduction amount for each of the one or more second participation hours;
providing the second bid to the computing system configured to facilitate the ELDR program, wherein the second bid is an update to the first bid, the one or more second participation hours are an update to the one or more first participation hours, and the second load reduction amount for each of the one or more second participation hours is an update to the first load reduction amount for each of the one or more first participation hours; and
receiving one or more second awarded or rejected hours from the computing system in response to providing the second bid.

14. The method of claim 11, wherein the one or more awarded or rejected hours and the one or more second participation hours are hours of a particular day, wherein the method further comprises:
determining a revenue benefit for the particular day based on a benefit function and the one or more awarded or rejected hours; and
determining whether to participate in the ELDR program for the particular day based on a comparison of the revenue benefit to a predefined threshold.

15. The method of claim 14, wherein determining whether to participate in the ELDR program for the particular day based on a comparison of the revenue benefit to a predefined threshold comprises:
determining to participate in the ELDR program for the particular day in response to a determination that the revenue benefit is greater than the predefined threshold; and
determining not to participate in the ELDR program for the particular day in response to a determination that the revenue benefit is less than the predefined threshold.

16. The method of claim 11, wherein performing the optimization to generate the one or more first participation hours for participating in the ELDR program, the first load reduction amount for each of the one or more first participation hours, and the one or more first equipment loads for the one or more pieces of building equipment is based on one or more ELDR parameters for the ELDR program.

17. The method of claim 16, further comprising:
periodically collecting the one or more ELDR parameters from the computing system configured to facilitate the ELDR program;
generating one or more predictions of the one or more ELDR parameters based on the one or more ELDR parameters; and
generating the one or more second participation hours for participating in the ELDR program, the second load reduction amount for each of the one or more second participation hours, and the one or more second equipment loads for the one or more pieces of building equipment based on the one or more first awarded or rejected participation hours and the one or more predictions of the one or more ELDR parameters by performing the optimization the second time.

18. An energy optimization controller for a building, the controller comprising:
a processing circuit configured to:
perform an optimization to generate one or more first participation hours and a first load reduction amount for each of the one or more first participation hours and provide a first bid comprising the one or more first participation hours and the first load reduction amount for each of the one or more first participation hours to a computing system configured to facilitate an economic load demand response (ELDR) program;
operate the one or more pieces of building equipment to affect an environmental condition of the building based on one or more first equipment loads for participating in the ELDR program;
receive one or more awarded or rejected participation hours from the computing system;
periodically collect one or more ELDR parameters from the computing system configured to facilitate the ELDR program;
generate one or more predictions of the one or more ELDR parameters based on the one or more ELDR parameters;
generate one or more second participation hours for participating in the ELDR program, a second load reduction amount for each of the one or more second participation hours, and one or more second equipment loads for the one or more pieces of building equipment based on the one or more awarded or rejected participation hours and the predicted one or more ELDR parameters; and
operate the one or more pieces of building equipment to affect the environmental condition of the building based on the one or more second equipment loads.

19. The controller of claim 18, wherein the one or more awarded or rejected hours and the one or more participation hours are hours of a particular day, wherein the processing circuit is configured to:
determine a revenue benefit for the particular day based on a benefit function and the one or more awarded or rejected hours; and
determine whether to participate in the ELDR program for the particular day based on a comparison of the revenue benefit to a predefined threshold.

20. The controller of claim 19, wherein the processing circuit is configured to determine whether to participate in the ELDR program for the particular day based on a comparison of the revenue benefit to a predefined threshold by:
determining to participate in the ELDR program for the particular day in response to a determination that the revenue benefit is greater than the predefined threshold;
determining not to participate in the ELDR program for the particular day in response to a determination that the revenue benefit is less than the predefined threshold.

* * * * *